US012491210B2

(12) United States Patent
Kurtzberg et al.

(10) Patent No.: US 12,491,210 B2
(45) Date of Patent: Dec. 9, 2025

(54) METHODS OF ASSESSING AND TREATING AUTISM SPECTRUM DISORDERS USING HUMAN UMBILICAL CORD TISSUE-DERIVED MESENCHYMAL STROMAL CELLS

(71) Applicant: DUKE UNIVERSITY, Durham, NC (US)

(72) Inventors: Joanne Kurtzberg, Durham, NC (US); Geraldine Dawson, Durham, NC (US); Jessica Sun, Durham, NC (US)

(73) Assignee: Duke University, Durham, NC (US)

( * ) Notice: Subject to any disclaimer, the term of this patent is extended or adjusted under 35 U.S.C. 154(b) by 1304 days.

(21) Appl. No.: 17/044,843

(22) PCT Filed: Apr. 4, 2019

(86) PCT No.: PCT/US2019/025716
§ 371 (c)(1),
(2) Date: Oct. 1, 2020

(87) PCT Pub. No.: WO2019/195506
PCT Pub. Date: Oct. 10, 2019

(65) Prior Publication Data
US 2021/0128631 A1 May 6, 2021

Related U.S. Application Data

(60) Provisional application No. 62/652,722, filed on Apr. 4, 2018.

(51) Int. Cl.
A61K 35/28 (2015.01)
A61K 9/00 (2006.01)
A61P 25/00 (2006.01)

(52) U.S. Cl.
CPC ............ *A61K 35/28* (2013.01); *A61K 9/0019* (2013.01); *A61P 25/00* (2018.01)

(58) Field of Classification Search
CPC ...... A61K 35/28; A61K 9/0019; A61K 35/51; A61P 25/00; A61P 25/18; A61B 5/4848
See application file for complete search history.

(56) References Cited

U.S. PATENT DOCUMENTS

| 2011/0104100 A1 | 5/2011 | Riordan et al. |
| 2013/0267441 A1 | 10/2013 | Momeni et al. |
| 2017/0296588 A1 | 10/2017 | Ichim et al. |
| 2018/0214489 A1 | 8/2018 | Riordan |

FOREIGN PATENT DOCUMENTS

| WO | 2017160986 A1 | 9/2017 |
| WO | 2017204231 A1 | 11/2017 |

OTHER PUBLICATIONS

Keating, A., 2012. Mesenchymal stromal cells: new directions. Cell stem cell, 10(6), pp. 709-716. (Year: 2012).*
Siniscalco, D., Kannan, S., Semprún-Hernandez, N., Eshraghi, A.A., Brigida, A.L. and Antonucci, N., 2018. Stem cell therapy in autism: recent insights. Stem cells and cloning: advances and applications, pp. 55-67. (Year: 2018).*
Egger H.L., et al., "Automatic Emotion and Attention Analysis of Young Children at Home: A ResearchKit Autism Feasibility Study," Nature Publishing Group Digital Medicine, 2018, vol. 1, No. 20, 10 pages.
Einstein O., et al., "Transplanted Neural Precursors Enhance Host Brain-Derived Myelin Regeneration," The Journal of Neuroscience, Dec. 16, 2009, vol. 29, No. 50, pp. 15694-15702.
English K., et al., "Mesenchymal Stromal Cells in Transplantation Rejection and Tolerance." Cold Spring Harbor Perspectives in Medicine, May 2013, vol. 3, No. 5, 15 pages.
English K., "Mechanisms of Mesenchymal Stromal Cell Immunomodulation," Immunology and Cell Biology, Jan. 2013, vol. 91, No. 1, pp. 19-26.
Erlandsson A., et al., "Stem Cell Factor is a Chemoattractant and a Survival Factor for CNS Stem Cells," Experimental Cell Research, Dec. 10, 2004, vol. 301, No. 2, pp. 201-210.
Estes M.L., et al., "Immune Mediators in the Brain and Peripheral Tissues in Autism Spectrum Disorder," Nature Reviews Neuroscience, Aug. 2015, vol. 16, No. 8, pp. 469-486.
Fancy S.P.J., et al., "Myelin Regeneration: A Recapitulation of Development?," Annual Review of Neuroscience, 2011, vol. 34, pp. 21-43.
FDA., "Final Guidance for Industry. Potency Tests for Cellular and Gene Therapy Products," US Department of Health and Human Services, 2011, pp. 1-19.
Filiano A.J., et al., "How and why do T Cells and Their Derived Cytokines Affect the Injured and Healthy Brain?," Nature Reviews Neuroscience, Jun. 2017, vol. 18, No. 6, pp. 375-384.
Filiano A.J., et al., "Unexpected Role of Interferon-Gamma in Regulating Neuronal Connectivity and Social Behaviour," Nature, 2016, vol. 535, pp. 425-429.
Flatmark T., et al., "Induction of Megamitochondria by Cuprizone(Biscyclohexanone Oxaldihydrazone). Evidence for an Inhibition of the Mitochondrial Division Process," European Journal of Cell Biology, Dec. 1980, vol. 23, No. 1, pp. 141-148.
Francois M., et al., "Human MSC Suppression Correlates with Cytokine Induction of Indoleamine 2, 3-Dioxygenase and Bystander M2 Macrophage Differentiation," Molecular Therapy, Jan. 2012, vol. 20, No. 1, pp. 187-195.
Galipeau J., et al., "International Society for Cellular Therapy Perspective on Immune Functional Assays for Mesenchymal Stromal Cells as Potency Release Criterion for Advanced Phase Clinical Trials," Cytotherapy, Feb. 2016, vol. 18, No. 2, pp. 151-159.

(Continued)

*Primary Examiner* — Fereydoun G Sajjadi
*Assistant Examiner* — Masudur Rahman
(74) *Attorney, Agent, or Firm* — POLSINELLI PC

(57) ABSTRACT

The present disclosure provides methods of treating Autism Spectrum Disorder. More particularly, the present disclosure relates to methods of using cord blood tissue-derived mesenchymal stromal cells (hCT-MSCs) to treat Autism Spectrum Disorder. The methods involve treating a patient having or suspected of having an Autism Spectrum Disorder by administering a therapeutically effective amount of hCT-MSCs.

15 Claims, 5 Drawing Sheets

(56) References Cited

OTHER PUBLICATIONS

Gao R., et al., "Common Mechanisms of Excitatory and Inhibitory Imbalance in Schizophrenia and Autism Spectrum Disorders", Current Molecular Medicine, 2015, vol. 15, pp. 146-167.
Garcia-Segura L.M., et al., "Interaction of the Signalling Pathways of Insulin-Like Growth Factor-I and Sex Steroids in the Neuroendocrine Hypothalamus," Hormone Research in Paediatrics, 1996, vol. 46, No. 4-5, pp. 160-164.
Geschwind D.H., et al., "Autism Spectrum Disorders: Developmental Disconnection Syndromes," Current Opinion in Neurobiology, Feb. 2007, vol. 17, No. 1, pp. 103-111.
Gesundheit B., et al., "Therapeutic Properties of Mesenchymal Stem Cells for Autism Spectrum Disorders," Medical Hypotheses, Mar. 2015, vol. 84, No. 3, pp. 169-177.
Ginhoux F., et al., "Origin and Differentiation of Microglia," Frontiers in Cellular Neuroscience, Apr. 17, 2013, vol. 7, No. 45, 14 pages.
Ginhoux F., et al., "Fate Mapping Analysis Reveals that Adult Microglia Derive from Primitive Macrophages," Science, Nov. 2010, vol. 330 (6005), pp. 841-845.
Goebbels S., et al., "Elevated Phosphatidylinositol 3,4,5-Trisphosphate in Glia Triggers Cell-Autonomous Membrane Wrapping and Myelination," The Journal of Neuroscience, Jun. 30, 2010, vol. 30, No. 26), pp. 8953-8964.
Goines P.E., et al., "Cytokine Dysregulation in Autism Spectrum Disorders (ASD): Possible Role of the Environment," Neurotoxicology and Teratology, 2013, vol. 36, pp. 67-81.
Gu F., et al., "Allogeneic Mesenchymal Stem Cell Transplantation for Lupus Nephritis Patients Refractory to Conventional Therapy," Clinical Rheumatology, Nov. 2014, vol. 33, No. 11, pp. 1611-1619.
Gudi V., et al., "Glial Response During Cuprizone-Induced De- and Remyelination in the CNS: Lessons Learned," Frontiers in Cellular Neuroscience, Mar. 13, 2014, vol. 8, No. 73, 24 pages.
Harvey L., et al., "Prenatal and Postnatal Animal Models of Immune Activation: Relevance to a Range of Neurodevelopmental Disorders." Developmental Neurobiology, Oct. 2012, vol. 72, No. 10, pp. 1335-1348.
Hashemi J, et al., "A Scalable App for Measuring Autism Risk Behaviors in Young Children: A Technical Validity and Feasibility Study," Proceedings of the EAI International Conference on Wireless Mobile Communication and Healthcare, Dec. 2016, vol. 3, No. 10, pp. 23-27.
Hashemi J., et al., "Computer Vision Tools for Low-Cost and Noninvasive Measurement of Autism-Related Behaviors in Infants," Autism Research and Treatment, 2014, 13 pages.
Hedayatpour A., et al., "Promotion of Remyelination by Adipose Mesenchymal Stem Cell Transplantation in a Cuprizone Model of Multiple Sclerosis," Cell Journal, 2013, vol. 15, No. 2, pp. 142-151.
Heo Y., et al., "Aberrant Immune Responses in a Mouse with Behavioral Disorders," PLoS One, 2011, vol. 6, No. 7, 15 pages.
Hibbits N., et al., "Astrogliosis during Acute and Chronic Cuprizone Demyelination and Implications for Remyelination," ASN Neuro, Oct. 30, 2012, vol. 4, No. 6, pp. 393-408.
Hiremath M.M., et al., "Microglial/Macrophage Accumulation during Cuprizone-Induced Demyelination in C57BL/6 Mice," Journal of Neuroimmunology, Dec. 1, 1998, vol. 92, No. 1-2, pp. 38-49.
Hosseini S.A., et al., "Asperger Syndrome," StatPearls Publishing, Jun. 4, 2020, 14 pages.
Hu J., et al., "Long Term Effect and Safety of Wharton's Jelly-Derived Mesenchymal Stem Cells on Type 2 Diabetes," Experimental and Therapeutic Medicine, Sep. 2016, vol. 12, No. 3, pp. 1857-1866.
Hu J., et al., "Long Term Effects of the Implantation of Wharton's Jelly-Derived Mesenchymal Stem Cells from the Umbilical Cord for Newly-Onset Type 1 Diabetes Mellitus," Endocrine Journal, 2013, vol. 60, No. 3, pp. 347-357.
Hua R., et al., "Evaluation of Somatosensory Evoked Potential and Pain Rating Index in a Patient with Spinal Cord Injury Accepted Cell Therapy," Pain Physician, May 2016, vol. 19, No. 4, pp. E659-E666.
Huang D.W., et al., "Bioinformatics Enrichment Tools: Paths Toward the Comprehensive Functional Analysis of Large Gene Lists," Nucleic Acids Research, Jan. 2009, vol. 37, No. 1, pp. 1-13.
Huang D.W., et al., "Systematic and Integrative Analysis of Large Gene Lists Using DAVID Bioinformatics Resources," Nature Protocols, 2009, vol. 4, No. 1, pp. 44-57.
Ida J.A., et al., "Expression of the Receptor Tyrosine Kinase C-Kit in Oligodendrocyte Progenitor Cells," Journal of Neuroscience Research, Dec. 1, 1993, vol. 36, No. 5, pp. 596-606.
International Preliminary Report on Patentability for the Application No. PCT/US2019/025716, dated Oct. 15, 2020, 7 pages.
Jaimes Y., et al., "Mesenchymal Stem Cell-Derived Microvesicles Modulate LPS-Induced Inflammatory Responses to Microglia Cells," Stem Cells, Mar. 2017, vol. 35, No. 3, pp. 812-823.
Jiang Y., et al., "Feasibility of Delivering Mesenchymal Stem Cells Via Catheter to the Proximal End of the Lesion Artery in Patients with Stroke in the Territory of the Middle Cerebral Artery," Cell Transplantation, 2013, vol. 22, No. 12, pp. 2291-2298.
Jiao J., "Repetitive Transcranial Magnetic Stimulation for Insomnia in Patients with Autism Spectrum Disorder: Study Protocol for a Randomized, Double-Blind, and Sham-Controlled Clinical Trial," Front in Psychiatry, Sep. 28, 2022, vol. 13, 9 pages.
Jin J.L., et al., "Safety and Efficacy of Umbilical Cord Mesenchymal Stem Cell Therapy in Hereditary Spinocerebellar Ataxia," Current Neurovascular Research, Feb. 2013, vol. 10, No. 1, pp. 11-20.
Kan C.C., et al., "[Autism Spectrum Disorders in Adults]," Nederlands Tijdschrift voor Geneeskund, Jun. 14, 2008, vol. 152, No. 24, pp. 1365-1369.
Kanne S.M., et al., "Diagnostic and Assessment Findings: A Bridge to Academic Planning For Children with Autism Spectrum Disorders," Neuropsychology Review, Dec. 2008, vol. 18, No. 4, pp. 367-384.
Karrer F.M., et al., "Fluorescein Labeling of Murine Hepatocytes for Identification after Intrahepatic Transplantation," Transplantation Proceedings, Dec. 1992, vol. 24, No. 6, pp. 2820-2821.
Karussis D., et al., "Safety and Immunological Effects of Mesenchymal Stem Cell Transplantation in Patients with Multiple Sclerosis and Amyotrophic Lateral Sclerosis," Archives of Neurology, Oct. 2010, vol. 67, No. 10, pp. 1187-1194.
Kashani I.R., et al., "Protective Effects of Melatonin Against Mitochondrial Injury in a Mouse Model of Multiple Sclerosis," Experimental Brain Research, Sep. 2014, vol. 232, No. 9, pp. 2835-2846.
Kim H.S., et al., "Clinical Trial of Human Umbilical Cord Blood-derived Stem Cells for the Treatment of Moderate-to-Severe Atopic Dermatitis: Phase I/IIa Studies," Stem Cells, Jan. 2017, vol. 35, No. 1, pp. 248-255.
King B.H., et al., "Update on Diagnostic Classification in Autism," Current Opinion in Psychiatry, Mar. 2014, vol. 27, No. 2, pp. 105-109.
Kipp M., et al., "The Cuprizone Animal Model: New Insights into an Old Story," Acta Neuropathologica, Dec. 2009, vol. 118, No. 6, pp. 723-736.
Park S., et al., "Tumorigenicity Evaluation of Umbilical Cord Blood-derived Mesenchymal Stem Cells," Toxicological Research, Jul. 2016, vol. 32 (3), pp. 251-258.
Perry A., et al., "Brief Report: The Vineland Adaptive Behavior Scales in Young Children with Autism Spectrum Disorders at Different Cognitive Levels," Journal of Autism and Developmental Disorders, 2009, vol. 39, pp. 1066-1078.
Phillips M., et al., "Dendritic Spine Dysgenesis in Autism Related Disorders," Neuroscience Letters, Aug. 5, 2015, vol. 601, pp. 30-40.
Praet J., et al., "Cellular and Molecular Neuropathology of the Cuprizone Mouse Model: Clinical Relevance for Multiple Sclerosis," Neuroscience & Biobehavioral Reviews, Nov. 2014, vol. 47, pp. 485-505.

(56) References Cited

OTHER PUBLICATIONS

"Prevalence of Autism Spectrum Disorder Among Children Aged 8 Years Autism and Developmental Disabilities Monitoring Network, 11 Sites, United States, 2010," MMWR Surveillance Summaries, 2014, vol. 63, pp. 1-24.
Qin H.L., et al., "Clinical Evaluation of Human Umbilical Cord Mesenchymal Stem Cell Transplantation after Angioplasty for Diabetic Foot," Experimental and Clinical Endocrinology & Diabetes, Sep. 2016, vol. 124, No. 8, pp. 497-503.
Qu Z., et al., [Clinical Study on Treatment of Bone Nonunion with Mscs Derived from Human Umbilical Cord]. Zhongguo Xiu Fu Chong Jian Wai Ke Za Zhi, Mar. 2009, vol. 23, No. 3, pp. 345-347.
Rajput B.S., et al., "Human Umbilical Cord Mesenchymal Stem Cells in the Treatment of Duchenne Muscular Dystrophy: Safety and Feasibility Study in India," Journal of Stem Cell, 2015, vol. 10, No. 2, pp. 141-156.
Reader B.F., et al., "Peripheral And Central Effects Of Repeated Social Defeat Stress: Monocyte Trafficking, Microglial Activation, and Anxiety," Neuroscience, Mar. 19, 2015, vol. 289, pp. 429-442.
Ruckh J.M., et al., "Rejuvenation of Regeneration in the Aging Central Nervous System," Cell Stem Cell, Jan. 6, 2012, vol. 10, No. 1, pp. 96-103.
Rupp S., et al., "Intracoronary Bone Marrow Cell Application for Terminal Heart Failure in Children," Cardiology in the Young, Oct. 2012, vol. 22, No. 5, pp. 558-563.
Rutter M., et al., "Autism Diagnostic Interview-Revised," Torrance, CA: Western Psychological Services, 2008, 13 pages.
Saha A., et al., "A Cord Blood Monocyte-derived Cell Therapy Product Accelerates Brain Remyelination," JCI Insight 2016, vol. 1(13), pp. 1-19.
Sahin M., et al., "Genes, Circuits, and Precision Therapies for Autism and Related Neurodevelopmental Disorders," Science, 2015, vol. 350, Issue. 6263, pp. aab3897-1-aab3897-8.
Sanberg R.P., et al., "Monocyte Transplantation for Neural and Cardiovascular Ischemia Repair," Journal of Cellular and Molecule Medicine, Mar. 2010, vol. 14 (3), pp. 553-563.
Scholzen T., et al., "The Ki-67 Protein: From the Known and the Unknown," Journal of Cell Physiology, Mar. 2000, vol. 182, No. 3, pp. 311-322.
Segal-Gavish H., et al., "Mesenchymal Stem Cell Transplantation Promotes Neurogenesis and Ameliorates Autism Related Behaviors in BTBR Mice," Autism Research, Jan. 2016, vol. 9, No. 1, pp. 17-32.
Shechter R., at al., "Harnessing Monocyte-Derived Macrophages to Control Central Nervous System Pathologies: No Longer 'If' But 'How'," Journal of Pathology, Jan. 2013, vol. 229, No. 2, pp. 332-346.
Shechter R., et al., "Recruitment of Beneficial M2 Macrophages to Injured Spinal Cord is Orchestrated by Remote Brain Choroid Plexus," Immunity, Mar. 21, 2013, vol. 38, No. 3, pp. 555-569.
Shi C., et al., "Monocyte Recruitment During Infection and Inflammation," Nature Reviews Immunology, Oct. 10, 2011, vol. 11, No. 11, pp. 762-774.
Shi M., et al., "Human Mesenchymal Stem Cell Transfusion is Safe and Improves Liver Function in Acute-On-Chronic Liver Failure Patients," Stem Cells Translational Medicine, Oct. 2012, vol. 1, No. 10, pp. 725-731.
Shultz L.D., et al., "Human Lymphoid and Myeloid Cell Development in NOD/Ltsz-Scid IL2R Gamma Null Mice Engrafted with Mobilized Human Hemopoietic Stem Cells," Journal of Immunology, May 15, 2005, vol. 174, No. 10, pp. 6477-6489.
Siegel B., et al., "The Use of Signal Detection Theory to Assess DSM-III-R Criteria for Autistic Disorder," Journal of the American Academy of Child and Adolescent Psychiatry, Jul. 1989, vol. 28, No. 4, pp. 542-548.
Skripuletz T., et al., "Astrocytes Regulate Myelin Clearance through Recruitment of Microglia during Cuprizone-Induced Demyelination," Brain, Jan. 2013, vol. 136, No. 1, pp. 147-167.
Skripuletz T., et al., "De- and Remyelination in the CNS White and Grey Matter Induced by Cuprizone: The Old, The New, and The Unexpected," Histology & Histopathology, Dec. 2011, vol. 26, No. 12, pp. 1585-1597.
Sparrow S.S., et al., "Vineland Adaptive Behavior Scales: Interview Edition," 1984, Circle Pines, MN: American Guidance Service.
Storms R., et al., "Tissue Distribution of a Cord Blood-Derived Cell Product Following Intrathecal Transplantation," Cytotherapy, Apr. 1, 2014, vol. 16, No. 4, 1 pages.
Strle K., et al., "Interleukin-10 in the Brain," Critical Reviews in Immunology, 2001, vol. 21, No. 5, pp. 427-449.
Sun M.J., et al., "Cord Blood for Brain Injury," Cytotherapy, Jun. 2015, vol. 17, No. 6, pp. 775-785.
Suzuki K., et al., "Microglial Activation in Young Adults With Autism Spectrum Disorder," JAMA Psychiatry, 2013, vol. 70(1), pp. 49-58.
Takano T., "Role of Microglia in Autism: Recent Advances," International Journal of Developmental Neuroscience, 2015, vol. 37, No. 3, pp. 195-202.
Tandler B., et al., "Division of Giant Mitochondria during Recovery from Cuprizone Intoxication," Journal of Cell Biology, Jan. 1973, vol. 56, No. 1, pp. 266-272.
Torkildsen O., et al., "The Cuprizone Model for Demyelination," Acta Neurologica Scandinavica, 2008, vol. 188, pp. 72-76.
Torre-Ubieta L., et al., "Advancing the Understanding of Autism Disease Mechanisms through Genetics," Nat Med, 2016, vol. 22, pp. 345-361.
Tsiperson V., et al., "GAS6 Enhances Repair Following Cuprizone-Induced Demyelination," PLoS One, Dec. 23, 2010, vol. 5, No. 12, 9 pages.
Vana A.C., et al., "Platelet-Derived Growth Factor Promotes Repair of Chronically Demyelinated White Matter," Journal of Neuropathology & Experimental Neurology, Nov. 2007, vol. 66, No. 11, pp. 975-988.
Varni J.W., et al., "PedsQL Gastrointestinal Symptoms Module Item Development: Qualitative Methods," Journal of Pediatric Gastroenterology and Nutrition, May 2012, vol. 54, No. 5, pp. 664-671.
Vellasamy S., et al., "Human Mesenchymal Stromal Cells Modulate T-Cell Immune Response Via Transcriptomic Regulation," Cytotherapy, Oct. 2016, vol. 18, No. 10, pp. 1270-1283.
Venkataramana N.K., et al., "Open-Labeled Study of Unilateral Autologous Bone-Marrow-Derived Mesenchymal Stem Cell Transplantation in Parkinson's Disease," Translational Research, Feb. 2010, vol. 155, No. 2, pp. 62-70.
Voineagu I., et al., "Transcriptomic Analysis of Autistic Brain Reveals Convergent Molecular Pathology," Nature, Jun. 16, 2011, vol. 474, pp. 380-384.
Volk L., et al., "Glutamate Synapses in Human Cognitive Disorders," Annual Review of Neuroscience, 2015, vol. 38, pp. 127-149.
Wang D., et al., "Long-Term Safety of Umbilical Cord Mesenchymal Stem Cells Transplantation for Systemic Lupus Erythematosus: A 6-Year Follow-Up Study," International Journal of Clinical and Experimental Medicine, Aug. 2017, vol. 17, No. 3, pp. 333-340.
Wang D., et al., "Umbilical Cord Mesenchymal Stem Cell Transplantation in Active and Refractory Systemic Lupus Erythematosus: A Multicenter Clinical Study," Arthritis Research & Therapy, Mar. 25, 2014, vol. 16, No. 2, 14 pages.
Wang L., et al., "Clinical Observation of Employment of Umbilical Cord Derived Mesenchymal Stem Cell for Juvenile Idiopathic Arthritis Therapy," Stem Cells International, 2016, vol. 2016, No. 9165267, 8 pages.
Wang L., et al., "Pilot Study of Umbilical Cord-Derived Mesenchymal Stem Cell Transfusion in Patients with Primary Biliary Cirrhosis," Journal of Gastroenterology and Hepatology, Aug. 2013, vol. 28, No. 1. pp. 85-92.
Wang S., et al., "Umbilical Cord Mesenchymal Stem Cell Transplantation Significantly Improves Neurological Function in Patients with Sequelae of Traumatic Brain Injury," Brain Research, Sep. 26, 2013, vol. 1532, pp. 76-84.
Wang X et al., "Effect of Umbilical Cord Mesenchymal Stromal Cells on Motor Functions of Identical Twins with Cerebral Palsy: Pilot Study on the Correlation of Efficacy and Hereditary Factors," Cytotherapy, Feb. 2015, vol. 17 (2), pp. 224-231.

(56) References Cited

OTHER PUBLICATIONS

Wang Y., et al., "Mesenchymal Stromal Cells as an Adjuvant Treatment for Severe Late-Onset Hemorrhagic Cystitis after Allogeneic Hematopoietic Stem Cell Transplantation," Acta Haematologica, 2015, vol. 133, No. 1, pp. 72-77.
Wang Y., et al., "TREM2 Lipid Sensing Sustains the Microglial Response in an Alzheimer's Disease Model," Cell, Mar. 12, 2015, vol. 160, No. 6, pp. 1061-1071.
Whitelock J.M., et al., "The Degradation of Human Endothelial Cell-Derived Perlecan and Release of Bound Basic Fibroblast Growth Factor by Stromelysin, Collagenase, Plasmin, and Heparanases," Journal of Biological Chemistry, Apr. 26, 1996, vol. 271, No. 17, pp. 10079-10086.
Wohleb E.S., et al., "Monocyte Trafficking to the Brain with Stress and Inflammation: A Novel Axis of Immune-To-Brain Communication that Influences Mood and Behavior," Frontiers in Neuroscience, Jan. 21, 2014, vol. 8, 17 pages.
Wolff J.J., et al., "Differences in White Matter Fiber Tract Development Present From 6 to 24 Months in Infants With Autism," American Journal of Psychiatry, 2012, vol. 169, pp. 589-600.
Womble A. T., et al., "Monocytes are Essential for the Neuroprotective Effect of Human Cord Blood Cells Following Middle Cerebral Artery Occlusion in Rat," Molecular and Cellular Neuroscience, Mar. 2014, vol. 59, pp. 76-84.
Woodruff R.H., et al., "Platelet-Derived Growth Factor Regulates Oligodendrocyte Progenitor Nos. in Adult CNS and Their Response Following CNS Demyelination," Molecular and Cellular Neuroscience, Feb. 2004, vol. 25, No. 2, pp. 252-262.
Wu K.H., et al., "Human Application of Ex-Vivo Expanded Umbilical Cord-Derived Mesenchymal Stem Cells: Enhance Hematopoiesis after Cord Blood Transplantation," Cell Transplantation, 2013, vol. 22, No. 11, pp. 2041-2051.
Wu Q.L., et al., "Umbilical Cord Blood-Derived Mesenchymal Stem Cells Ameliorate Graft-Versus-Host Disease Following Allogeneic Hematopoietic Stem Cell Transplantation Through Multiple Immunoregulations," Journal of Huazhong University of Science and Technology, Aug. 2015, vol. 35, No. 4, pp. 477-484.
Xie B., et al., "Therapeutic Effects of Human Umbilical Cord Mesenchymal Stem Cells Transplantation on Hypoxic Ischemic Encephalopathy," The American Journal of Translational Research, 2016, vol. 8, No. 7, pp. 3241-3250.
Yamout B., et al., "Bone Marrow Mesenchymal Stem Cell Transplantation in Patients With Multiple Sclerosis: A Pilot Study," Journal of Neuroimmunology, Oct. 8, 2010, vol. 227, No. 1-2, pp. 185-189.
Yang J., et al., "Adult Neural Stem Cells Expressing IL-10 Confer Potent Immunomodulation and Remyelination in Experimental Autoimmune Encephalitis," Journal of Clinical Investigation, Dec. 2009, vol. 119(12), pp. 3678-3691.
Yang S., et al., "Vineland Adaptive Behavior Scales: II Profile of Young Children with Autism Spectrum Disorder," Journal of Autism and Developmental Disorders, 2016, vol. 46, pp. 64-73.
Yong V.W., et al., "Metalloproteinases in Biology and Pathology of the Nervous System," Nature Reviews Neuroscience, Jul. 2001, vol. 2, No. 7, pp. 502-511.
Young A.M.H., et al., "From Molecules to Neural Morphology: Understanding Neuroinflammation in Autism Spectrum Condition," Molecular Autism, 2016, vol. 7(9), 8 pages.
Zantomio D., et al., "Convergent Evidence for Mglur5 in Synaptic and Neuroinflammatory Pathways Implicated in ASD," Neuroscience & Biobehavioral Reviews, May 2015, vol. 52, pp. 172-177.
Zeinaloo A., et al., "Further Follow Up of the Cardiomyopathie Patient Treated by Intracoronary Administration of Autologous Mesenchymal Stem Cells," Pediatric Transplantation, Jun. 2011, vol. 15, No. 4, 1 pages.
Zeinaloo A., et al., "Intracoronary Administration of Autologous Mesenchymal Stem Cells in a Critically Ill Patient with Dilated Cardiomyopathy," Pediatric Transplantation, Dec. 2011, vol. 15, No. 8, pp. E183-E186.
Zendedel A., et al., "Cuprizone-Induced Demyelination as a Tool to Study Remyelination and Axonal Protection," Journal of Molecular Neuroscience, Oct. 2013, vol. 51, No. 2, pp. 567-572.
Zhang Z., et al., "Safety and Immunological Responses to Human Mesenchymal Stem Cell Therapy in Difficult-To-Treat HIV-1-Infected Patients," AIDS, May 15, 2013, vol. 27, No. 8, pp. 1283-1293.
Zhang Z., et al., "Human Umbilical Cord Mesenchymal Stem Cells Improve Liver Function and Ascites in Decompensated Liver Cirrhosis Patients," Journal of Gastroenterology and Hepatology, Mar. 2012, vol. 27, No. 2, pp. 112-120.
Zhao X.F., et al., "Clinical Observation of Umbilical Cord Mesenchymal Stem Cell Treatment of Severe Systolic Heart Failure," Genetics and Molecular Research, Apr. 10, 2015, vol. 14, No. 2, pp. 3010-3017.
Zhu L., et al., "Haploidentical Hematopoietic Stem Cell Transplant with Umbilical Cord-Derived Multipotent Mesenchymal Cell Infusion for the Treatment of High-Risk Acute Leukemia in Children," Leukemia & Lymphoma, May 2015, vol. 56, No. 5, pp. 1346-1352.
Siniscalco, D. et al. (2012) Autism Spectrum Disorders: Is Mesenchymal Stem Cell Personalized Therapy the Future?. Journal of Biomedicine and Biotechnology. 2012 (Article ID 480289): 6 pages.
Min, L. et al. (2010) Stem cells for treatment of autism: Safety and efficacy. Journal of Clinical Rehabilitative Tissue Engineering Research. 14(32): 5967-5970.
Xiujun, S. et al. (2011) Research progress of stem cell therapy for autism in children (literature review). Journal of Radioimmunology. 1: 55-57 (Machine Translation Only).
Huan, Y. et al. (2011) The efficacy and validity of stem cell therapy in children with autism evaluated by Aberrant Behavior Checklist. Chin Med Biotechnol. 6(5): 353-358.
Min, L. et al. (2011) Safety and efficacy of cord blood mononuclear cells and umbilical cord mesenchymal stem cells therapy for childhood autism. Journal of Clinical Rehabilitative Tissue Engineering Research. 15(23): 4359-4362.
Siniscalco, D. et al. (2014) Mesenchymal stem cells in treating autism: Novel insights. World Journal of Stem Cells. 6 (2): 173-178.
Study NCT03099239 on Date: Mar. 15, 2018(v8), ClinicalTrials.gov archive[online], Mar. 15, 2018, [searched on Jan. 17, 2023], <https://clinicaltrials.gov/ct2/history/NCT03099239>.
Can, A. et al. (2017) Umbilical cord mesenchymal stromal cell transplantations: A systemic analysis of clinical trials. Cytotherapy. 19(12): 1351-1382.
Abrahams B.S., et al., "Connecting Genes to Brain in the Autism Spectrum Disorders," Archives of Neurology, Apr. 2010, vol. 67, No. 4, pp. 395-399.
Acs P., et al., "Selective Ultrastructural Vulnerability in the Cuprizone-Induced Experimental Demyelination," Ideggyogyaszati Szemle, Jul. 30, 2012, vol. 65, No. 7-8, pp. 266-270.
Aman M.G., et al., "The Aberrant Behavior Checklist: A Behavior Rating Scale for the Assessment of Treatment Effects," Mar. 1985, vol. 89, No. 5, pp. 485-491.
Arnett A.H., et al., "TNF Alpha Promotes Proliferation of Oligodendrocyte Progenitors and Remyelination," Nature Neuroscience, Nov. 2001, vol. 4(11), pp. 1116-1122.
Arnett H.A., et al., "bHLH Transcription Factor Olig1 is Required to Repair Demyelinated Lesions in the CNS," Science, Dec. 17, 2004, vol. 306, No. 5704, pp. 2111-2115.
Asano M., et al., "Mechanism of the Formation of Megamitochondria by Copper-Chelating Agents. IV. Role of Fusion Phenomenon in the Cuprizone-Induced Megamitochondrial Formation," Acta Pathologica Japonica, Mar. 1978, vol. 28, No. 2, pp. 205-213.
Atladottir H.O., et al., "Maternal Infection Requiring Hospitalization during Pregnancy and Autism Spectrum Disorders," Dec. 2010, vol. 40, No. 12, pp. 1423-1430.
Ausderau K.K., et al., "Sensory Experiences Questionnaire," Encyclopedia of Autism Spectrum Disorders, 2013, pp. 2770-2774.
Balboni G., et al., "The Vineland-II in Preschool Children with Autism Spectrum Disorders: An Item Content Category Analysis," Journal of Autism and Developmental Disorders, 2016, vol. 46, pp. 42-52.
Baranek G.T., et al., "Sensory Experiences Questionnaire: Discriminating Sensory Features in Young Children with Autism, Develop-

(56) References Cited

OTHER PUBLICATIONS mental Delays, and Typical Development," Journal of Child Psychology and Psychiatry, Jun. 2006, vol. 47, No. 6, pp. 591-601.
Bartolucci J., et al., "Safety and Efficacy of the Intravenous Infusion of Umbilical Cord Mesenchymal Stem Cells in Patients With Heart Failure: A Phase 1/2 Randomized Controlled Trial (RIMECARD Trial [Randomized Clinical Trial of Intravenous Infusion Umbilical Cord Mesenchymal Stem Cells on Cardiopathy])," Circulation Research, Oct. 27, 2017, vol. 121, No. 10, pp. 1192-1204.
Benardais K., et al., "Cuprizone [Bis(Cyclohexylidenehydrazide)] is Selectively Toxic For Mature Oligodendrocytes," Neurotoxicity Research, Aug. 2013, vol. 24, No. 2, pp. 244-250.
Berument S.K., et al., "Screening Questionnaire: Diagnostic Validity," British Journal of Psychiatry, Nov. 1999, vol. 175, pp. 444-451.
Biancotti J.C., et al., Activation of Inflammatory Response by a Combination of Growth Factors in Cuprizone-Induced Demyelinated Brain Leads to Myelin Repair. Neurochemistry International, Dec. 2008, vol. 33, No. 12, pp. 2615-2628.
Bishop D.V., et al., "Exploring the Borderlands of Autistic Disorder and Specific Language Impairment: A Study Using Standardised Diagnostic Instruments," Journal of Child Psychology and Psychiatry, Oct. 2002, vol. 43, No. 7, pp. 917-929.
Bolte S., et al., "[Diagnostic Observation Scale for Autistic Disorders: Initial Results of Reliability and Validity]," Z Kinder Jugendpsychiatr Psychother, Feb. 2004, vol. 32, No. 1, pp. 45-50.
Bonab M.M., et al., "Autologous Mesenchymal Stem Cell Therapy in Progressive Multiple Sclerosis: An Open Label Study," Current Stem Cell Research & Therapy, Nov. 2012, vol. 7, No. 6, pp. 407-414.
Boyd Z.S., et al., "Interleukin-10 Receptor Signaling Through STAT-3 Regulates the Apoptosis of Retinal Ganglion Cells in Response to Stress," Investigative Ophthalmology & Visual Sciencei, Dec. 2003, vol. 44, No. 12, pp. 5206-5211.
Braunschwig D., et al., "Autism-Specific Maternal Autoantibodies Recognize Critical Proteins in Developing Brain," Translational Psychiatry, 2013, vol. 3, pp. e277, 9 pages.
Buescher A.S., et al., JAMA Pediatrics, "Costs of Autism Spectrum Disorders in the United Kingdom and the United States." 2014, vol. 168, pp. 721-728.
Butovsky O., et al., "Microglia Activated by IL-4 or IFN-Gamma Differentially Induce Neurogenesis and Oligodendrogenesis from Adult Stem/Progenitor Cells," Molecular and Cellular Neuroscience, Jan. 2006, vol. 31, No. 1, pp. 149-160.
Cai J., et al., "Umbilical Cord Mesenchymal Stromal Cell With Autologous Bone Marrow Cell Transplantation in Established Type 1 Diabetes: A Pilot Randomized Controlled Open-Label Clinical Study to Assess Safety and Impact on Insulin Secretion," Diabetes Care, Jan. 2016, vol. 39, No. 1, pp. 149-157.
Campbell K., et al., "Computer Vision Analysis Captures Atypical Attention in Toddlers with Autism," Autism, Apr. 2019, vol. 23, No. 3, pp. 619-628.
Campbell K., et al., "Computer Vision Detects Delayed Social Orienting in Toddlers with Autism," Annual Meeting of the International Society for Autism Research, 2 pages.
Cantoni C., et al., "TREM2 Regulates Microglial Cell Activation in Response to Demyelination in Vivo," Acta Neuropathologica, Mar. 2015, vol. 129, No. 3, pp. 429-447.
Chang Y.S., et al., "Mesenchymal Stem Cells for Bronchopulmonary Dysplasia: Phase 1 Dose-Escalation Clinical Trial," The Journal of Pediatrics, May 2014, vol. 164, No. 5, pp. 966-972.
Chen H., et al., "Treatment of Psoriasis with Mesenchymal Stem Cells," The American Journal of Medicine, Mar. 2016, vol. 129, No. 3, pp. e13-e14.
Chen S., et al., "Intracoronary Transplantation of Autologous Bone Marrow Mesenchymal Stem Cells for Ischemic Cardiomyopathy Due to Isolated Chronic Occluded Left Anterior Descending Artery," Journal of Invasive Cardiology, Nov. 2006, vol. 18, No. 11, pp. 552-556.
Chen W., "IDO: More than an Enzyme," Nature Immunology, Aug. 18, 2011, vol. 12, No. 9, pp. 809-811.

Cheng H., et al., "Clinical Observation of Umbilical Cord Mesenchymal Stem Cell Transplantation Iin Treatment for Sequelae of Thoracolumbar Spinal Cord Injury," Journal of Translational Medicine, Sep. 12, 2014, vol. 12, No. 253, 8 pages.
Chess S., "Autism in Children with Congenital Rubella," Journal of Autism and Childhood Schizophrenia, 1971, vol. 1, No. 1, pp. 33-47.
Cho K.H., et al., "Tissue Culture Model of Krabbe's Disease: Psychosine Cytotoxicity in Rat Oligodendrocyte Culture," International Journal of Developmental Neuroscience, 1997, vol. 19, No. 4, pp. 321-327.
Clarner T., et al., "Myelin Debris Regulates Inflammatory Responses in an Experimental Demyelination Animal Model and Multiple Sclerosis Lesions," Glia, Oct. 2012, vol. 60, No. 10, pp. 1468-1480.
Cohen I.L., et al., "Behavioral Inventory Professional Manual," Lutz FL:Psychological Assessment Resources Inc, 2005.
Cohen I.L., et al., "The PDD Behavior Inventory: A Rating Scale for Assessing Response to Intervention in Children with Pervasive Developmental Disorder," Journal of Autism and Developmental Disorders, Feb. 2003, vol. 33, No. 1, pp. 31-45.
Connick P., et al., "Autologous Mesenchymal Stem Cells for the Treatment of Secondary Progressive Multiple Sclerosis: An Open-Label Phase 2a Proof-Of-Concept Study," The Lancet Neurology, Feb. 2012, vol. 11, No. 2, pp. 150-156.
Crocker S.J., et al., "Intravenous Administration of Human Embryonic Stem Cell-Derived Neural Precursor Cells Attenuates Cuprizone-Induced Central Nervous System (CNS) Demyelination," Neuropathology and Applied Neurobiology, Oct. 2011, vol. 37, No. 6, pp. 643-653.
Cronk J.C., et al., "Peripherally Derived Macrophages can Engraft the Brain independent of Irradiation and Maintain an Identity Distinct From Microglia," Journal of Experimental Medicine, Jun. 4, 2018, vol. 215, No. 6, pp. 1627-1647.
Davies L.C., et al., "Mesenchymal Stromal Cell Secretion of Programmed Death-1 Ligands Regulates T Cell Mediated Immunosuppression," Stem Cells, Mar. 2017, vol. 35, No. 3, pp. 766-776.
Dawson G., et al., "Autologous Cord Blood Infusions are Safe and Feasible in Young Children with Autism Spectrum Disorder: Results of a Single-Center Phase I Open-Label Trial," Stem Cells Translational Medicine, 2017, vol. 6(5), pp. 1332-1339.
Dawson G., et al., "Early Behavioral Intervention is associated with Normalized Brain Activity in Young Children with Autism," Journal of the American Academy of Child and Adolescent Psychiatry, Nov. 2012, vol. 51, No. 11, pp. 1150-1159.
Dawson G., et al., "Randomized, Controlled Trial of an Intervention for Toddlers With Autism: The Early Start Denver Model," Pediatrics, 2010, vol. 125, pp. e17-e26.
Dekker L.P., et al., "Complementing or Congruent? Desired Characteristics in a Friend and Romantic Partner in Autistic versus Typically Developing Male Adolescents," Archives of Sexual Behavior, Oct. 14, 2022, 15 pages.
Dercole A.J., et al., "The Role of the Insulin-Like Growth Factors in the Central Nervous System," Molecular Neurobiology, Dec. 1996, vol. 13, No. 3, pp. 227-255.
Derecki N.C., et al., "Wild-Type Microglia Arrest Pathology in a Mouse Model of Rett Syndrome," Nature, Mar. 18, 2012, vol. 484, No. 7392, pp. 105-109.
Dimou L., et al., "Progeny of Olig2-Expressing Progenitors in the Gray and White Matter of the Adult Mouse Cerebral Cortex," The Journal of Neuroscience, Oct. 8, 2008, vol. 28, No. 41, pp. 10434-10442.
Doan V., et al., "Abbreviated Exposure To Cuprizone Is Sufficient To Induce Demyelination And Oligodendrocyte Loss," Journal of Neuroscience Research, Mar. 2013, vol. 91, No. 3, pp. 363-373.
Dominici M., et al., "Minimal Criteria for Defining Multipotent Mesenchymal Stromal Cells. The International Society for Cellular Therapy Position Statement," Cytotherapy, 2006, vol. 8, No. 4, pp. 315-317.
Drela K., et al., "Enhanced Neuro-Therapeutic Potential of Wharton's Jelly-Derived Mesenchymal Stem Cells in Comparison with Bone Marrow Mesenchymal Stem Cells Culture," Cytotherapy, Apr. 2016, vol. 18, No. 4, pp. 497-509.

(56) References Cited

OTHER PUBLICATIONS

Dulamea A.O., "The Potential Use of Mesenchymal Stem Cells in Stroke Therapy—From Bench to Bedside," Journal of the Neurological Sciences, May 15, 2015, vol. 352, No. 1-2, pp. 1-11.
International Search Report and Written Opinion issued Jul. 5, 2019 in corresponding International Patent Application No. PCT/US2019/025716, 8 pages.
Lv et al., "Transplantation of Human Cord Blood Mononuclear Cells and Umbilical Cord-Derived Mesenchymal Stem Cells in Autism," Journal of Translational Medicine, Aug. 27, 2013, vol. 11, No. 1976, pp. 1-10.
Sun et al., "Cell Therapy for Diverse Central Nervous System Disorders Inherited Metabolic Diseases and Autism," Pediatric Research, Nov. 8, 2017, vol. 83, No. 1, pp. 364-371.
Kirby A.V., et al., "Sensory Experiences of Children with Autism Spectrum Disorder: In Their Own Words." Autism, Apr. 2015, vol. 19, No. 3, pp. 316-326.
Klein-Tasman B.P., et al., "Overlap with the Autism Spectrum in Young Children with Williams Syndrome," Journal of Developmental and Behavioral Pediatrics, Aug. 2009, vol. 30, No. 4, pp. 289-299.
Koh S., et al., "Human Umbilical Tissue-Derived Cells Promote Synapse Formation and Neurite Outgrowth via Thrombospondin Family Proteins," The Journal of Neuroscience, Nov. 25, 2015, vol. 35, No. 47, pp. 15649-15665.
Kong D., et al., "Umbilical Cord Mesenchymal Stem Cell Transfusion Ameliorated Hyperglycemia in Patients with Type 2 Diabetes Mellitus," Clinical Laboratory, 2014, vol. 60, No. 12, pp. 1969-1976.
Korisky A., et al., "The Dual Neural Effects of Oxytocin in Autistic Youth: Results from a Randomized Trial," Scientific Reports, Sep. 29, 2022, vol. 12, No. 1, 13 pages.
Kuci Z., et al., "Mesenchymal Stromal Cells From Pooled Mononuclear Cells of Multiple Bone Marrow Donors as Rescue Therapy in Pediatric Severe Steroid-Refractory Graft-Versus-Host Disease: A Multicenter Survey," Haematologica, Aug. 2016, vol. 101, No. 8, pp. 985-994.
Kurtzberg J., et al., "Effect of Human Mesenchymal Stem Cells (Remestemcel-L) on Clinical Response and Survival Confirmed in a Large Cohort of Pediatric Patients with Severe High-Risk Steroid-Refractory Acute Graft Versus Host Disease," Biology of Blood and Marrow Transplantation, Mar. 2016, vol. 22, No. 3, 1 pages.
Kurtzberg J., et al., "Preclinical Characterization of DUOC-01, A Cell Therapy Product Derived from Banked Umbilical Cord Blood for use as an Adjuvant to Umbilical Cord Blood Transplantation for Treatment of Inherited Metabolic Diseases," Cytotherapy, 2015, vol. 17(6), pp. 803-815.
Lalu M.M., et al., "Safety of Cell Therapy with Mesenchymal Stromal Cells (Safecell): A Systematic Review and Meta-Analysis of Clinical Trials," PLoS One, 2012, vol. 7, No. 10, 21 pages.
Lampron A., et al., "Inefficient Clearance of Myelin Debris by Microglia Impairs Remyelinating Processes," Journal of Experimental Medicine, Apr. 6, 2015, vol. 212, No. 4, pp. 481-495.
Lampron A., et al., "Migration of Bone Marrow-Derived Cells into the Central Nervous System in Models of Neurodegeneration," The Journal of Comparative Neurology, Dec. 1, 2013, vol. 521, No. 17, pp. 3863-3876.
Landis J.R., et al., "The Measurement of Observer Agreement for Categorical Data," Biometrics, Mar. 1977, vol. 33, No. 1, pp. 159-174.
Larsen H.P., et al., "Matrix Metalloproteinase-9 Facilitates Remyelination in Part by Processing the Inhibitory NG2 Proteoglycan," Journal of Neuro science, Dec. 2003, vol. 23(35), pp. 11127-11135.
Le Blanc K., et al., "Mesenchymal Stem Cells Inhibit and Stimulate Mixed Lymphocyte Cultures and Mitogenic Responses Independently of the Major Histocompatibility Complex," Jan. 2003, vol. 57, No. 1, pp. 11-20.
Leppanen J., et al., "Autism and Anorexia Nervosa: Longitudinal Prediction of Eating Disorder Outcomes," Front Psychiatry, Sep. 2, 2022, vol. 13, 30 pages.
Li J.F., et al., "The Potential of Human Umbilical Cord-Derived Mesenchymal Stem Cells as a Novel Cellular Therapy for Multiple Sclerosis," Cell Transplantation, 2014, vol. 23 No. 1, pp. S113-S122.
Li P., et al., "Transplantation of Human Umbilical Cord-Derived Mesenchymal Stems Cells for the Treatment of Becker Muscular Dystrophy in Affected Pedigree Members," International Journal of Molecular Medicine, Apr. 2015, vol. 35, No. 4, pp. 1051-1057.
Li Q., et al., "Changes in Growth Factor Levels in the Cerebrospinal Fluid of Autism Patients After Transplantation of Human Umbilical Cord Blood Mononuclear Cells and Umbilical Cord-Derived Mesenchymal Stem Cells," Genetics and Molecular Research, May 23, 2016, vol. 15, No. 2, 8 pages.
Li X., et al., "Safety and Efficacy of Intracoronary Human Umbilical Cord-Derived Mesenchymal Stem Cell Treatment for Very Old Patients with Coronary Chronic Total Occlusion," Current Pharmaceutical Design, 2015, vol. 21, No. 11, pp. 1426-1432.
Liang J., et al., "Transplantation of Mesenchymal Stem Cells in a Laryngeal Carcinoma Patient with Radiation Myelitis," Stem Cell Research Therapy, 2015, vol. 6, No. 213, 4 pages.
Lio G., et al., "Actionable Predictive Factors of Homelessness in a Psychiatric Population: Results from the REHABase Cohort Using a Machine Learning Approach," International Journal of Environmental Research and Public Health, Sep. 27, 2022, vol. 19, No. 19, 12 pages.
Little K.G., et al., "Psychometric Evaluation of a Proposed Alzheimer's Aggression Scale," American Journal of Alzheimer's Disease & Other Dementias, Aug. 2011, vol. 26, No. 5, pp. 373-380.
Lord C, et al., "The Autism Diagnostic Observation Schedule-Generic: A Standard Measure of Social and Communication Deficits Associated with the Spectrum of Autism," Journal of Autism and Developmental Disorders, Jun. 2000, vol. 30, No. 3, pp. 205-223.
Louveau A., et al., "Structural and Functional Features of Central Nervous System Lymphatic Vessels," Nature, Jul. 16, 2015, vol. 523, No. 7560, pp. 337-341.
Ma S., et al., "Immunobiology of Mesenchymal Stem Cells," Cell Death & Differentiation, Feb. 2014, vol. 21, No. 2, pp. 216-225.
Mahoney W.J., et al., "Reliability and Accuracy of Differentiating Pervasive Developmental Disorder Subtypes," Journal of the American Academy of Child and Adolescent Psychiatry, Mar. 1998, vol. 37, No. 3, pp. 278-285.
Malkova N.V., et al., "Maternal Immune Activation Yields Offspring Displaying Mouse Versions of the Three Core Symptoms of Autism," Brain, Behavior, and Immunity, May 2012, vol. 26, No. 4, pp. 607-616.
Mandy W,. et al., "Annual Research Review: The Role of the Environment in the Developmental Psychopathology of Autism Spectrum Condition," J. Child Psychol Psychiatry, 2016, vol. 57, pp. 271-292.
Martin N.A., et al., "Expressive One-word Picture Vocabulary Test 4," Academic Therapy Publications, 2011, Retrieved from the internet: URL: https://www.academictherapy.com/detailATP.tpl?eqskudatarq=8547-8.
Mason J.L., et al., "Insulin-Like Growth Factor-1 Inhibits Mature Oligodendrocyte Apoptosis during Primary Demyelination," The Journal of Neuroscience, Aug. 1, 2000, vol. 20, No. 15, pp. 5703-5708.
Mason J.L., et al., "Oligodendrocytes and Progenitors Become Progressively Depleted Within Chronically Demyelinated Lesions," The American Journal of Pathology, May 2004, vol. 164, No. 5, pp. 1673-1682.
Matsushima G.K., et al., "Absence of MHC Class II Molecules Reduces CNS Demyelination, Microglial/Macrophage Infiltration, and Twitching in Murine Globoid Cell Leukodystrophy," Cell, Aug. 26, 1994, vol. 78, No. 4, pp. 645-656.
Matsushima G.K., et al., "The Neurotoxicant, Cuprizone, as a Model to Study Demyelination and Remyelination in the Central Nervous System," Brain Pathology, Jan. 2001, vol. 11, No. 1, pp. 107-116.
Maximo J.O., et al., "The Implications of Brain Connectivity in the Neuropsychology of Autism," Neuropsychology Review, Mar. 2014, vol. 24, No. 1, pp. 16-31.

(56) References Cited

OTHER PUBLICATIONS

Mays R., et al., "Adult Adherent Cell Therapy for Ischemic Stroke: Clinical Results and Development Experience using MultiStem," Transfusion. Apr. 2016, vol. 56, No. 4, pp. 6S-8S.

McCrimmon A., et al., "Test Review: Autism Diagnostic Observation Schedule, Second Edition (ADOS-2) Manual (Part II): Toddler Module," Journal of Psychoeducational Assessment, 2014, vol. 32, No. 1, 88-92.

McMahon E.J., et al., "Peripheral Macrophage Recruitment in Cuprizone-Induced CNS Demyelination Despite an Intact Blood-Brain Barrier," Journal of Neuroimmunology, Sep. 2002, vol. 130, No. 1-2, pp. 32-45.

Miao X., et al., "Umbilical Cord Mesenchymal Stem Cells in Neurological Disorders: A Clinical Study," Indian Journal of Biochemistry and Biophysics, Apr. 2015, vol. 52, No. 2, pp. 140-146.

Mildner A., et al., "Microglia in the Adult Brain Arise from Ly-6chiccr2+ Monocytes Only Under Defined Host Conditions," Nature Neuroscience, Dec. 2007, vol. 10, No. 12, pp. 1544-1553.

Miron V.E., et al., "Macrophages and CNS Remyelination," Journal of Neurochemistry, Jul. 2014, vol. 130, No. 2, pp. 165-171.

Misumi Y., et al., "Novel Blockade by Brefeldin a of Intracellular Transport of Secretory Proteins in Cultured Rat Hepatocytes," Journal of Biological Chemistry, Aug. 25, 1986, vol. 261, No. 24, pp. 11398-11403.

Molina-Holgado F., et al., "Actions of Exogenous and Endogenous IL-10 on Glial Responses to Bacterial LPS/Cytokines," Glia, Feb. 2001, vol. 33, No. 2, pp. 97-106.

Morgan J.T., et al., "Microglial Activation and Increased Microglial Density Observed in the Dorsolateral Prefrontal Cortex in Autism," Biological Psychiatry, 2010, vol. 68, pp. 368-376.

Murias M., et al., "Electrophysiological Biomarkers Predict Clinical Improvement in an Open-Label Trial Assessing Efficacy of Autologous Umbilical Cord Blood for Treatment of Autism," Stem Cells Translational Medicine, Nov. 2018, vol. 7, No. 11, pp. 783-791.

Murias M., et al., "Validation of Eye-Tracking Measures of Social Attention as a Potential Biomarker for Autism Clinical Trials," Autism Research, Jan. 2018, vol. 11, No. 1, pp. 166-174.

Murtie J.C., et al., "PDGF and FGF2 Pathways Regulate Distinct Oligodendrocyte Lineage Responses in Experimental Demyelination with Spontaneous Remyelination," Neurobiology of Disease, 2005, vol. 19, No. 1-2, pp. 171-182.

Nayak D, et al., "Microglia Development and Function," Annual Review of Immunology, 2014, vol. 32, pp. 367-402.

Nessler J., et al., "Effects of Murine and Human Bone Marrow-Derived Mesenchymal Stem Cells on Cuprizone Induced Demyelination," PLoS One, Jul. 26, 2013, vol. 8, No. 7, 8 pages.

Ooi Y.Y., et al., "Paracrine Effects of Mesenchymal Stem Cells-Conditioned Medium on Microglial Cytokines Expression and Nitric Oxide Production," Neuroimmunomodulation, 2015, vol. 22, No. 4, pp. 233-242.

Pan Y., et al., "Extensive Bone Marrow Necrosis Resolved by Allogeneic Umbilical Cord Blood Mesenchymal Stem Cell Transplantation in a Chronic Myeloid Leukemia Patient," Bone Marrow Transplantation, 2015, vol. 50, No. 9, pp. 1265-1268.

EP Patent App. No. 19781349.6, Extended European Search Report dated Nov. 17, 2021, 11 pages.

Dong et al., "Umbilical cord mesenchymal stem cell (UC-MSC) transplantations for cerebral palsy," Am J Transl Res 2018; 10(3): 901-906.

Sun et al., "Infusion of human unbilical cord tissue mesenchymal stromal cells in children with autism spectrum disorder," Stem Cells Transl Med. 2020;9:1137-1146.

Q Li et al., "Transplantation of umbilical cord blood mononuclear cells increases levels of nerve growth factor in the cerebrospinal fluid of patients with autism," Genetic and Molecular Research 2015; 14 (3) 8725-8432.

Alok Sharma et al., "Autologous Bone Marrow Mononuclear Cell Therapy for Autism: An Open Label Proof of Concept Study Clinical Study," Stem Cells International, vol. 2013.

HCT-MSCs for Children With Autism Spectrum Disorder (ASD) (hCT-MSCs), online publication on clinicaltrials.gov, 2019.

* cited by examiner

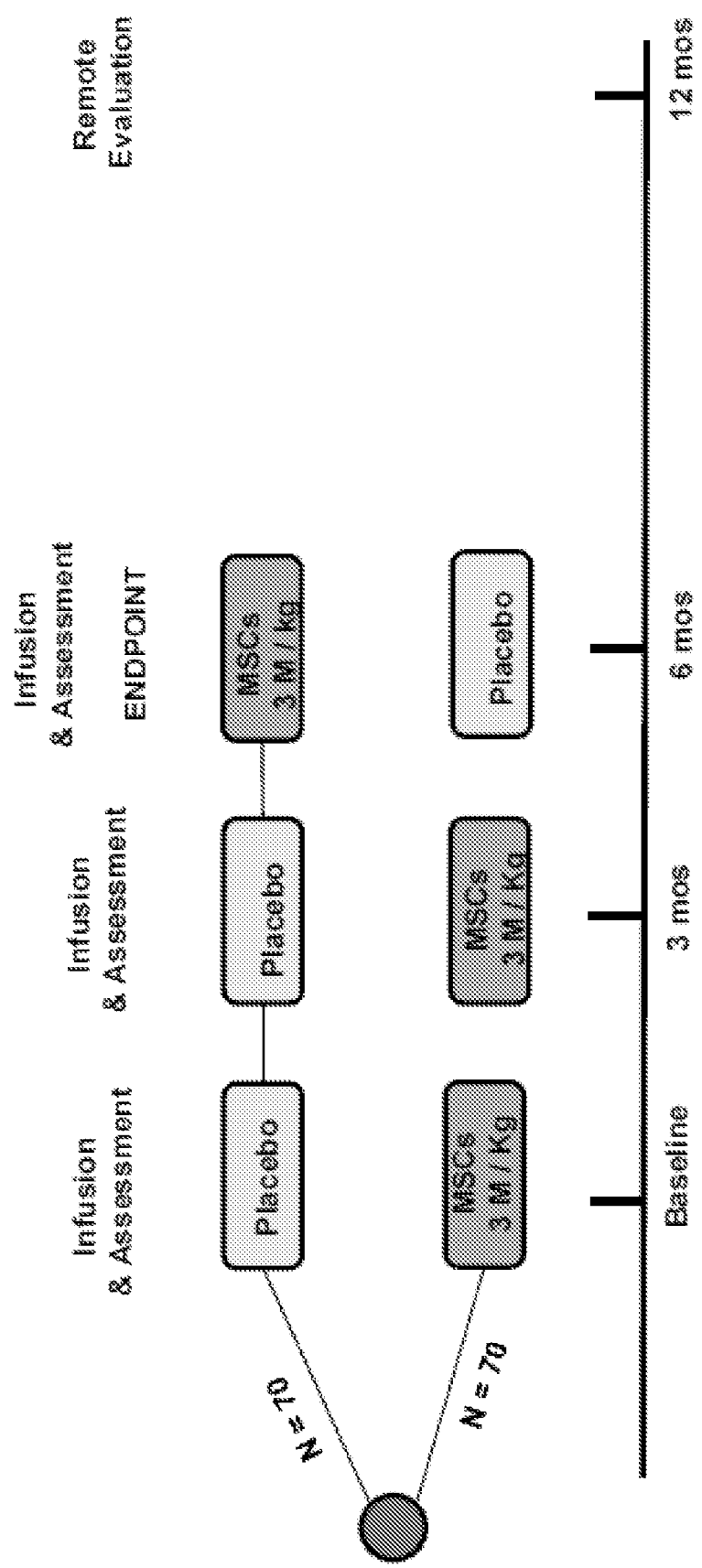

METHODS OF ASSESSING AND TREATING AUTISM SPECTRUM DISORDERS USING HUMAN UMBILICAL CORD TISSUE-DERIVED MESENCHYMAL STROMAL CELLS

PRIORITY

This application is a United States National Stage Application of International Application number PCT/US2019/025716, filed Apr. 4, 2019, which claims the benefit of U.S. provisional application Ser. No. 62/652,722 filed Apr. 4, 2018, each of which is incorporated by reference herein in its entirety.

BACKGROUND OF THE INVENTION

Field of the Invention

The present disclosure provides methods of treating Autism Spectrum Disorder. More particularly, the present disclosure relates to methods of using human cord blood tissue-derived mesenchymal stromal cells to treat Autism Spectrum Disorder.

Description of the Related Art

Autism, or autism spectrum disorder (ASD), is a heterogeneous neurodevelopmental disorder which refers to a range of conditions characterized by impairments in social communication and the presence of repetitive and restricted range of activities, with onset early in life. ASD is a clinical diagnosis based on the presence of specific behavioral symptoms, which can be caused by different combinations of genetic and environmental influences. The term "spectrum" reflects the wide variation in challenges and strengths possessed by each person with autism.

The Centers for Disease Control and Prevention (CDC) estimates prevalence of ASD to be 1 in 68 children in the United States (MMWR Surveill Summ 2014; 63:1-21). This includes 1 in 42 boys and 1 in 189 girls. The majority of individuals with ASD are not able to live independently and require lifelong support or accommodations. Accordingly, the lifetime cost of supporting an individual with ASD is estimated to be $1.4 million. The estimated cost rises to $2.4 million for those who also have an intellectual disability. An estimated 50,000 teens with autism become adults—and lose school-based autism services—each year. Around one third of people with autism remain nonverbal. Around forty percent of people with autism have an intellectual disability. Certain medical and mental health issues frequently accompany autism. They include gastrointestinal (GI) disorders, seizures, sleep disturbances, attention deficit and hyperactivity disorder (ADHD), anxiety and phobias. Current treatment approaches for ASD include medication, behavioral therapy, occupational and speech therapies, and specialized educational and vocational support. Early intensive behavioral intervention is associated with substantially improved outcomes, but even with such intervention, many individuals with ASD remain significantly impaired. While current treatments are supportive, they focus on managing sequelae with physical therapies, medications, and surgery. Currently available medical treatments, such as psychotropic medications, are intended to ameliorate associated co-morbid symptoms, such as irritability, but do not address core ASD symptoms. In light of this, there is a large unmet need for novel, effective treatments targeting core symptoms of ASD.

Both genetic and environmental factors contribute to the etiology of ASD (de la Torre-Ubieta L, et al. Nat Med 2016; 22:345-361; Mandy W, Lai M C. J. Child Psychol Psychiatry 2016; 57:271-292; Sahin M, Sur M. Science 2015; 350). In recent years, despite advances in genetic sequencing and analysis that identified several de novo mutations, copy number variants (CNVs), and single-nucleotide polymorphisms (SNPs) that associate with an increased risk of ASD, it is estimated that less than 20% of cases can be attributed to a known genetic risk factor (Abrahams B S, Geschwind D H. Arch Neurol 2010; 67(4):395-399). Several environmental factors also associate with an increased risk of ASD, including maternal teratogen exposure, environmental toxins, and advanced paternal age. Finally, inflammation and immune dysfunction are implicated in the etiology of ASD.

Although the exact pathophysiology is unknown, observations include abnormal synaptic functioning in areas of the brain (Gao R, Penzes P. Curr Mol Med 2015; 15:146-167; Volk L, et al. Annu Rev Neurosci 2015; 38:127-149), white matter abnormalities (Wolff J J, et al. Am J Psychiatry 2012; 169:589-600), and neuroinflammation (Young A M H, et al. Mol Autism 2016; 7:1-8). Pathogenesis of immune pathology in the brains of patients with ASD may be due to overexpression of immune-related gene networks (Voineagu I, et al. Nature 2011; 474:380-384), presence of maternal antibodies to fetal brain tissue (Braunschweig D, et al. Transl Psychiatry 2013; 3:e277), atypical levels of proinflammatory cytokines (IL-6, TNF-α) in the cerebral spinal fluid (Vargas D L, et al. Ann Neurol 2005; 57:67-81), and excessive microglial activation leading to aberrant neural connectivity pathways (Morgan J T, et al. Biol Psychiatry 2010; 68:368-376; Suzuki K, et al. JAMA Psychiatry 2013; 70:49-58). As such, therapeutic approaches impacting immune modulation or regulation of neural connectivity are logical targets for novel treatments for this population.

Several different observations support a role of immune activation and/or dysregulation in the etiology of ASD. Multiple epidemiologic studies demonstrated an increased rate of ASD in children born to mothers who had an infection during pregnancy. This association is consistent across countries and time periods, having been reported as early as the 1970s after a rubella pandemic in the United States (Chess S. J Autism Child Schizophr 1971; 1(1):33-47) and throughout the decades in Denmark (Atladottir H O, et al. J Autism Dev Disord 2010; 40(12):1423-1430), Sweden, and other countries. Maternal fever, antibiotic treatment, elevated levels of inflammatory markers, and infection with several different microbes have been associated with increased risk for the development of ASD in the child, indicating that the immune response to infection is likely to be more causative than the infectious agent itself. Accordingly, animal models yielded offspring with ASD phenotypes by inducing immune activation in the pregnant mothers (Harvey L, Boksa P. Dev Neurobiol 2012; 72(10):1335-1348; Malkova N V, et al. Brain Behav Immun 2012; 26(4):607-616). Potential pathophysiologic mechanisms include alterations in maternal-fetal immune tolerance (via maternal antibodies and/or cellular immunity) and fetal brain inflammation, which lead to changes in fetal brain cytokine profiles and microglial activation that may be detrimental to neurodevelopment. Evidence of increased numbers of microglia and increased microglial activation in ASD was obtained via autopsy studies, positron emission tomography (PET) brain imaging, and animal models. In addition, abnormal functioning in aspects of the immune system in the brain (such as microglia that are tasked with providing support to neuronal synapses) has been described (Takano T. *Dev Neurosci* 2015; 37(3):195-202; Zantomio D, et al. *Neurosci Biobehav Rev* 2015; 52:172-177). ASD associates with increased plasma cytokine levels, upregulated genes associated with microglial activation, localized inflammation and pathological astrocyte activation (Goines P E, Ashwood P. *Clin Rheumatol* 2013; 33(11):1611-1619). Of note, many cytokines and molecules classically associated with immune regulation are now recognized as also playing a role in normal neurodevelopment. This dual functionality may prove to be an important link in the association of immune-related changes and abnormal neurodevelopment in ASD.

Microglia play critical but incompletely understood roles in propagation and resolution of central nervous system (CNS) damage. These cells modulate neuroinflammation, produce factors that regulate activities of astrocytes, oligodendrocytes, and neurons, and clear debris to provide an environment for oligodendrocytes to begin to remyelinate neurons. In mice, microglia arise from a unique pool of replicating precursors in the brain that is originally derived from the extraembryonic yolk sac early in fetal development. Bone marrow-derived, circulating blood monocytes constitute another potential source of infiltrating phagocytic cells that can exacerbate or ameliorate CNS damage. Although a pathway for circulation of monocytes between lymph and brain parenchyma has recently been described, large numbers of circulating monocytes do not enter the uninjured, adult mouse brain but may infiltrate the CNS following insult such as brain irradiation, chemotherapy or injury, demyelinating conditions, or chronic stress. In some models, these infiltrating blood monocytes may activate inflammation and participate in demyelinating events. In others, blood monocytes may facilitate remyelination.

Synapses are points of communication between neurons, allowing the organized passage of information via electrical and chemical signaling. While there is a period of intensified synaptogenesis early in development, synapses retain plasticity throughout life, enabling, for example, learning and memory. Normal synaptic development and maintenance are essential to proper neuronal function, and abnormalities in either process are associated with multiple neurodevelopmental conditions, including ASD. Mutations in genes encoding synaptic proteins have been implicated in ASD. Additionally, human and animal studies demonstrated a reduction in the size, number, and morphology of dendritic spines and an increase in immature spine morphology in ASD and autism related disorders (Phillips M, Pozzo-Miller L. *Neurosci Lett* 2015; 601:30-40). It is also likely that environmental factors may also influence synaptic changes. These alterations may lead to problematic neuronal connectivity, such as large-range under-connectivity and short-range over-connectivity (Geschwind D H, Levitt P. *Curr Opin Neurobiol* 2007; 17(1):103-111; Maximo J O, et al. *Neuropsychol Rev* 2014; 24(1):16-31).

Altogether, these observations suggest that both environmental and genetic risk factors may contribute to the development of ASD by causing immune dysregulation and/or abnormal neuronal connectivity that adversely affect normal brain development. Therefore, immunomodulatory therapies may have a role in the treatment of children with ASD. Mesenchymal stromal cells (MSCs) are known to have immunomodulatory capabilities, are used in the clinic for numerous applications, and have a favorable safety profile. MSCs may also have potential to effectively treat the underlying pathology and resulting symptoms of children with ASD.

Mesenchymal stromal cells (MSCs) are a heterogeneous group of undifferentiated, pluripotent cells that can be isolated from several different tissues including bone marrow, adipose tissue, and birth tissues (umbilical cord blood, umbilical cord tissue, placenta). While MSCs can give rise to mesodermal tissue types including bone, cartilage, and fat, their primary mechanism of action is thought to result from immunomodulatory and paracrine effects. MSCs demonstrated a multitude of immunomodulatory effects on both humoral and cell-mediated immune responses. These include, but are not limited to, inhibiting B-, T-, NK, dendritic-cell, and microglial proliferation, decreasing pro-inflammatory cytokine production, and blocking neutrophil recruitment. Despite their ability to modulate the immune response, MSCs themselves have low immunogenicity. This allows MSCs to be used in the allogeneic setting across HLA barriers, without the need for donor-recipient HLA matching typical of other cell types. In fact, in a review of 13 human studies of intravenous allogeneic MSC administration, there were no reports of infusional toxicity (Lalu M M, et al. *PLoS One* 2012; 7(10):e47559), supporting the notion that MSCs are "immune-privileged" and can avoid immunological allorecognition. When utilized as a therapeutic cell, MSCs exert effects via trophic signaling. MSCs do not engraft in the recipient.

The treatment of ASD is generally supportive and is often multimodal. Approaches include medication, behavioral therapy, occupational and speech therapies, and specialized educational and vocational support. All of the currently available medical treatments, such as psychotropic medications, are intended to ameliorate associated co-morbid symptoms, such as irritability, but they are not disease-modifying. Despite advances in early diagnosis and behavioral therapies, more effective treatments for children with ASD are needed, and there is a large unmet need for better, more effective and disease-modifying medical treatments for ASD. Human umbilical cord tissue-derived mesenchymal stromal cell (hCT-MSC) therapies may have potential to alleviate ASD symptoms by modulating inflammatory processes in the brain.

SUMMARY OF THE INVENTION

The present disclosure provides methods of treating a patient suspected of having an autism spectrum disorder or a patient suffering from an autism spectrum disorder through the administration of human allogeneic umbilical cord tissue-derived mesenchymal stromal cells ("hCT-MSCs"). The present disclosure provides the benefit of eliminating the restriction of having a banked or otherwise available autologous cord blood unit.

In an aspect, the present disclosure comprises a method of treating a patient having or suspected of having an autism spectrum disorder, the method comprising administering a therapeutically effective amount of human allogeneic cord tissue-derived mesenchymal stromal cells (hCT-MSCs) to the patient. In certain embodiments, the hCT-MSCs are administered systemically. In some embodiments, they are administered intravenously. In some embodiments, they are administered by intravenous infusion over 30 minutes. In certain embodiments, the hCT-MSCs are administered in a single dose or multiple doses. In some embodiments, the hCT-MSCs are administered in one dose, two doses, three doses, or 4 or more doses. In certain embodiments, each dose is administered from about 1 month to about 6 months apart.

In certain embodiments, the patient is administered hCT-MSCs at a dose of about $1.0 \times 10^6$ cells/kg to about $6.0 \times 10^6$ cells/kg. In certain embodiments, the patient is administered hCT-MSCs at a dose per dose about $2.0 \times 10^6$ cells/kg. In certain embodiments, the patient is administered hCT-MSCs at a dose per dose about $3.0 \times 10^6$ cells/kg. In certain embodiments, the patient is administered a total of $6.0 \times 10^6$ cells/kg in two to three doses within 6 months. In some embodiments, the dose comprises greater than 90% CD73+ and CD90+ cells. In some embodiments, the dose comprises less than 10% CD45+, CD3+, or CD31+ cells.

In another aspect, the present disclosure comprises a method of assessing the therapeutic effectiveness of treatment with hCT-MSCs on a patient suffering from an autism spectrum disorder comprising: (a) performing one or more appropriate tests on the patient to establish behavioral and/or biomarker baseline score(s); (b) administering an effective amount of hCT-MSCs to the patient; (c) reevaluating the patient at one or more time points post-administration of hCT-MSCs for the same one or more behavioral and/or biomarker tests set forth in (a); and (d) comparing the results in (c) with the baseline score(s) established in (a). In certain embodiments of this aspect of the disclosure, the behavioral test(s) performed in (a) and (c) comprise one or more of: Vineland Adaptive Behavior Scales-II (VABS-II), Vineland Adaptive Behavior Scales-III (VABS-III), Clinical Global Impression Scale (CGI), Pervasive Developmental Disorder Behavior Inventory (PDDBI), Expressive One-Word Picture Vocabulary Test-4 (EOWPVT-4), Aberrant Behavior Checklist, Sensory Experiences Questionnaire, Repetitive Behavior Scale, Intelligence Scales (Mullen Scales of Early Learning or Stanford-Binet), Language Environment Analysis, ATN GI Symptoms Inventory, and Parenting Stress Index. In certain embodiments of this aspect of the disclosure, reevaluation of the patient in (c) is performed at one or more time point comprising: 2 months, 4 months, 6 months, 9 months, 12 months, and 18 months, 24 months, 2 years, 3 years, 4 years, 5 years, 10 years, 15 years, 20 years or indefinitely post-administration.

BRIEF DESCRIPTION OF THE DRAWINGS

FIG. 3A-3B show general study designs for a Phase II study of hCT-MSC in children with ASD.

DETAILED DESCRIPTION OF THE INVENTION

Figure 1:
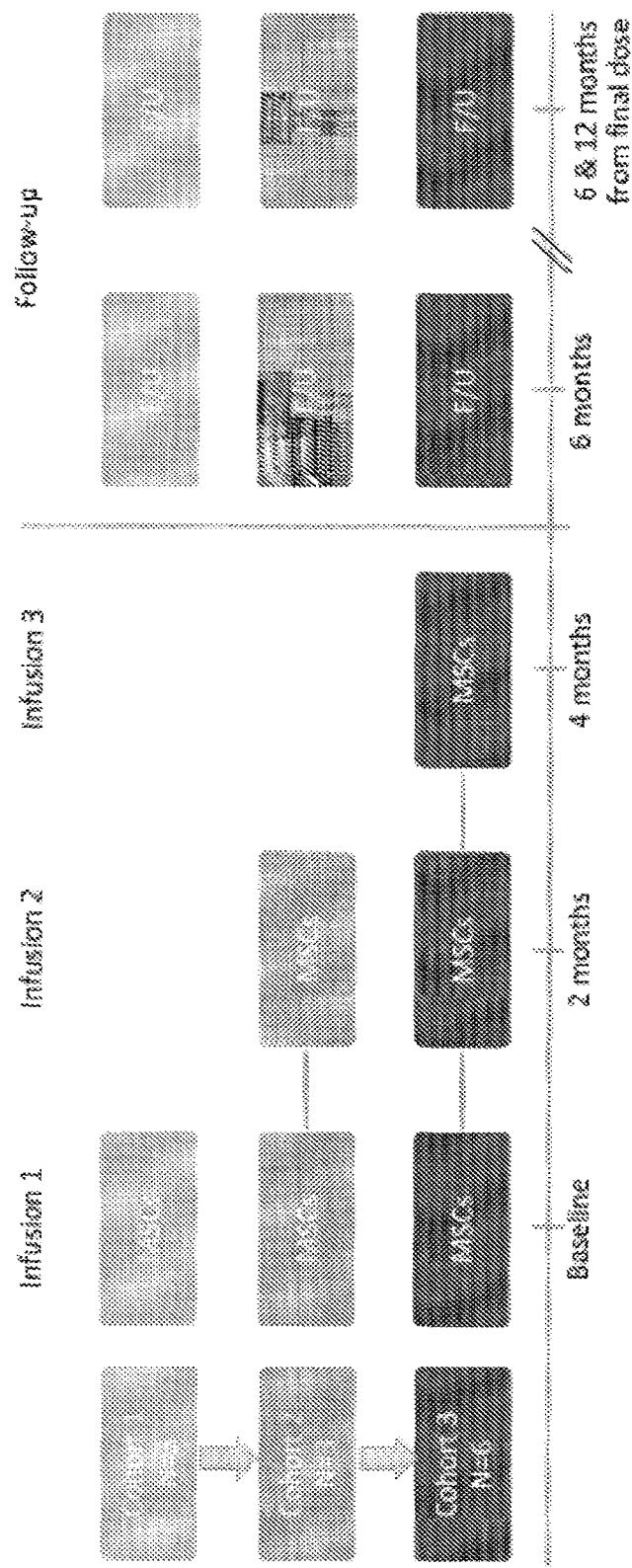
FIG. 1 shows the study design for Phase I study of hCT-MSC in children with ASD.

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

It is also to be understood that unless clearly indicated otherwise by the context, embodiments disclosed for one aspect or embodiment of the invention can be used in other aspects or embodiments of the invention as well, and/or in combination with embodiments disclosed in the same or other aspects of the invention. Thus, the disclosure is intended to include, and the invention includes, such combinations, even where such combinations have not been explicitly delineated.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the term "contacting" includes the physical contact of at least one substance to another substance.

As used herein, "treatment," "therapy" and/or "therapy regimen" refer to the clinical intervention made in response to a disease, disorder or physiological condition (e.g., autism spectrum disorder) manifested by a patient or to which a patient may be susceptible. The aim of treatment includes the alleviation or prevention of symptoms, slowing or stopping the progression or worsening of a disease, disorder, or condition and/or the remission of the disease, disorder or condition (e.g., autism spectrum disorder).

The term "effective amount" or "therapeutically effective amount" refers to an amount sufficient to effect beneficial or desirable biological and/or clinical results. An "effective amount" or "therapeutically effective amount" can be determined by a skilled team of health professionals, and can include use of behavioral tests, biomarker tests, and neurophysiological or neuroimaging tests. For example, behavioral tests may include, but are not limited to, the DSM-5 Checklist, Vineland Adaptive Behavior Scales-III (VABS-III), Clinical Global Impression Scale (CGI), Pervasive Developmental Disorder Behavior Inventory (PDDBI), Expressive One-Word Picture Vocabulary Test-4 (EOWPVT-4), Behavior Assessment for Children-Social Skills subscale, Aberrant Behavior Checklist, Sensory Experiences Questionnaire, Repetitive Behavior Scale, Intelligence Scales (Mullen Scales of Early Learning or Stanford-Binet), Differential Ability Scales, Second Edition (DAS-II), Language Environment Analysis, Preschool Age Psychiatric Assessment, Aberrant Behavior Checklist, ATN GI Symptoms Inventory, Expressive One-Word Picture Vocabulary Test-4 (EOWPVT-4), and Parenting Stress Index. Additional clinical assessments can include, but are not limited to, the Autism Diagnostic Interview-Revised (ADI-R), the Autism Diagnostic Observation Schedule, Second Edition (ADOS-2), the Parent-Child Interaction (PCI) with Noldus EthoVision, the Aberrant Behavior Checklist-Community (ABC-C), the Behavior Rating Inventory of Executive Function-Preschool Version (BRIEF-P), the Behavior Rating Inventory of Executive Function (BRIEF), the Sensory Experiences Questionnaire, Version 2.1 (SEQ 2.1), the Early Life Exposures Assessment Tool (ELEAT), and the Pediatric Quality of Life Inventory (PedsQL) Gastrointestinal Symptoms Scales. Objective neurological tests administered may include, but are not limited to, Eye Gaze Tracking of Social Stimuli (EGT), Electroencephalogram (EEG), Computer Vision Analysis (CVA), and brain Magnetic Resonance Imaging (MRI). In some embodiments, the tests can include equivalent or surrogate tests, which are currently available, or will be available in the future.

As used herein, the term "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like. In certain embodiments, the subject is a human patient that is suspected of having, has, or suffers from, an autism spectrum disorder. In some embodiments, the human subject is a child. In certain embodiments, the human subject is an adult.

As used herein, the terms "autism spectrum disorder" and "autism" are used interchangeably and refer to any range of mental conditions, generally present from early childhood, that are characterized by difficulty in communicating and forming relationships with other people and in using language and abstract concepts. Autism can be diagnosed at any age; however, symptoms generally appear in the first two years of life. According to the Diagnostic and Statistical Manual of Mental Disorders (DSM-5), people with ASD can have difficulty with communication and interaction with other people, restricted interests and repetitive behaviors, and symptoms that hurt the person's ability to function properly in school, work, and other areas of life.

Mesenchymal stromal cells (MSCs) are a heterogeneous group of undifferentiated, pluripotent cells that can be isolated from several different tissues including bone marrow, adipose tissue, and birth tissues (umbilical cord blood, umbilical cord tissue, and placenta). While MSCs can give rise to mesodermal tissue types including bone, cartilage, and fat, their primary mechanism of action is thought to result from immunomodulatory and paracrine effects. MSCs have demonstrated a multitude of immunomodulatory effects on both humoral and cell-mediated immune responses. These include, but are not limited to, inhibiting B-, T-, NK, dendritic-cell, and microglial proliferation, decreasing pro-inflammatory cytokine production, and blocking neutrophil recruitment. Despite their ability to modulate the immune response, MSCs themselves have low immunogenicity. This allows MSCs to be used in the allogeneic setting across HLA barriers, without the need for donor-recipient HLA matching typical of other cell types. In fact, in a review of 13 human studies of intravenous allogeneic MSC administration, there were no reports of infusional toxicity (Lalu M M, et al. PLoS One 2012; 7(10): e47559), supporting the notion that MSCs are "immuneprivileged" and can avoid immunological allorecognition. When utilized as a therapeutic cell, MSCs exert effects via trophic signaling. They do not engraft in the recipient. The exact mechanism of action of MSCs in ASD is the subject of ongoing investigations, but there are several potential means through which MSCs may exert therapeutic effects, including cell-mediated immunomodulation, molecular-mediated neuroprotection, and restoration of functional neurologic circuitry.

As used herein, the term "allogenic" refers to the whole or a part (e.g., a cell, a tissue, an organ, etc.) of an entity which is administered from another entity which is the same species, but is genetically different. Since an allogenic entity is genetically different, the allogenic entity may elicit an immune reaction in an entity (recipient) to which the allo-entity is administered; however MSCs are believed to be immuneprivileged and thus can avoid immunological allorecognition. This means that the recipient patients are able to tolerate the introduction of allogenic hCT-MSCs without eliciting an inflammatory immune response, and that the allogenic hCT-MSCs can survive for extended periods of time without rejection occurring.

Treatment of Autism Spectrum Disorder by hCT-MSCs

In view of the present disclosure, the methods described herein can be configured by the person of ordinary skill in the art to meet the desired need. In general, the disclosed materials, methods, and apparati provide methods of treating a subject suspected of having an autism spectrum disorder or a subject suffering from an autism spectrum disorder comprising, consisting of, or consisting essentially of administering to the subject a therapeutically effective amount of hCT-MSCs and/or a component or mixture of components thereof, such that the autism spectrum disorder is treated.

It is to be understood that as used herein, unless stated otherwise, the term "hCT-MSC" is meant to encompass any format and/or a component or mixture of components thereof as described herein, whether specifically so stated or not.

The patient may be any human or nonhuman animal. In some embodiments, the patient is human. In certain embodiments, the patient is a human under 18 years of age, or in any age range falling within this broader age range. In non-limiting examples, the patient may be 2 years to 18 years old, 2 years to 17 years old, 2 years to 16 years old, 2 years to 15 years old, 2 years to 14 years old, 2 years to 13 years old, 2 years to 12 years old, 2 years to 11 years old, 2 years to 10 years old, 2 years to 9 years old, 2 years to 8 years old, 2 years to 7 years old, 2 years to 6 years old, 2 years to 5 years old, 2 years to 4 years old, 2 years to 3 years old, 3 years to 18 years old, 3 years to 17 years old, 3 years to 16 years old, 3 years to 15 years old, 3 years to 14 years old, 3 years to 13 years old, 3 years to 12 years old, 3 years to 11 years old, 3 years to 10 years old, 3 years to 9 years old, 3 years to 8 years old, 3 years to 7 years old, 3 years to 6 years old, 3 years to 5 years old, 3 years to 4 years old, 4 years to 18 years old, 4 years to 17 years old, 4 years to 16 years old, 4 years to 15 years old, 4 years to 14 years old, 4 years to 13 years old, 4 years to 12 years old, 4 years to 11 years old, 4 years to 10 years old, 4 years to 9 years old, 4 years to 8 years old, 4 years to 7 years old, 4 years to 6 years old, 4 years to 5 years old, 5 years to 18 years old, 5 years to 17 years old, 5 years to 16 years old, 5 years to 15 years old, 5 years to 14 years old, 5 years to 13 years old, 5 years to 12 years old, 5 years to 11 years old, 5 years to 10 years old, 5 years to 9 years old, 5 years to 8 years old, 5 years to 7 years old, 5 years to 6 years old, 6 years to 18 years old, 6 years to 17 years old, 6 years to 16 years old, 6 years to 15 years old, 6 years to 14 years old, 6 years to 13 years old, 6 years to 12 years old, 6 years to 11 years old, 6 years to 10 years old, 6 years to 9 years old, 6 years to 8 years old, 6 years to 7 years old, 7 years to 18 years old, 7 years to 17 years old, 7 years to 16 years old, 7 years to 15 years old, 7 years to 14 years old, 7 years to 13 years old, 7 years to 12 years old, 7 years to 11 years old, 7 years to 10 years old, 7 years to 9 years old, or 7 years to 8 years old.

In some embodiments, the patient is a human up to about 45 years of age, or in any age range falling within the broader age range from about 1 year old to about 45 years old. For example, about 18 to about 45 years old, about 20 to about 45 years old, about 25 to about 45 years old, about 30 to about 45 years old, about 35 to about 45 years old, or about 40 to about 45 years old. In certain embodiments, the patient is a human of any age between 1 and 45 years old. For example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 years old.

The hCT-MSCs may be administered to a patient by any technique known in the art, including systemic delivery. Routes of administration include, but are not limited to, intravenous administration or infusion techniques. Infusion techniques can involve the administration of the hCT-MSCs through a needle or catheter. Typically, infusion means that the hCT-MSCs are administered intravenously or subcutaneously. In some embodiments, the hCT-MSCs are administered systemically. In certain embodiments, the hCT-MSCs are administered intravenously (i.e., by intravenous (IV) injection).

The study focused on (1) the safety of one, two or three intravenous doses of hCT-MSCs in young children with ASD, and (2) the sensitivity to change and feasibility of administration of several different assessment tools in young children with ASD. The first cohort of three (3) patients was administered a single dose of hCT-MSCs. The second cohort of three (3) patients was administered two doses of hCT-MSCs, given two (2) months apart. The third cohort of six (6) patients was administered three doses of hCT-MSCs, with a two (2) month interval between each dose. The main endpoint was safety, for which acute infusion reactions and incidence of infections were assessed during each infusion, within 24 hours after each infusion, 7-10 days after each infusion, 2 months, 4 months and 6 months after each infusion, and 6 and 12 months after the final infusion of hCT-MSCs. Assessment of adverse events across the infusion period and 12 months after the final infusion indicated that the treatment was safe and well tolerated. Adverse events were reported, with 10 out of 12 patients reporting at least one adverse event. Adverse events were mild, expected, and unrelated to the study product. No serious adverse events were reported. A secondary endpoint assessed ASD-specific outcome measures at baseline, prior to the initial infusion of hCT-MSCs, and 6 months after the initial hCT-MSC infusion. Significant improvements in patients' behavior were observed on parent-report measures of social communication skills (Vineland Adaptive Behavior Scale) for patients whose nonverbal IQ was higher at baseline.

Preparation of hCT-MSCs

The human allogeneic umbilical cord-derived mesenchymal stromal cells may be prepared, preserved, and prepared for administration by any methods known in the art. In some instances, the hCT-MSCs may be prepared in a clean room by cutting cord tissue into pieces and mincing and digesting with hyaluronidase, DNase, collagenase, and papain. The resultant cell suspension may then be plated in culture, grown to confluence to establish the P0 culture, and cryopreserved. P1 and P2 cultures may be grown under similar conditions and removed from cultureware. The final product may be derived from the P2 cultures which are harvested into plasmalyte with 5% human serum albumin, washed and cryopreserved in compartment cryobags containing 50-100 million cells in a final concentration of 10% DMSO with dextran. On the day of administration, one compartment may be thawed, diluted in 10-40 mLs of plasmalyte IV solution, placed in a syringe or bag and transported to the bedside for administration.

Administration of hCT-MSCs

The route of administration of the cord blood may be selected by one of skill in the art based on the diseases treated and desired results. In certain embodiments, the hCT-MSCs are administered via peripheral intravenous (IV) infusion.

In some embodiments, the hCT-MSCs of the disclosure may be administered in a single dose. In certain embodiments, the hCT-MSCs may be administered in multiple doses (e.g., two, three, or four or more single doses per treatment) over a time period (e.g., days, weeks, or months). In certain embodiments, the hCT-MSCs of the disclosure may be administered in two or more doses, each dose administered at least about 1 week, about 2 weeks, about 3 weeks apart, about 1 month to about 2 months apart, about 1 month to about 3 months apart, about 1 month to about 4 months apart, about 1 month to about 5 months apart, or about 1 month to about 6 months or more apart. In some embodiments, each dose is administered about 1 week apart. In some embodiments, each dose is administered about 2 weeks apart. In some embodiments, each dose is administered about 3 weeks apart. In some embodiments, each dose is administered about 1 month apart. In some embodiments, each dose is administered about 2 months apart. In some embodiments, each dose is administered about 3 months apart. In some embodiments, each dose is administered about 4 months apart. In some embodiments, each dose is administered about 5 months apart. In some embodiments, each dose is administered about 6 months apart. In some embodiments, each dose is administered about 7 months apart. In some embodiments, each dose is administered about 8 months apart. In some embodiments, each dose is administered about 9 months apart. In some embodiments, each dose is administered about 10 months apart. In some embodiments, each dose is administered about 11 months apart. In some embodiments, each dose is administered about 12 months apart.

In certain embodiments, each dose of hCT-MSCs of the disclosure may be administered over a time period in the range of about 20 minutes to about 75 minutes, e.g., over about 20 minutes to about 60 minutes, or over about 20 minutes to about 50 minutes, or over about 20 minutes to about 40 minutes, or over about 20 minutes to about 30 minutes, or over about 25 minutes to about 70 minutes, or over about 25 minutes to about 60 minutes, or over about 25 minutes to about 50 minutes, or over about 25 minutes to about 40 minutes, or over about 30 minutes to about 70 minutes, or over about 30 minutes to about 60 minutes, or over about 30 minutes to about 50 minutes, or over about 30 minutes to about 40 minutes. In some embodiments, the dose is administered over 30 minutes.

The hCT-MSCs may be present in a therapeutically effective dose. In certain embodiments, the therapeutically effective dose of hCT-MSCs comprises about $1 \times 10^6$ to about $6 \times 10^6$ cells/kg body weight at the time of administration; e.g., about $1 \times 10^6$ to about $2.5 \times 10^6$ cells/kg, or about $1.5 \times 10^6$ to about $3 \times 10^6$ cells/kg, about $1.5 \times 10^6$ to about $2.5 \times 10^6$ cells/kg, or about $2 \times 10^6$ cells/kg. In certain embodiments, the therapeutically effective dose of hCT-MSCs comprises about $1.0 \times 10^6$ cells/kg body weight, or about $2.0 \times 10^6$ cells/kg body weight, or about $2.5 \times 10^6$ cells/kg body weight, or about $3.0 \times 10^6$ cells/kg body weight, or about $4.0 \times 10^6$ cells/kg body weight, or about $5.0 \times 10^6$ cells/kg body weight, or about $6.0 \times 10^6$ cells/kg body weight. In some embodiments, the therapeutically effective dose of hCT-MSCs comprises a total of about $6 \times 10^6$ cells/kg body weight, and is administered in 2-3 doses over a period of about 6 months. One of skill in the art will recognize that suitable volume of the dose may be selected based on the desired route of administration. For example, intravenous administration may use dose volumes in the range of about 5 mL to about 50 mL; e.g., about 5 mL to about 40 mL, or about 5 mL to about 30 mL, or about 5 mL to about 20 mL, or about 5 mL to about 15 mL, or about 10 mL to about 40 mL, or about 10 mL to about 30 mL, or about 10 mL to about 20 mL, or about 10 mL to about 15 mL, or about 20 mL to about 50 mL, or about 20 mL to about 40 mL, or about 20 mL to about 30 mL, or about 30 mL to about 50 mL, or about 30 mL to about 40 mL, or about 40 mL to about 50 mL.

In some embodiments, hCT-MSCs are administered by infusion of a total of about $6 \times 10^6$ cells/kg body weight, and are administered in 2-3 doses over a period of 6 about months. In certain embodiments, hCT-MSCs are administered by infusion of a single dose of $2 \times 10^6$ cells/kg body weight. In certain embodiments, hCT-MSCs are administered by infusion of a single dose of $6 \times 10^6$ cells/kg body weight. In certain embodiments, hCT-MSCs are administered by infusion of two doses of $2 \times 10^6$ cells/kg body weight, each infusion given two months apart. In certain embodiments, hCT-MSCs are administered by infusion of three doses of $2 \times 10^6$ cells/kg body weight, each infusion given two months apart. In certain embodiments, hCT-MSCs are administered by infusion of a single dose of $3 \times 10^6$ cells/kg body weight. In certain embodiments, hCT-MSCs are administered by infusion of a single dose of $4 \times 10^6$ cells/kg body weight. In some embodiments, hCT-MSCs are administered by infusion of two doses of $3 \times 10^6$ cells/kg body weight, each infusion given about two months apart. In certain embodiments, hCT-MSCs are administered by infusion of two doses of $3 \times 10^6$ cells/kg body weight, each infusion given about three months apart. In certain embodiments, hCT-MSCs are administered by infusion of three doses of $3 \times 10^6$ cells/kg body weight, each infusion given about two to three months apart.

In certain embodiments where peripheral IV administration is used, IV fluids may be administered at about 1.0 to about 2.0 times maintenance. For example, IV fluids may be administered post-infusion at about or 1.0 to about 1.5 times maintenance, or about 1.5 to about 2.0 times maintenance. The maintenance IV fluids may be administered for about 30 minutes to about 60 minutes after the infusion of hCT-MSCs. For example, maintenance IV fluids may be administered post-infusion for, e.g., about 30 minutes to about 60 minutes, or about 30 minutes to about 45 minutes, or about 45 minutes to about 60 minutes.

Any suitable intravenous fluids may be used for maintenance post infusion of hCT-MSCs. In certain embodiments, the maintenance IV fluid is a saline solution or Ringer's lactate solution. In certain embodiments, the maintenance IV fluid is 0.25% normal saline solution. In certain embodiments, the maintenance IV fluid is 0.5% normal saline solution.

Multiple assessments are utilized to determine both feasibility of administration and utility as an endpoint for future phase II and III clinical trials. These assessments or tests include both behavioral tests, biomarker tests, and neurophysiological or neuroimaging tests. In some embodiments, behavioral tests performed or administered include, but are not limited to, the DSM-5 Checklist, Vineland Adaptive Behavior Scales-II (VABS-II), Vineland Adaptive Behavior Scales-III (VABS-III), Clinical Global Impression Scale (CGI), Pervasive Developmental Disorder Behavior Inventory (PDDBI), Expressive One-Word Picture Vocabulary Test-4 (EOWPVT-4), Behavior Assessment for Children-Social Skills subscale, Aberrant Behavior Checklist, Sensory Experiences Questionnaire, Repetitive Behavior Scale, Intelligence Scales (Mullen Scales of Early Learning or Stanford-Binet), Differential Ability Scales, Second Edition (DAS-II), Language Environment Analysis, Preschool Age Psychiatric Assessment, Aberrant Behavior Checklist, ATN GI Symptoms Inventory, Expressive One-Word Picture Vocabulary Test-4 (EOWPVT-4), and Parenting Stress Index. Additional clinical assessments can include, but are not limited to, the Autism Diagnostic Interview-Revised (ADI-R), the Autism Diagnostic Observation Schedule, Second Edition (ADOS-2), the Parent-Child Interaction (PCI) with Noldus EthoVision, the Aberrant Behavior Checklist-Community (ABC-C), the Behavior Rating Inventory of Executive Function-Preschool Version (BRIEF-P), the Behavior Rating Inventory of Executive Function (BRIEF), the Sensory Experiences Questionnaire, Version 2.1 (SEQ 2.1), the Early Life Exposures Assessment Tool (ELEAT), and the Pediatric Quality of Life Inventory (PedsQL) Gastrointestinal Symptoms Scales. In some embodiments, objective neurological tests administered may include, but are not limited to, Eye Gaze Tracking of Social Stimuli (EGT), Electroencephalogram (EEG), Computer Vision Analysis (CVA), and brain Magnetic Resonance Imaging (MRI). In addition to the tests recited above, assessments and tests can also include any current or future surrogate or equivalent test.

In some embodiments, one or more of the behavioral tests and objective biomarker tests are performed on a patient with ASD prior to administering an effective amount of hCT-MSCs, to establish baseline behavioral and biomarker scores. In some embodiments, the patient is reevaluated post-administration of an effective amount of hCT-MSCs for the same one or more behavioral tests, objective biomarker tests, and neurophysiological or neuroimaging tests. In some embodiments, the results of the tests performed post-administration of the hCT-MSCs are compared with the baseline results of the same tests performed prior to administration of the hCT-MSCs. In some embodiments, the VABS-III Parent Interview is the primary behavioral endpoint. In some embodiments, CGI, PDDBI and EOWPVT are key secondary behavioral endpoints. In some embodiments, the objective biomarker test is EGT.

In some embodiments, the patient is re-evaluated at one or more time points post-administration of an effective amount of hCT-MSCs, including, but not limited to, 3 months, 6 months, 9 months, 12 months, 18 months, 24 months, 3 years, 4 years, 5 years, 10 years, 20 years or more post-administration of the hCT-MSCs. In certain embodiments, the patient is re-evaluated indefinitely. In some embodiments, the patient is re-evaluated at 3 months post-administration of an effective amount of hCT-MSCs. In some embodiments, the patient is re-evaluated at 6 months post-administration of an effective amount of hCT-MSCs. In some embodiments, the patient is re-evaluated at 9 months post-administration of an effective amount of hCT-MSCs. In some embodiments, the patient is re-evaluated at 12 months post-administration of an effective amount of hCT-MSCs. In some embodiments, the patient is re-evaluated at 18 months post-administration of an effective amount of hCT-MSCs. In some embodiments, the patient is re-evaluated at 24 months post-administration of an effective amount of hCT-MSCs. In some embodiments, the patient is re-evaluated at 3 months, 6 months, 9 months and 12 months post-administration of an effective amount of hCT-MSCs.

Certain aspects of the disclosure are now explained further via the following non-limiting examples.

EXAMPLES

Materials and Methods

Manufacture of Human Umbilical Cord Tissue-derived Mesenchymal Stromal Cells (hCT-MSC)
Cell Source hCT-MSCs were manufactured under cGMP in a clean room ISO 7 facility from allogeneic cells from digested umbilical cord tissue that is expanded in culture, cryopreserved, and banked.
Collection/Recovery Method hCT-MSCs were manufactured from umbilical cord tissue harvested from the placenta from normal term deliveries where the baby's cord blood was donated to the Carolinas Cord Blood Bank, an FDA-licensed, FACT-accredited, public cord blood bank at Duke University Medical Center, after written informed consent from the baby's mother. Cord tissue was harvested from the placentas of male babies delivered by elective C-section after a normal, full-term pregnancy. Donor screening questionnaires were completed by the maternal donor, and maternal blood was tested for communicable diseases by the CLIA-certified donor screening laboratory at the American Red Cross in Charlotte, NC Donors must be eligible for donation to a public cord blood bank for allogeneic use. After delivery of the placenta and cord, the cord blood was aseptically drained from the placenta. Then the cord was dried and cleaned with chloropreps, separated from the base of the placenta, placed in a sterile bottle containing Plasmalyte A, and transported to the Robertson Clinical and Translational Cell Therapy (CT2) GMP cell processing laboratory at room temperature in a validated container.
Donor Screening and Testing Donor screening and testing was performed per Carolinas Cord Blood Bank standard operating procedures to meet all requirements in 21 C.F.R. Part 1271. The screening and testing is current with recommendations and is approved by the FDA under biological license number 1870. Maternal donors of umbilical cord blood were screened and tested for HIV-1, HIV-2, hepatitis B virus (HBV, surface and core antigen), hepatitis C virus (HCV), *Treponema pallidum* (syphilis), CJD (screening only), human T-lymphotropic virus types 1 and 2 (HTLV-1, HTLV-2), Chagas, and CMV. Nucleic acid testing for HIV-1/2/O, HBV, HCV, and West Nile virus were also performed on maternal blood. Screening for Zika virus was also performed.

Because the cord tissue is from donors consented for donation to the Carolinas Cord Blood Bank, they underwent donor screening and infectious disease testing per these Carolinas Cord Blood Bank standard operating procedures. The cord blood-associated maternal samples and cord tissue MSC samples will be retained as reference samples for future testing as part of this study.
Cell Bank System
Master Cell Bank (P0).

The master cell bank (MCB) for hCT-MSC was derived from umbilical cord tissue that was digested, culture expanded over 7 to 14 days to generate approximately $2 \times 10^7$ cells, and frozen in an appropriate number of aliquots of $5 \times 10^6$ cells per vial at a concentration of $1 \times 10^7$ cells/mL in Cryostor CS10 (Biolife, Bothell, WA). More specifically, the tissue was digested using an enzyme cocktail that includes GMP grade collagenase (Roche, Basel, Switzerland), papain (Worthington Biochemical, Lakewood, NJ), USP grade hyaluronidase (Halozyme Therapeutics, San Diego, CA), GMP grade DNAse (EMD Millipore, Billerica, MA), and the Miltenyi Biotec GentleMacs Octo Dissociator (Bergisch Gladbach, Germany). The tissue was then cut into 4 gram pieces, placed in sterile GentleMacs tubes with the enzyme cocktail and digested. After digestion, the resulting material was placed in culture for 7-14 days in Prime XV MSC Expansion XSFM (Irvine Scientific, Santa Ana, CA) and GMP grade Platelet Lysate (Compass Biomedical, Cleveland, OH). Cells were harvested by trypsinization, and cryopreserved as described above. The cells were characterized by flow cytometry using the following markers: CD90, CD73, CD105, CD166, CD31, CD45, and CD3. Cell counts were performed using the Cellometer (Nexcelom, Lawrence, MA) to determine viability, total cell concentration, and viable cell concentration. Sterility testing using BacT/Alert System (BioMerieux, Durham, NC) was performed on supernatants from the MSC cultures. Samples were also retained for *mycoplasma* and endotoxin testing. Each lot for the MCB must meet the criteria in Table 1 below in order to qualify for subsequent expansion.

TABLE 1

Specifications for Inclusion in the MCB (P0) and WCB (P1)

| Test | Specification |
| --- | --- |
| Donor Eligibility | Donor has been determined to be eligible based upon results of donor screening and testing |
| Sterility (BacT/ALERT) | Negative |
| Endotoxin | <5 EU/mL |
| Mycoplasma | Negative |
| Viability | ≥70% Viable |
| Cellular Composition (Identity) | >90% CD90+ |
|  | >90% CD73+ |
|  | <10% CD45+ |
|  | <10% CD31+ |
|  | <10% CD3+ |
|  | CD105+ for information only |
|  | CD166+ for information only |

Working Cell Bank (P1)

The working cell bank (WCB) was generated from the MCB (P0). An appropriate number of vials from the MCB were thawed and placed in HYPERFlasks (Corning Life Sciences, Corning, NY) and expanded for 5-7 days to generate approximately $2.75 \times 10^8$ cells. P1 cells were harvested and cryopreserved in an appropriate number of 5 mL cryovials at a concentration of $1 \times 10^7$ cells/mL in Cryostor CS10. The cells were characterized by flow cytometry using the following markers CD90, CD73, CD166, CD31, CD45, CD3, and CD105. Cell counts were performed using the Cellometer to determine viability, total cell concentration, and viable cell concentration. Sterility testing using BacT/Alert System was performed on culture supernatants. Samples were also retained for *mycoplasma* and endotoxin testing. Each lot for the WCB must meet the criteria in Table 1 above in order to qualify for subsequent expansion.
Final Study Material (P2)

The final study material was generated from the WCB (P1). An appropriate number of vials from the WCB were thawed and placed in 20 HYPERFlasks and expanded for 5-7 days to generate approximately $1.25 \times 10^9$ cells. P2 cells were harvested and cryopreserved in CryoPRO 5 compartment bags (SynGen, Sacramento, CA) at a concentration of $1 \times 10^7$ to $2 \times 10^7$ cells/mL in Plasmalyte A (Baxter Healthcare, Deerfield, IL) with 5% HSA (Grifols, Barcelona, Spain) and 10% DMSO (Akron Biotech, Boca Raton, FL). The cells were characterized by flow cytometry using the following markers CD90, CD73, CD166, CD31, CD45, CD3, and CD105. Cell counts were performed using the Cellometer to determine viability, total cell concentration, and viable cell concentration. Sterility testing using BacT/Alert System was performed on culture supernatants. Samples were also retained for *mycoplasma* and endotoxin testing. Each lot must meet the criteria in Table 2 below to be qualified for clinical use.

TABLE 2 hCT-MSC Qualification Criteria for P2 Cultures

| Test | Specification |
| --- | --- |
| Sterility (BacT/ALERT) | Negative |
| Endotoxin | <5 EU/mL |
| Mycoplasma | Negative |
| Viability | ≥70% Viable |
| Cellular Composition (Identity) | >90% CD90+ |
| | >90% CD73+ |
| | <10% CD45+ |
| | <10% CD31+ |
| | <10% CD3+ |
| | Report % CD105+ (for information only) |
| | Report % CD166+ (for information only) |
| P53 Mutation | Mutation not detected |
| Maternal cells | Negative |
| Potency | ≥70% suppression of T cell proliferation in a 3rd party MLC assay |

TABLE 3

Reagents Used in Manufacture

| Item Name/Description | Manufacturer | Grade |
| --- | --- | --- |
| Plasmalyte A | Baxter Healthcare - Deerfield, IL | USP |
| Hylenex (NDA 21859/S-023) | Halozyme Therapeutics - San Diego, CA | USP |
| Dulbecco's Phosphate Buffered Saline | Thermo Fisher Scientific - Waltham, MA | GMP |
| Benzonase Nuclease | EMD Millipore - Billerica, MA | GMP |
| Papain | Worthington Biochemical - Lakewood, NJ | Certified free of animal materials |
| Liberase | Roche - Basel, Switzerland | GMP |
| Hanks Balanced Salt Solution | GE Healthcare - Cardiff, UK | GMP |
| Prime-XV MSC Expansion XSFM | Irvine Scientific - Santa Ana, CA | GMP |
| Platelet Lysate | Compass Biomedical - Cleveland, OH | GMP |
| TrypLE Select 10X | Invitrogen - Carlsbad, CA | GMP |
| Cryostor CS10 | Biolife - Bothell, WA | GMP |
| 25% Human Serum Albumin | Grifols - Barcelona, Spain | Pharmaceutical for Injection |
| DMSO/Dextran (55% w/v DMSO, 5% w/v Dextran 40) | Akron Biotech - Boca Raton, FL | GMP |

Preparation of Human Umbilical Cord Tissue-derived Mesenchymal Stromal Cells (hCT-MSC)
Method of Cell Collection/Processing/Culture Conditions All manufacturing was performed in the CT2 GMP facility. The clean room was maintained monitored, and cleaned according to protocol, and all staff members were adequately trained and properly gowned. Training was documented as per SOP. Personnel follow approved protocols maintained by MasterControl, the document tracking system validated for the CT2 GMP facility. The following SOPs describe gowning and cleaning and are available upon request: CT2-SOP-003, CT2 Facility Access and Use; CT2-SOP-004, Gowning Procedures for CT2 GMP Facility; CT2-SOP-006, Cleaning and Sanitation of Classified Areas in CT2 GMP Facility; CT2-SOP-009, Materials, Product, Equipment, and Waste Transfer in and out of the CT2 GMP Facility.

hCT-MSC starting material was umbilical cord tissue that was donated by mothers after written informed consent. The cord tissue used for manufacturing was harvested from a term placenta obtained from an uncomplicated elective C-section delivery in the operating room and assigned a 12-digit ISBT bar code identifier at the time of collection. Once the cord tissue arrived in the CT2 GMP facility, it was assigned a new 12-digit ISBT bar code identifier specific to the CT2 GMP facility and tracked throughout the manufacturing process of hCT-MSC. This new bar code identifier is linked to the original ISBT number that was assigned to the tissue at the collection site. Donor screening and testing must meet specifications for cord blood licensure for hCT-MSC to be banked.

Processing of Cord Tissue (CT2-MSC-002) to Generate P0 (MCB)

Day zero for manufacturing was initiated upon receiving a male donor umbilical cord tissue. The cord tissue was delivered to the CT2 facility by a trained courier in a container that contains Plasmalyte A. A visual inspection was performed upon receipt to ensure the cord tissue meets requirements for processing. A 12-digit bar code was assigned to the cord tissue at time of collection and linked to a new 12-digit ISBT bar code identifier that was assigned once the tissue arrived at the CT2 facility. A sufficient number of bar code labels for all batch records, instrument print outs, tubes, vials, etc. were issued and reconciled at the conclusion of the manufacturing run.

In a biosafety cabinet, the cord tissue was weighed and cut into approximately 4 gram pieces. The cord tissue pieces were placed in sterile tubes with the enzyme cocktail containing Liberase, Hylenex, Papain, and Benzonase (see Table 3). The tissue pieces were then minced and digested on the Miltenyi Biotec Octo GentleMacs Dissociator. After dissociation, the digested tissue was filtered, centrifuged, and plated in a one layer CellSTACK (Corning Life Sciences, Corning, NY) containing Prime XV MSC Expansion XSFM supplemented with 1% platelet lysate and incubated at 37° C. with 5% CO2.

Media Exchanges and Harvest (CT2-MSC-003) (MCB)

Within the first three days of culture, the CellSTACK was briefly removed from the incubator and observed under the microscope for any visual evidence of contamination and/or any unusual morphology or atypical growth. Then all of the medium was removed from the flask and replaced with an equal volume of fresh Prime XV MSC Expansion XSFM and 1% platelet lysate. The flask was returned to the incubator until day 7.

On day 7, the CellSTACK was briefly removed from the incubator and observed under the microscope for any visual evidence of contamination and/or any unusual morphology or atypical growth. If 80-90% confluency of the culture was not reached, all of the medium was removed from the flask and replaced with an equal volume of fresh Prime XV MSC Expansion media and 1% platelet lysate. The flask was returned to the incubator.

The P0 CellSTACK was harvested between days 7 and 14, once 80-90% confluency was reached. On the day of harvest, the CellSTACK was removed from the incubator and observed under the microscope for any visual evidence of contamination and/or any unusual morphology or atypical growth. Cells were removed from the CellSTACK using 1× TrypLE, counted, and cryopreserved in Cryostor CS10. Cells were frozen in aliquots of approximately $5 \times 10^6$ cells at a concentration of $1 \times 10^7$ cells/mL in 2 mL cryovials using a controlled rate freezer. Cells were stored in vapor phase in a liquid nitrogen freezer. The residual culture medium was inoculated into aerobic and anaerobic culture bottles for sterility testing. An aliquot of cells was removed for cell characterization, *mycoplasma*, and endotoxin testing.

Thawing and Expansion of P0 to Generate P1 (CT2-MSC-005) (WCB)

P0 vials were thawed in a 37° C. water bath and four HYPERFlasks were seeded with $1.7 \times 10^6$ cells each in Prime XV MSC Expansion Medium. Cells were incubated at 37° C. with 5% $CO_2$. The P1 HYPERFlasks were harvested between days 5-7, once 80-90% confluency was reached.

Harvest of P1 (CT2-MSC-005) (WCB)

On the day of harvest, the HYPERFlasks were removed from the incubator and observed under the microscope for any visual evidence of contamination and/or any unusual morphology or atypical growth. Cells were removed from the HYPERFlasks using 1× TrypLE, counted, and cryopreserved in vials in Cryostor CS10. Cells were frozen in aliquots of approximately $4.5 \times 10^7$ cells at a concentration of $1 \times 10^7$ cells/mL in 5 mL cryovials using a controlled rate freezer. Cells were stored in vapor phase in a liquid nitrogen freezer. The used culture medium was inoculated into aerobic and anaerobic culture bottles for sterility testing. An aliquot of cells was removed for cell characterization, *mycoplasma*, and endotoxin testing.

Thawing and Expansion of P1 (WCB) to Generate P2 (Study Product) (CT2-MSC-005 FRM4)

P1 vials were thawed and twenty HYPERFlasks were seeded with $1.7 \times 10^6$ cells each in Prime XV MSC Expansion Medium. Cells were incubated at 37° C. with 5% $CO_2$. The P2 HYPERFlasks were harvested between days 5-7 once 80-90% confluency was reached.

Final Harvest-Harvest of P2 (Study Product) (CT2-MSC-005 FRM5)

Figure 4:
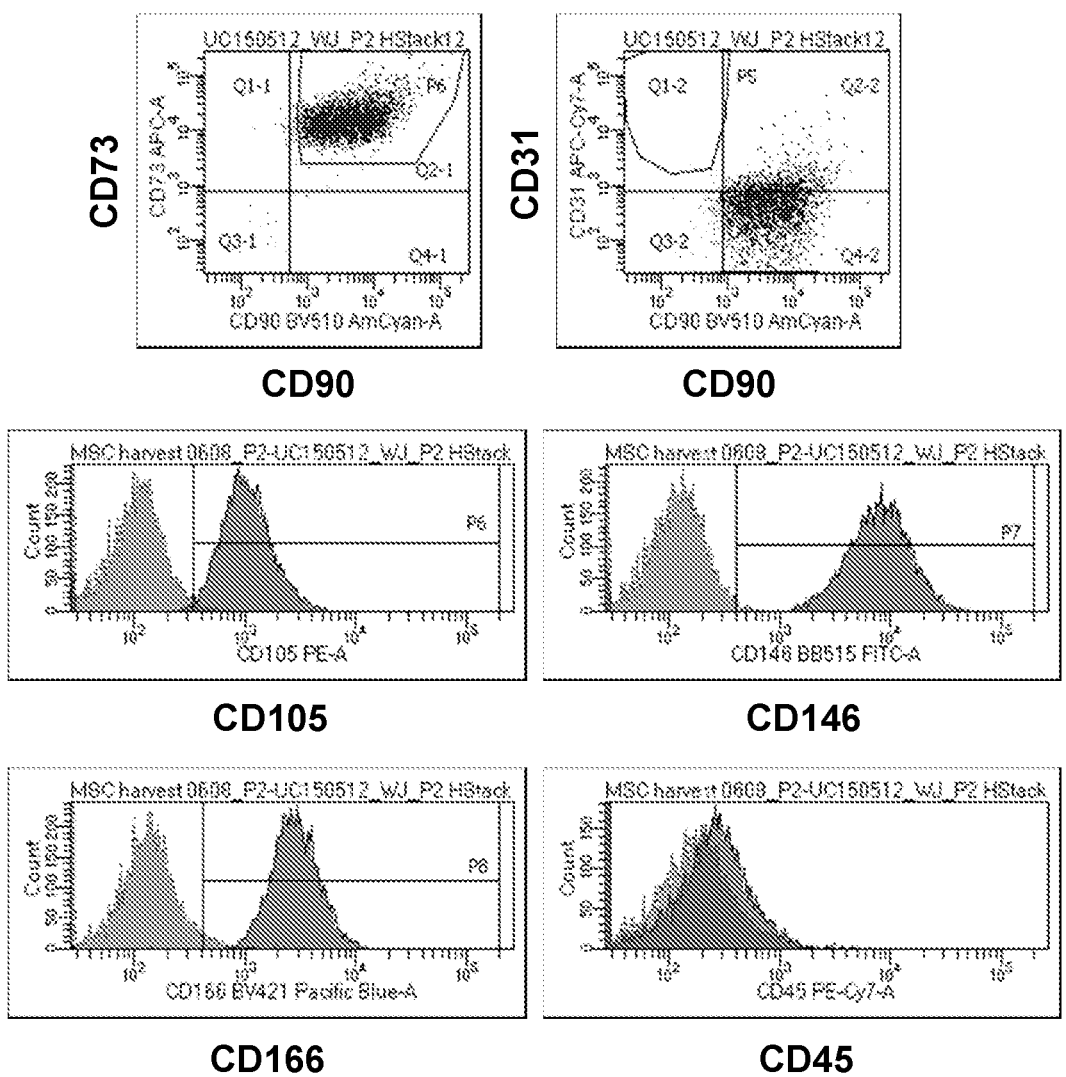
FIG. 4 shows exemplary flow cytometry analysis of the hCT-MSC population for infusion. The populations are greater 90% CD73+ and CD90+, with less than 10% CD45+, CD3+, or CD31+.

On the day of harvest, the HYPERFlasks were removed from the incubator and observed under the microscope for any visual evidence of contamination and/or any unusual morphology or atypical growth. Flasks were washed with PBS and cells were removed from the HYPERFlasks using 10× TrypLE. Cells were then washed with Plasmalyte/5% HSA, counted, and formulated in 20 mL of Plasmalyte/5% HSA. The SynGen CryoPRO (SynGen, Sacramento, CA) was used for the addition of 55% DMSO in Dextran-40 (Akron Biotech, Boca Raton, FL) and for transfer to the CryoPRO 5 compartment bag sets. Approximately $2.5 \times 10^8$ to $5 \times 10^8$ cells were added per bag at a concentration of $1 \times 10^7$ to $2 \times 10^7$ cells/mL in 25 mL of Plasmalyte/5% HSA/10% DMSO. Thus, each compartment contained 50 to 100 million cells. The product was cryopreserved using a controlled rate freezer and stored in vapor phase in a liquid nitrogen freezer. The residual culture medium was inoculated into aerobic and anaerobic culture bottles for sterility testing. An aliquot of cells was removed for testing for *mycoplasma*, endotoxin, cell characterization, and functional assays. The immunophenotyping panel includes CD73 and CD90 to confirm an MSC phenotype, and CD45, CD3, and CD31 to demonstrate little to no contamination with hematopoietic or endothelial cells. The specifications are >90% CD73+ and CD90+, with <10% CD45+, CD3+, or CD31+(see FIG. 4). The following markers are included for information only: CD105 and CD166. Aliquots of the cell suspension were incubated with fluorescence-labeled antibodies and washed with PBS/HSA buffer. Data was acquired on a BD FACSCanto equipped with DiVa software and analyzed using FCS Express software, previously validated for clinical use. The percentage of cells reacting with each marker is reported on the Certificate of Analysis.

Functional testing was performed on a sample of the P2 cells. hCT-MSCs were expected to differentiate into bone, adipose, and cartilage tissue. Cells were examined for bone differentiation by expression of Osteocalcin, for adipose using Fatty acid binding protein 4 (FABP-4), and for cartilage using aggrecan. The cells were also tested in a mitogen assay to examine the ability of the cells to suppress T cell responses to mitogens. Any lots not meeting testing specifications were discarded.

Process Timing and Intermediate Storage hCT-MSCs were manufactured from umbilical cord tissue in a series of three steps that generates a master cell bank, a working cell bank, and the study product. The product for each step was frozen and stored in vapor phase in liquid nitrogen freezer. A stability program for the frozen product was part of the development of the product.

Final Formulation

On the day of subject treatment, cells were thawed, diluted 1:1 in Plasmalyte A/5% HSA and an aliquot removed for cell count, viability, and sterility testing. Cell count and viability were obtained using the Nexcelom Cellometer Auto 2000. If the cells were ≥70% viable, the final product volume was adjusted to deliver $2 \times 10^6$ cells/kg to the study subject. The cells were transferred to a luer-lock syringe and delivered to the bedside. Plasmalyte is a sterile, nonpyrogenic, isotonic solution containing no antimicrobial agents. Any removed cell suspension was inoculated into aerobic and anaerobic culture bottles for sterility testing.

The hCT-MSC product is stable for up to 4 hours at room temperature. Stability for thawed hCT-MSC product in the final excipient was documented in the Manufacturing of Pilot Processing Lots of MSCs in the CT2 GMP facility report (CT2-2016-019-P).

The syringe was packaged in a shipping container for transport at room temperature to the point of care for administration to the patient. Upon QA review of production batch records and Certificate of Analysis, the product was released for transport to the clinic as per SOP. Both the Certificate of Analysis and the Chain of Custody form accompany the hCT-MSC product. The syringe containing the hCT-MSC product was administered to the study subject upon arrival at the clinic.

Identity

The cellular composition of hCT-MSC is determined by immunophenotyping using a panel of fluorescence-label antibodies to CD73 and CD90 to confirm an MSC phenotype, and CD45, CD3, and CD31 to demonstrate that there is little to no contamination with hematopoietic or endothelial cells. CD105 and CD166 are used as information only. The specifications are >90% CD73+ and CD90+, with <10% CD45+, CD3+, or CD31+(see FIG. 4). Data is acquired on a BD FACSCanto equipped with DiVa software. Data is analyzed using FCS Express software previously validated for clinical use. The percentage of cells expressing each marker is reported on the Certificate of Analysis. Release specifications have been established for CD73, CD90, CD45, CD3, and CD31 based on nonclinical data, results from the pilot processing runs, and input from the medical team relating to subject safety. The percentage of all other markers in the panel are reported for informational purposes. As candidate potency assays emerge, the immunophenotyping data will be correlated so that specifications may be established prior to subsequent IND phases.

As MSCs, these cord tissue-derived products are expected to demonstrate a capacity to differentiate into bone, adipose, and cartilage cells. The differentiation capacity of each cell product is monitored in vitro, using well-defined culture conditions. Ultimately the cells are examined using fluorescence microscopy. Differentiated osteocytes are distinguished by their expression of osteocalcin. Differentiated adipocytes are distinguished by their expression of fatty acid binding protein 4. Finally, differentiated chondrocytes are distinguished by their expression of aggrecan.

To monitor their capacity for immune modulation, the hCT-MSC were assayed for their capacity to suppress T cell responses to mitogens. To explore the potential mechanisms behind this suppression, the cellular responses to interferon-γ was measured. When they are exposed to this pro-inflammatory signal, hCT-MSC increased their expression of indoleamine 2,3-dioxygenase 1 (IDO1). At the same time, the hCT-MSC increased the expression of both the PD-L1 and PD-L2 proteins on their cell surface. These studies suggest that multiple different mechanisms may be associated with the immune modulation mediated by hCT-MSC (data not shown).

Purity

Endotoxin levels will be determined per SOP using Charles River's Endosafe-PTS with FDA-cleared Limulus Amebocyte Lysate (LAL) cartridges. This method is validated for all cell/media combinations to be tested. Up to 250 µL of the final product in Plasmalyte/5% HSA is diluted with endotoxin-free deionized water and tested according to SOP. For release, endotoxin levels must be less than or equal to 5 EU/kg body weight/hour or 5 EU/mL. The anticipated time for administration of the hCT-MSC product is less than one hour. The maximum valid dilution and the conversion from units/kg/time to units/mL were determined during assay validation. The upper limit for endotoxin will be calculated using the weight of each subject prior to release of the product for infusion.

Maternal Cell Testing

All hCT-MSC products selected for use in the clinical trial will have been typed for high resolution HLA Class 1 (ABC) and Class II (DR) prior to final selection for manufacturing of P1 and P2. This technique is highly sensitive for the detection of third party (maternal) HLA alleles. Only units free of maternal cell contamination will be selected for P1 and P2 (WCB and final product) manufacturing.

P53 Mutation Testing

Testing for the presence of the P53 mutation will be performed on all lots of P2 cultures selected for use in the clinical trial by the Duke University Clinical Molecular Diagnostics Laboratory. Genomic DNA extracted from cell preparations is used for PCR amplification of TP53 exons 4 through 11. Purified DNA amplicons are then sequenced using universal M13 forward and reverse primers and the Big Dye Terminator Cycle Sequencing Kit. Products are purified with the Big Dye XTerminator Purification Kit and resolved using the ABI 3130×1 Genetic Analyzer. Data is analyzed using the ABI Data Collection software, Sequencing Analysis software and SeqScape software.

Potency

Potency may be determined by in vitro expression assays under development, with results reported as informational testing. As recommended in the FDA Guidance for Industry: Potency Tests for Cellular and Gene Therapy Products (January 2011), development of a potency assay has begun in pre-clinical development and will continue throughout the clinical phases with the goal of a validated potency assay or assay matrix prior to filing a BLA. A wide range of product attributes will be measured in addition to those required for release, while the mechanism of action is studied and the product's relevant biological activities are characterized. As manufacturing practices evolve candidate potency assays will be re-evaluated and qualified as appropriate.

Viability

Viability is determined using the Nexcelom Cellometer Auto 2000 as per SOP. A minimum of 70% viability of the hCT-MSC product is required for release.

Cell Number/Dose

There were three dosing cohorts in this study. The study enrolled twelve subjects. The first cohort of three patients received a single dose. If there are no safety concerns, the second cohort of three patients received two doses, given two months apart. The third cohort consisted of six patients, each of whom received three hCT-MSC infusions with a two-month interval between doses. Subjects were dosed with $2\times10^6$ hCT-MSCs/kg based on the post thaw count. Total cell count on day of infusion was determined by automated cell count using the Cellometer Auto 2000. The cell count after thaw was used to calculate the dose for final formulation as described above. Any cells in excess of those required for release testing and final formulation may be used for informational testing for the development of a potency assay.

Safety Evaluation Criteria

Patients were observed during each infusion and monitored for infusion reactions for 24 hours after each infusion. Additional Adverse Events (AE) were identified through phone interviews with patients' parent/guardian at 7-10 days, 2 months and 4 months after each infusion, and 6 months and 12 months after the last infusion with hCT-MSCs, as well as in person at the baseline and 6-month clinic visits. For analysis, verbatim AE terms were mapped onto standard terminology defined by the Common Terminology Criteria for Adverse Events (CTCAE) version 4.0 and summarized according to severity and relationship to the intervention as judged by the investigator.

Clinical Assessments

Multiple assessments were utilized to determine both feasibility of administration and utility as an endpoint for future phase II and III clinical trials. Initial assessments were performed to confirm diagnosis of ASD, based on the DSM-5 Checklist, which was informed by the Autism Diagnostic Observation Schedule, Second Edition (ADOS-2) and the Autism Diagnostic Interview-Revised (ADI-R)-Shortened Version. Diagnostic evaluations were completed by clinical research staff certified as research reliable in the administration of the ADOS-2 and ADI-R. Additional assessments were performed to establish a baseline for each patient and to determine utility as an endpoint for future phase II and III clinical trials. These included the Vineland Adaptive Behavior Scales-III (VABS-III), Clinical Global Impression Scale (CGI), Pervasive Developmental Disorder Behavior Inventory (PDDBI), Intelligence Scales (Mullen Scales of Early Learning, AGS Edition, and Differential Ability Scales, Second Edition (DAS-II). Other commonly-used assessments are the Expressive One-Word Picture Vocabulary Test-4 (EOWPVT-4), score, PDDBI score, and CGI-I score).

The Autism Diagnostic Interview-Revised (ADI-R), Shortened Version (Rutter M, et al. ADI-R. Torrence, CA: Western Psychological Services; 2008) is a comprehensive parent interview that assesses early functioning in three domains: language/communication, reciprocal social interactions, and restricted, repetitive, and stereotyped behaviors and interests. The research reliable interviewer follows standardized procedures for obtaining information and recording responses. Interview questions include various content areas, including the patient's background, behaviors, early development and milestones, language acquisition, current communicative functioning, social development and play, interests and behaviors, and any other clinically relevant behaviors. The ADI-R shortened version follows the same protocols as the standard ADI-R, but some of the questions not required for obtaining a score are omitted. The ADI-R shortened version takes between 90-150 minutes depending on the age of the child and the complexity of behaviors. The ADI-R was completed during the screening process for each patient and used to help inform a DSM-5 diagnosis of ASD.

The Autism Diagnostic Observation Schedule, Second Edition (ADOS-2) (Lord C, et al. Autism Diagnostic Observation System. Los Angeles, CA: Western Psychological Services; 1999) is a standardized observational assessment of core ASD symptomatology. Age- and language-dependent modules are composed of a series of activities led by a trained, research-reliable clinician to observe the child's communication, social interactions, play, and restricted and repetitive behaviors. ADOS-2 protocols are designed to elicit behaviors that directly map onto the ASD DSM-5 criteria. The ADOS-2 can be administered to toddlers as young as 12 months of age. Age and verbal ability are used to determine the appropriate module (toddler, 1, 2, 3 or 4). For each ADOS-2 Toddler Module assessment, a score will be generated using the Toddler Module Calibrated Severity Scores developed by Esler et al. (2015) to facilitate comparison to other modules. Severity Scores will also be generated for Modules 1-4. The ADOS-2 takes around 45-60 minutes to administer. This assessment was used to help inform a DSM-5 diagnosis of ASD, and was completed at the baseline visit for each patient.

The Diagnostic Statistical Manual-5 Checklist (DSM-5) is a clinician checklist based off of diagnostic criteria for ASD within the Diagnostic and Statistical Manual of Mental Disorders-5. Diagnostic criteria are taken from the DSM-5, and are utilized in order to confirm appropriate ASD diagnosis for inclusion in the study. This checklist was completed by trained clinicians using clinician's best judgment and was informed by information gathered during the administration of the ADI-R, Shortened Version and the ADOS-2. The DSM-5 was completed at the baseline visit for each patient.

The Mullen Scales of Early Learning, AGS Edition (Mullen E M, Western Psychological Services; 1995) is a cognitive functioning assessment specifically designed for very young children and preschoolers, from birth to 68 months. It measures five scales of cognitive functioning: Gross Motor, Visual Reception, Fine Motor, Expressive Language, and Receptive Language (note: for this study, the Gross Motor subscale will not be administered). Each scale is tested individually, and the exam is not timed. Some of the questions may require parental input in order to assess the child's ability. The exam is interactive and includes toys and manipulatives for the child to engage with during the exam. Test administration time varies from approximately 15 minutes for a one-year-old to an hour for 5-year-olds. The Mullen was used with patients under 4 years, 0 months at the baseline visit, and conducted at the baseline visit only.

The Differential Ability Scales, Second Edition (DAS-II) (Elliott C G. Differential Ability Scales, 2nd ed. San Antonio, Tx: Harcourt Assessment; 2007) is an assessment administered by a trained clinician to observe behavior and compute a score to assess cognitive abilities. This test is appropriate for ages 2 years, 6 months through 17 years, 11 months and will be used for patients aged 4 years, 0 months and older at baseline. This assessment takes about 45 minutes and was conducted at the baseline visit.

The Vineland Adaptive Behavior Scales-III (VABS-III) (Sparrow S, et al. Vineland Adaptive Behavior Scales: Interview Edition. Circle Pines, MN: American Guidance Service; 1984) is a caregiver questionnaire that is used to assess children's adaptive behavior across a wide range of domains. The VABS-III is a well-standardized measure with strong reliability and validity (Balboni G, et al. J Autism Dev Disord 2016; 46:42-52; Perry A, et al. J Autism Dev Disord 2009; 39:1066-1078; Yang S, et al. J Autism Dev Disord 2016; 46:64-73; Sparrow S, et al. Vineland Survey Forms Manual. 2nd ed. Minneapolis, MN; NCS Pearson Inc; 2005) which yields an overall composite score, as well as subscale standard scores in the following domains: Socialization, Communication, Daily Living Skills, and Motor Skills. The VABS-III was collected from each patient's primary caregiver at the baseline and 6-month visits. The Socialization Subscale Score was used to measure improvements in the core ASD symptom of social behavior.

Parent-Child Interaction (PCI) with Noldus EthoVision: During the Parent-Child Interaction Task, Noldus EthoVision will be used. The purpose of the video tracking is to determine whether automated tracking of children's movements related to social approach or avoidance can be reliably administered and provide a valid measure of social communication in children with ASD. This paradigm is designed to automatically track movements related to social approach and avoidance behavior of children with ASD with a familiar adult. The primary dependent variable is the time spend in the periphery of a room versus near the adult. The participant will be observed during two contiguous sessions conducted in the same room comprised of (1) a six-minute free-play session with toys available during which the caregiver will be silently sitting in the corner of the room and (2) a six-minute parent-child interaction, where the parent joins the child for interactive play to see how the child plays with the adult and vice versa. Behavior will be recorded from a ceiling mounted camera and software will be used to automatically track the child's movements. Dependent variables include percentage of session spent in the caregiver region of interest (ROI), latency to approach the caregiver ROI, and percentage of time spent in the periphery ROI. The Parent-Child Interaction Task will be conducted at the baseline, 6, and 12 month visits.

The Clinical Global Impression (CGI) is a commonly used rating scale that measures symptom severity and treatment response or change in behavior between time points. Two versions of the CGI were used: CGI-Severity (CGI-S) and CGI-Improvement (CGI-I). The CGI-S is a 7-point scale indicating the severity of each patient's symptoms of ASD at the time of assessment, relative to the expert rater's past experience with patients who have the same diagnosis. Based on the expert rater's lifetime clinical experience and all available information, each patient was rated as 1: not present (no ASD), 2: ASD symptoms barely evident, 3: mild ASD symptoms, 4: moderate ASD symptoms, 5: moderately severe ASD symptoms, 6: severe ASD symptoms, or 7: very severe ASD symptoms. Each patient was assigned a CGI-S rating at the baseline and 6 month visits. The CGI-I is a 7-point scale indicating the degree of improvement or worsening of ASD symptoms relative to baseline. Based on all available information, each patient was rated as 1: very much improved, 2: much improved, 3: minimally improved, 4: no change, 5: minimally worse, 6: much worse, or 7: very much worse. Each patient was assigned a CGI-I rating at the 6-month visit, and each referenced the degree of improvement or worsening relative to baseline CGI-S rating. All CGI-S and CGI-I ratings were made by highly experienced clinicians with expertise in ASD.

CGI Interview: The CGI Caregiver Interview is completed by a clinician and conducted with the primary caregiver. The interview focuses on the participant's social communication abilities and challenges, restricted interests, repetitive behaviors, and overall functioning. The clinician will obtain details about frequency and quality of behaviors in different contexts, such as at home, in school, and in the community, as well as details about the level of support the child requires to function in each setting. The interview will be completed at the baseline visit and updated at the 6 and 12 month visits. The interview takes around 45 minutes to complete at the baseline visit and will take around 30 minutes to complete at the 6 and 12 month visits. This information is used to make the CGI-I and CGI-S rating.

The Pervasive Developmental Disorder Behavior Inventory (PDDBI) (Cohen I L, et al. J Autism Dev Disord. 33(1):31-45 (2003)) is a caregiver questionnaire that is designed to assess responsiveness to intervention in children with ASD. The PDDBI is an informant-based rating scale that is designed for children ages 1 year, 6 months to 12 years, 5 months. It assesses problem behaviors as well as appropriate social, language, and learning/memory skills. The PDDBI assesses both social impairments typically associated with the active but odd subtype of ASD and development of pro-social skills that are integral to improved reciprocal social behavior. The PDDBI renders raw scores as well as t-scores based on comparisons to a standardized ASD population of caregivers and teachers of children with ASD from a range of racial, ethnic, and socioeconomic backgrounds. (Cohen I L, Sudhalter V. PDD Behavioral Inventory Professional Manual. Lutz, F L: Psychological Assessment Resources Inc; 2005). The PDDBI was collected from each patient's primary caregiver at the baseline and 6-month visits.

The Expressive One-Word Picture Vocabulary Test-4 (EOWPVT-4) (Martin N A, Brownell R. EOWPVT-4. 4th ed. Novator, CA: Academic Therapy Publication Inc; 2011) is a clinician-administered assessment which measures an individual's ability to match a spoken word with an image of an object, action, or concept. It tests an individual's ability to name, with one word, objects, actions, and concepts when presented with color illustrations. This test is appropriate for ages 2-80 years and takes about 10-30 minutes to complete; completion time is determined by an individual's verbal ability. This assessment is conducted at baseline, 6, and 12 month visits.

Information about the number of hours that patients were involved in behavioral, speech-language, occupational, and other behavioral therapies and educational services the child received were not included within this study, but can be included via structured Intervention History Interviews with the parent.

Parent Caregiver Questionnaires

All caregiver questionnaires are completed online through a Duke approved EDC system or by paper. The EDC survey tool is available for Duke users through a university-wide site license. The EDC is integrated with Duke's NetID authentication system but allows sharing of surveys with non-Duke users.

Pervasive Developmental Disorder Behavior Inventory (PDDBI). The PDDBI was developed to assess responsiveness to intervention in children with ASD. The PDDBI is an informant-based rating scale that is designed for children 1 year, 6 months to 12 years, 5 months. It assesses problem behaviors as well as appropriate social, language, and learning/memory skills. The PDDBI assesses both social impairments typically associated with the active but odd subtype of ASD and development of pro-social skills that are integral to improved reciprocal social behavior. The PDDBI renders raw scores as well as t-scores based on comparisons to a standardized ASD population. The PDDBI has been validated in a PDDBI development sample of 311 children between the ages of 1 and 17 years old. This is a parent questionnaire with 188 items that takes approximately 30-45 minutes to complete. The PDDBI is administered at the baseline, 6, and 12 month visits and remotely at 3 and 9 months.

Aberrant Behavior Checklist-Community (ABC-C). This parent-completed rating scale is used to measure aberrant behaviors associated with ASD, with an emphasis on social withdrawal. The ABC-C is a validated scale that can assess drug and other treatment effects in studies with developmentally-disabled individuals. Separate factor analyses of data from samples of institutionalized participants (n=418 [mean age 29.5 yrs.] in Stage 1 and n=509 [mean age 25.9 yrs.] in Stage 2) resulted in a 5-factor scale comprising 58 items. The factors were labeled as (1) Irritability, Agitation, Crying; (2) Social Withdrawal; (3) Stereotypic Behavior; (4) Hyperactivity, Noncompliance; and (5) Inappropriate Speech. The ABC-SQW has been used in other clinical trials focusing on the core social and communication symptoms of autism. The ABC-C has 58 items, and each item is rated as 0=not at all a problem, 1=the behavior is a problem, but slight in degree, 2=the problem is moderately serious, or 3=the problem is severe in degree. This parent-completed rating scale takes approximately 10 to 15 minutes to complete. The ABC-C is completed at the baseline, 6, and 12 month visits and remotely at 3 and 9 months.

Intervention History Questionnaire. This questionnaire is completed by a primary caregiver to obtain detailed information on behavioral health interventions that the child/family has been involved in over the past 3 months or since the questionnaire was last administered. Information is collected about the type and quantity of interventions, services, and treatments the child is receiving. This questionnaire is administered on a monthly basis.

Behavior Rating Inventory of Executive Function-Preschool Version (BRIEF-P).

This assessment is a questionnaire for parents of preschool-aged children that enables professionals to assess executive function behaviors in the home and preschool environments. It is designed for a board range of preschool children including those with emergent learning disabilities and attentional disorders, language disorders, traumatic brain injuries, lead exposure, pervasive developmental disorders, and other developmental neurological, psychiatric, and medical conditions. The BRIEF-P contains 63 items and takes about 15 minutes to complete. The BRIEF-P is used with participants under the age of 5 years at baseline. This questionnaire is completed at baseline, 6, and 12 month visits.

Behavior Rating Inventory of Executive Function (BRIEF). This assessment is a questionnaire for parents of school age children that enables professionals to assess executive function behaviors in the home and school environments. The parent form of the BRIEF contains 86 items within eight theoretically and empirically derived clinical scales that measure different aspects of executive functioning: Inhibit, Shift, Emotional Control, Initiate, Working Memory, Plan/Organize, Organization of Materials, and Monitor. The BRIEF takes about 15 minutes to complete and will be used with participants aged 5 years and older at baseline. This questionnaire is completed at baseline, 6, and 12 month visits.

Sensory Experiences Questionnaire, Version 2.1 (SEQ 2.1). The SEQ 2.1 asks parents to respond, on a 5-point Likert scale, to 45 questions about the frequency of their children's responses to sensory stimuli in the context of daily activities and routines. This study will use a modified version that only asks parents to complete the Likert scale questions and omits all open-ended questions. The SEQ 2.1 has been validated for children with autism ages 2-12 years, been shown to discriminate children with ASD from developmental delay and typically developing controls, and has a high internal consistency ($\alpha=0.80$). Summary scores are derived for hyper-responsiveness (SOR). The SEQ 2.1 takes around 10 minutes to complete and is only completed at the baseline visit.

Early Life Exposures Assessment Tool (ELEAT). This is a parent questionnaire that assesses for a multitude of environmental exposures that the parents/child may have been exposed to in the child's early life and development. The questionnaire asks a variety of questions about life before pregnancy, during pregnancy, and during the child's first year of life, and gives a very detailed, quantitative look at any possible food or chemical exposures that may have been harmful. A modified and shortened version of the ELEAT which only includes relevant variables are used for the study. This assessment takes about 10 minutes to complete and is only completed at the baseline visit.

Pediatric Quality of Life Inventory (PedsQL) Gastrointestinal Symptoms Scales. The PedsQL Gastrointestinal Symptoms Scales is a 10 minute parent questionnaire that measures gastrointestinal symptoms in children as over 50% of children with ASD suffer from gastrointestinal discomfort. This assessment is completed at the baseline, 6, and 12 month visits.

Center for Autism and Brain Development (CABD) Demographics Form. The CABD demographics form collects race and ethnicity according to the NIH reporting standards. Additional questions collect data to help characterize the population. This parent questionnaire takes less than 5 minutes to complete and is only completed at the baseline visit.

Neurophysiology and Neuroimaging

Electroencephalography (EEG): EEG is a non-invasive measure of brain activity. A flexible dense array of electrodes (EGI System 400, Electrical Geodesics Inc., Eugene, Oregon) is placed over the head and secured with a chin strap. EEG signals are amplified and sent to recording computer for on-line viewing. EEG is used here to investigate patterns of brain activity elicited by social and non-social stimuli. The EEG takes around 20 minutes and is completed at the baseline, 6, and 12 month visits.

EEG is used to assess changes in cortical activation (as reflected by changes in alpha, theta, and beta rhythms) and functional connectivity (as reflected by changes in EEG coherence) during a baseline condition and while viewing social and non-social stimuli. Alpha oscillations have been shown to emerge from activations of the thalamo-cortical network and have also been demonstrated to be present in subcortical areas, including the hippocampal region. Alpha frequencies result from a reciprocal interplay between excitatory and inhibitory neurons and are influenced by cholinergic, serotonergic, and glutamaterigic mechanisms. Alpha activity increases during a relaxed state and decreases during active stimulus processing. Theta oscillations are especially prominent in the hippocampal region, are influenced by the interaction between glutamatergic and gamma-animobutyric acidergic (GABAergic) neurons, and may correlate with synaptic plasticity.

EEG is recorded during a resting baseline state and while viewing standardized videotaped segments of social (female singing a nursery rhyme) and nonsocial (activated toys) stimuli. In a study of preschool aged children with ASD, alpha and theta EEG power during viewing of social and nonsocial stimuli have been shown to change as a function of behavioral treatment and are specifically correlated with improvements in social behavior. A Phase I open label trial conducted at Duke evaluating the safety and efficacy of autologous umbilical cord blood for treating autism demonstrated normalization of the EEG spectrum reflected in increases in alpha power after treatment. EEG data are recorded from 128-channel dense electrode array Geodesic sensor nets (recorded online with reference to the vertex) at 500 Hz, high-pass filtered at 0.1 Hz and low-pass filtered at 200 Hz. EEG is edited both through automatic artifact-detection software (Net Station 4.4) and hand-editing without knowledge of group membership.

Spectral analyses. EEG data is Fourier-transformed using Welch's method (implemented in Matlab, R2012b). Power estimates will be averaged across electrode groups (right posterior and anterior, left posterior and anterior, midline occipital electrodes) and natural log-transformed to reduce skew. In a previous open label trial evaluating the efficacy of autologous cord blood for improving autism symptoms, significant changes in EEG spectral characteristics also were found post-infusion, which were characterized by increased alpha and beta power and decreased EEG theta power. Furthermore, higher baseline posterior EEG beta power was associated with a greater degree of improvement in social communication symptoms, highlighting the potential for an EEG biomarker to predict variation in outcome.

Eye Tracking (EGT). The EGT is a 15 minute technical assessment using specialized equipment in a controlled setting to track visual attention via eye movements of children with autism. Children with ASD have been found to attend to social stimuli less than typically-developing children. A Phase I open label trial conducted at Duke evaluating the efficacy of autologous cord blood for treating autism demonstrated increases in attention to social stimuli that were correlated with increases in social abilities, reported on the VABS. This assessment is appropriate for children of 1 year to adult. The children are shown videotapes of scenes involving social and nonsocial stimuli. The depending variables include how much time the child spends looking at the social versus non-social stimuli in the videotapes, including the specific aspects of the social stimuli that attract and hold the child's attention. The EGT is conducted at the baseline, 6, and 12 month visits.

Computer Vision Analysis (CVA). The CVA assessment consists of a series of brief dynamic stimuli which are designed to elicit autism symptoms, including attentional responses, facial affect, and motor responses. Computer vision analysis is used to automatically code these behaviors. Studies show that CVA can objectively, reliably and sensitivity quantify autism symptoms. The CVA is conducted at the baseline, 6, and 12 month visits.

Neuroimaging. MRI is used to assess potential structural/anatomic modifications, and functional changes, in the brain before and after cell therapy. MRI images are used to correlate brain iron with ASD symptoms. Changes in MRI images may reflect alterations in astrocyte activity, blood perfusion, fiber tract integrity, brain network integrity, myelin microstructural integrity and brain functional connectivity. In an open label trial evaluating the efficacy of autologous cord blood for treating autism symptoms, improvement on 3 behavioral outcome measures was correlated with increased connectivity between the left temporal pole and the left hippocampus (VABS II $p<0.001$; EOWPVT-4 $p<0.05$; CGI-I $p<0.0001$). Improvement on both the VABS II and the EOWPVT-4 was correlated with increased connectivity between the fusiform and putamen (VABS II $p<0.05$; EOWPVT-4 $p=0.01$) as well as between the inferior temporal gyrus and the hippocampus (both $p<0.05$), both in the left hemisphere. Finally, there was a significant correlation between improvement on both the VABS II and the CGI-I and increased connectivity between the inferior temporal gyrus and superior temporal gyrus (VABS II $p<0.05$, CGI-I $p<0.01$) and between the temporal pole and globus pallidus (VABS II $p<0.01$; CGI-I $p<0.05$) in the left hemisphere. Improvement on the VABS II and CGI-I was also significantly correlated with increased connectivity between the frontal pole and globus pallidus and the insula and putamen in the right hemisphere (all $p<0.05$).

Studies are performed using a GE Premier Performance 3T MRI scanner, which is an improved version of GE's FDA-approved Premier system, but with better capabilities for high-resolution imaging. All operational parameters on this improved system are within FDA guidelines to meet the same minimal risk device criteria and ensure safety of human subjects. As such, an Investigational Device Exemption (IDE) is not necessary. The research conducted under this protocol is not to evaluate the safety and efficacy of this device.

The following imaging can be utilized:
High-Resolution T1 Imaging, 3D IR-prepped FSPGR, 1×1×1 mm resolution, estimated imaging time 3 minutes.
High-resolution perfusion imaging, 3D spiral with arterial spin labeling, target resolution 1.5×1.5×1.5 mm (will evaluate 1×1×1 provided SNR is sufficient), estimated imaging time 3 minutes.
High-resolution diffusion tensor imaging, 2D multi-shot DW EPI base sequence, 25 diffusion encoding directions, b factor 800 s/mm2, target resolution 1.5.×1.5× 1.5 mm (will evaluate 1×1×1 provided SNR is sufficient), estimated imaging time 10 minutes.
High-resolution fcMRI, 2D single- or two-shot EPI base sequence, target resolution 1.5×1.5×1.5 mm (will evaluate 1×1×1 provided SNR is sufficient), estimated imaging time 10 minutes. (5 minutes per run, two runs).
High-resolution quantitative susceptibility imaging, multi-echo 3D FSPGR based acquisition, target resolution 1×1×1 mm, estimated imaging time 5 minutes.

Analysis Populations

Full Analysis Population. Every participant enrolled in the trial.

Safety Population. All participants who received at least one administration of study product. Analysis of safety endpoints will be conducted in this population.

Modified Intention to Treat (mITT) population. All participants for whom the primary outcome was observed at Baseline and Month 6. The primary and secondary endpoints will be analyzed in this population. Participants will be analyzed according to the treatment assigned. If no data are missing, this population will be equivalent to the Full Analysis Population. However, in the event that there are substantial differences between the mITT and Full analysis populations, inverse probability weighting or other approaches appropriate for the missing data scenario will be considered.

Safety and Adverse Event Reporting

Adverse Event (AE): An adverse event is any untoward medical occurrence associated with the use of the investigational product regardless of whether it is considered related to the investigational product.

Serious Adverse Event (SAE): An adverse event or suspected adverse reaction is considered "serious" if, in the view of either the investigator or sponsor, it results in any of the following outcomes: death, a life threatening adverse event, inpatient hospitalization or prolongation of existing hospitalization, a persistent or significant incapacity or substantial disruption of the ability to conduct normal life functions, or a congenital anomaly/birth defect. Important medical events that may not result in death, be life-threatening, or require hospitalization may be considered serious when, based upon appropriate medical judgment, they may jeopardize the patient or subject and may require medical or surgical intervention to prevent one of the outcomes listed in this definition.

Grade/Severity: Grade/severity will be assessed according to CTCAE v5.0 guidelines.

Suspected Adverse Reaction: A suspected adverse reaction is any adverse event for which there is a reasonable possibility that the investigational product caused the adverse event. "Reasonable possibility" means there is evidence to suggest a causal relationship between the investigational product and the adverse event.

Causality: The investigator will use the following question when assessing causality of an adverse event to the investigational product: "Is there a reasonable possibility that the investigational product caused the event?" An affirmative answer designates the event as a suspected adverse reaction.

Adverse Event Reporting

All adverse events reported or observed during the study beginning at the time of the hCT-MSC infusion must be recorded. AEs occurring in 5% of enrolled participants will be reported in clinicaltrials.gov. Information to be reported includes when the site became aware of the event, investigator-specified assessment of severity and relationship to study therapy, whether there is an alternative etiology, seriousness, as well as any required treatment or evaluations, and outcome. In general, investigators should report adverse events as diseases or syndromes whenever possible, instead of reporting individual component symptoms, signs, laboratory abnormalities, and sequelae.

Severe adverse infusion reactions (fatal, life-threatening or requiring hospitalization) will be reported within seven calendar days of receipt of the information. All fatal or life threatening SAEs will be reported by the investigator or its representatives to the FDA by telephone or fax within seven calendar days after receipt of the information, following FDA guidelines. All serious and unexpected AEs will be reported to the FDA via a written report within 15 days of receipt of the information (21 CFR 312.32). If the principal investigator assesses an event to be unrelated to the study, then the event will not require expedited reporting but will be included in the annual summary report.

The following events within 24 hours of hCT-MSC infusion will also be recorded in the e-CRF: allergic reaction/hypersensitivity, sinus bradycardia, sinus tachycardia, hypertension, hypotension, fever, rigors/chills, nausea, vomiting, infection, dyspnea, hypoxia, and hemoglobinuria.

Serious Adverse Event Reporting

The Principal Investigator or its representative will be responsible for telephone or fax reporting of any unexpected SAEs to the FDA. The Principal Investigator or its representative will notify the FDA by telephone or fax of any fatal or life threatening experience (expedited report) associated with the use of the study therapy as soon as possible but no later than seven calendar days after receipt of the information. Initial notification will be followed by a written report within 15 calendar days. For SAEs associated with the use of the study therapy, the Principal Investigator will notify the FDA as soon as possible, but no later than 15 days, of the initial receipt of the information. The Principal Investigator or Sub-Investigator is responsible for informing the Institutional Review Board (IRB) and DSMB of any study related and unexpected SAEs.

Stopping Guidelines

The following stopping guidelines will be monitored during the duration of the study. The stopping guidelines will be monitored by the study team and are to be used to indicate boundaries requiring discussion by the investigators and DSMB. The study will be stopped for a safety review if:
 Any subject experiences a grade 4-5 infusion reactions within 48 hours of infusion; OR
 Two or more grade 4-5 adverse events determined to be temporally related to the study product by the medical safety monitor and/or the DSMB occur; OR
 Any subject experiences a blood stream infection within 6 months of infusion; OR
 Any subject develops grade II-IV GvHD; OR
 Any death.

Example 1: Infusions of hCT-MSCs are Safe and Feasible in Young Children with Autism Spectrum Disorder Study Design and Overview A phase I, single-center, open-label trial of one, two or three intravenous infusions of human umbilical cord tissue-derived mesenchymal stromal cells (hCT-MSC), administered every two months, was performed on 12 children with ASD. All children were initially enrolled on a screening protocol to obtain medical records. All patients' caregivers completed a pre-study screening interview by phone and provided medical records and videos for review by the study team to determine eligibility for the trial. Children ages two (2) to eleven (11) with a confirmed diagnosis of ASD were eligible to participate. Written informed consent was obtained for both the screening and the treatment phases of the trial. The trial was approved by the Duke Hospital Institutional Review Board conducted under IND #17313.

Patients (n=12) and their caregivers travelled to Duke University between two and four times, depending on the number of hCT-MSC infusions administered, as a part of their participation in the study. At their baseline visit, each patient was evaluated and received a single intravenous infusion of hCT-MSCs. The first cohort of three patients received a single dose. A second cohort of three patients received two doses, administered two months apart. A third cohort of six patients received three doses, each administered two months apart. At six (6) months after the baseline visit and initial hCT-MSC infusion, patients returned for follow-up clinical assessments (see FIG. 1 for study schema). Additional caregiver interviews and surveys were collected at 7-10 days, 2 months and 4 months after each infusion, and at 6 months and 12 months after the last hCT-MSC infusion for each patient.

Patients

Patients between 2 and 11 years of age who met criteria for a clinical diagnosis of ASD based on the Diagnostic and Statistical Manual of Mental Disorders, Fifth Edition (DSM-5) (DSM-5. American Psychiatric Association 2013; Washington, D.C.) were eligible for inclusion in the study. Twelve children, three girls, nine boys with a mean age of 6.4 years (range 4-9 years), were enrolled. Eleven subjects were white, one was Asian; two were Hispanic or Latino. A total of 27 hCT-MSC doses were administered from 3 different lots. The target dose at each administration was $2.0 \times 10^6$ TNC/kg (TNC=total nucleated cell number). The mean of the actual dose infused was $2.0 \times 10^6$ TNC/kg with a standard deviation of $0.4 \times 10^6$ TNC/kg. One patient received a low dose of $1.79 \times 10^6$ TNC/kg (Patient 12 at Infusion 3). The DSM-5 diagnosis of ASD was established by expert clinicians and informed by the Autism Diagnostic Observation Schedule, Second Edition (ADOS-2) (Lord C, et al. ADOS-2. Torrence, CA: Western Psychological Services 2012) and the Autism Diagnostic interview, Revised (ADI-R) (Rutter M, et al. ADI-R. Torrence, CA: Western Psychological Services 2008). Additional inclusion criteria included (1) patient was stable on their current medications for at least 2 months prior to the infusion, (2) Fragile X testing performed and negative, (3) normal absolute lymphocyte count (≥1500/µL), (4) ability to travel to Duke University up to four times (baseline, every two months for subsequent infusions, and 6 months after the initial infusion), (5) patient and parents were English speaking, and (6) parental consent. Exclusion criteria included (1) a history of prior cell therapy, use of intravenous immunoglobulin (IVIG) or other anti-inflammatory medications (with the exception of NSAIDs), or current or prior immunosuppressive therapy, (2) known genetic (e.g., fragile X) syndrome or other significant medical comorbidity, (4) known active or uncontrolled infection, such as a CNS infection or HIV positivity, (5) known medical disorder, such as but not limited to, a metabolic disorder, mitochondrial dysfunction, uncontrolled seizure disorder, active malignancy or prior malignancy treated with chemotherapy primary immunodeficiency disorder, autoimmune cytopenias, obvious physical dysmorphology suggestive of a genetic syndrome, impaired renal or liver function, significant sensory or motor impairment, and (6) known diagnosis of coexisting psychiatric conditions, including depression, bipolar disorder, schizophrenia, obsessive compulsive disorder, Tourette syndrome.

Study Rationale

The mechanistic rationale for this clinical study hypothesizes that hCT-MSC can act through paracrine and allocrine mechanisms to modulate on-going inflammation and/or immune pathology in the brain and possibly protect neurons from further damage. In many contexts, MSCs dampen, rather than augment, immunological and inflammatory responses. Documented mechanisms include shifts in effector T cells such as generation of regulatory T cell populations and changes in monocyte/dendritic cell cytokine generation leading to anti-inflammatory cytokines. A multiple dosing regimen may improve the overall rate and duration of response.

MSCs have been shown to exert immunomodulatory effects (see, Vellasamy et al., *Cytotherapy* 2016; 18(10): 1270-1283; Gesundheit, et al., *Med Hypotheses* 2015; 84(3): 169-177; Koh et al., *J Neurosci* 2015: 35(47):15649-15665; (Jaimes et al., *Stem Cells* 2016; doi:10.1002/stem.2541; and Ooi et al., *Neuroimmunomodulation* 2015; 22(4):233-242). It is unclear if these phenomena are caused by a direct effect of the MSCs or mediated through another mechanism. Research at Duke University demonstrated that hCT-MSCs produce and secrete multiple cytokine and chemokines using cytokine arrays by RayBiotech (Norcross, GA). Using Bioplex assays and ELISA, measured levels of selected cytokines/chemokines are shown in Table 4.

TABLE 4

Cytokine and chemokine production by hCT-MSCs.

| Cytokine/chemokine | P2 supernatant range, pg/mL |
|---|---|
| BioPlex | |
| IL-6 | 178-1134 |
| CCL2/MCP-1 | 270-453 |
| CXCL1/GRO☐ | 250-1280 |
| CXCL5 | 880-3025 |
| CXCL8/IL-8 | 250-837 |
| ELISA | |
| Thrombospondin-1 | 150-415 |

A Bioplex has validated many of the findings from the cytokine arrays.
ELISA assays have been used to quantify the production of Thrombospondin-1 and -2.

Procedures: hCT-MSC Infusion

As discussed above, the final product was derived from the P2 cultures which are harvested into plasmalyte (Baxter Healthcare, Deerfield, IL) with 5% human serum albumin (HSA) (Grifols, Barcelona, Spain), washed and cryopreserved in 5 compartment cryobags (Syngen) in 5 mL containing 50-100 million cells in a final concentration of 10% DMSO with dextran (Akron Scientific, Boca Raton, FL). On the day of administration, one compartment was thawed, diluted in 10-40 mLs of plasmalyte IV solution, placed in a syringe or bag and transported to the bedside for administration over 30-60 minutes.

Three lots of hCT-MSCs were selected for this clinical trial. Each lot was tested in 1-2 patients at each dose level, per Table 5. A total of 12 patients were treated with 3 dosing regimens. For patients who received multiple doses, each dose consisted of $2 \times 10^6$ hCT-MSCs/kg, and doses were given two months apart.

TABLE 5

Patient dosing and hCT-MSC cell lot given.

| | Patient # | # of Doses | hCT-MSC Lot # |
|---|---|---|---|
| Cohort 1 | 1 | 1 | 1 (GMP-047) |
| | 2 | 1 | 2 (GMP-051) |
| | 3 | 1 | 3 (GMP-058) |
| Cohort 2 | 4 | 2 | 1 (GMP-047) |
| | 5 | 2 | 2 (GMP-051) |
| | 6 | 2 | 3 (GMP-058) |
| Cohort 3 | 7 | 3 | 1 (GMP-047) |
| | 8 | 3 | 1 (GMP-047) |
| | 9 | 3 | 2 (GMP-051) |
| | 10 | 3 | 2 (GMP-051) |
| | 11 | 3 | 3 (GMP-058) |
| | 12 | 3 | 3 (GMP-058) |

All subjects received at least one infusion of allogeneic hCT-MSC cells. On the day of infusion, hCT-MSC cells were thawed and prepared by the CT2 GMP laboratory per standard operating procedure and provided for infusion of the patient in the clinic under the supervision of the study team and Pediatric Blood and Marrow Transplant Program staff. Baseline vital signs (heart rate, blood pressure, temperature, respiratory rate) were obtained. Pulse oximetry was monitored continuously throughout the infusion and for at least 5 minutes post infusion. A peripheral IV was placed by clinical staff, anesthesia or a member of the study team. After premedication with Benadryl (0.5 mg/kg IV) and Solumedrol (0.5 mg/kg IV), patients received hCT-MSCs at a dose of $2 \times 10^6$ cells/kg body weight, infused over 30-60 minutes. Patients were observed in the clinic for a minimum of 1 hour after the infusion. Patients were discharged from clinic after at least 1 hour once all vital signs were at baseline levels and patients were asymptomatic with no evidence of toxicity. Patients were evaluated by study staff the day after (within 24 hours of) the infusion to assess for any infusion-related adverse reactions or complications. A phone call to parents/guardians by study staff to assess safety of the infusion was conducted 7-10 days after the infusion.

Safety of hCT-MSC Infusions

The primary endpoint of this open label phase I trial was safety. The results show that hCT-MSC infusions were well-tolerated. Twelve (12) patients were enrolled in the study to receive one, two or three infusions of hCT-MSCs. All 12 patients completed their hCT-MSC infusion(s). Assessment of adverse events across the infusion period and 12 months after the final infusion indicated that the treatment was safe and well tolerated. Adverse events were mild, expected, and unrelated to the study product. No serious adverse events were reported. More specifically, three reactions were reported in 2 patients within 24 hours of infusion. One patient in Cohort 2 experienced Allergy and Moderate Hypotension after infusion 2. Due to an adverse reaction of extreme agitation to IV Benadryl during the initial infusion, this patient received oral Atarax as an alternative premedication for the second infusion. Shortly after initiation of the second hCT-MSC infusion, the patient developed diffuse erythroderma and a cough followed by mild hypotension and hypoxia. The infusion was immediately stopped, and the patient recovered completely with a fluid bolus and an extra dose of IV Solumedrol. The remainder of the hCT-MSC infusion was successfully completed after a dose of IV Benadryl. One patient in Cohort 3 experienced Moderate Hypotension after infusion 3 and received additional IV fluids.

Figure 2:
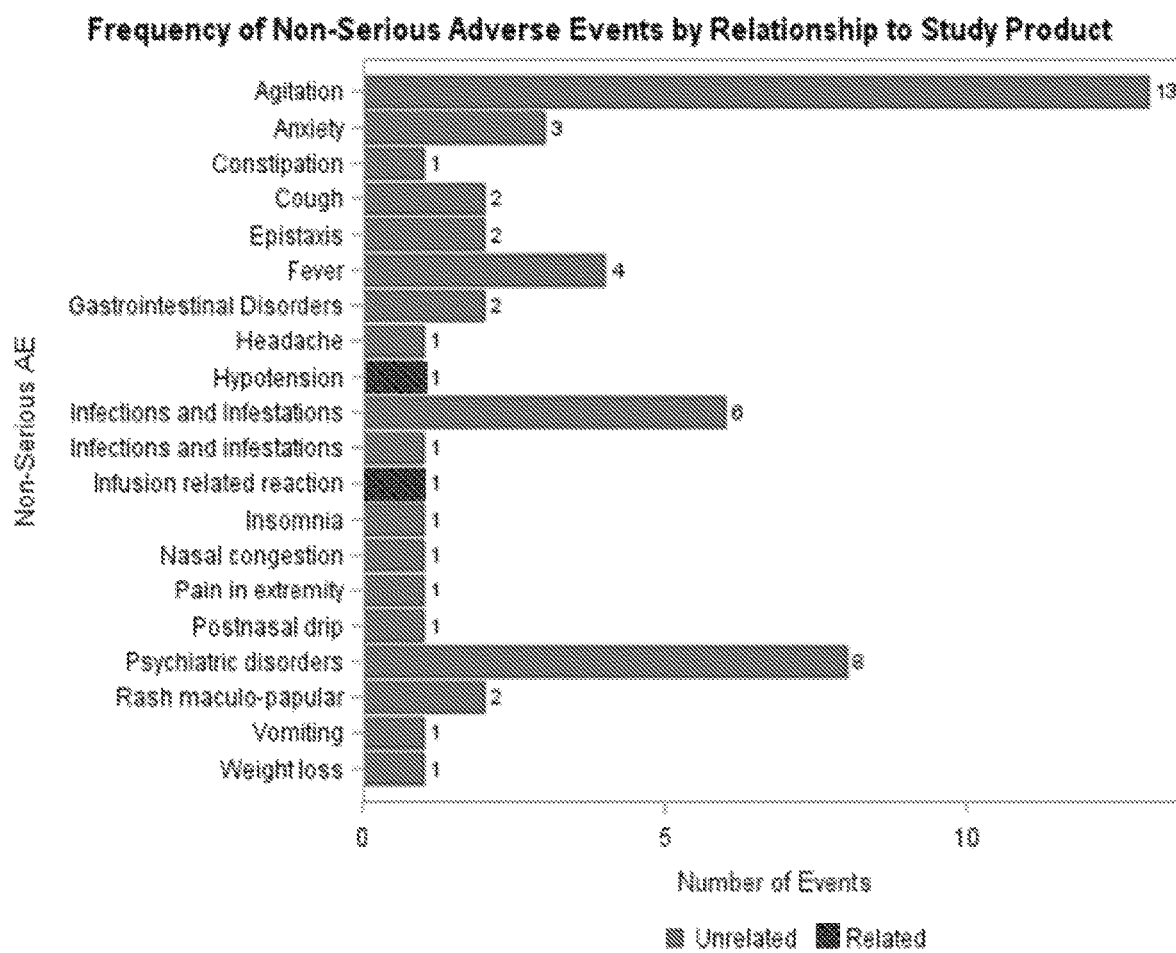
FIG. 2 shows a summary of adverse events observed during Phase I hCT-MSC Study. A total of 3/53 (5.7%) events were related to study product—Hypotension and Infusion Related Reaction.

A total of 53 non-serious Adverse Events (AE) were reported (53 Mild and 1 Moderate) among the 11 of 12 enrolled patients (FIG. 2). The most frequently occurring event was Agitation (13 events, or 26% of the total reported events) followed by other Psychiatric Symptoms (7 events, or 13% of all reported events). Agitation accounted for a third of events in Cohort 1, ½ of events in Cohort 2, and ~⅕ of events in Cohort 3. Most reports of Agitation were after the 1st infusion (8 events) followed by the 2nd infusion (4 events) and 3rd infusion (1 event). All of the Agitation events were reported on the same day as the infusion and also resolved on the same day. The 8 other Psychiatric Symptoms were reported in 5 different subjects: 1 subject/1 event in Cohort 1, and 4 subjects/7 events in Cohort 3. Six of the Psychiatric Symptoms occurred after the first infusion and 2 events occurred after the 3rd infusion. The mean time to onset of psychiatric symptoms after infusion was 20 days (sd=15.2; range: 2-44 days). Six months after the initial hCT-MSC dose, development of HLA antibodies was observed in 5 participants who did not have detectable HLA antibodies pre-treatment (data not shown). These are continuing to be monitored and have not been clinically significant.

Behavioral Testing

Feasibility of administration was also tested and results of several measures typically used to assess behavioral outcomes in children with ASD were described. Multiple parent-rated and clinician-rated measures were evaluated. Analysis of the first 10 patients showed that 6 out of 10 patients were rated as showing improvement on the Clinical Global Impression (CGI) Scale and 7 out of 10 patients showed improvements on either the socialization or communication subscales of the Vineland Adaptive Behavior (VAB) Scales. Significant improvements in patients' behavior were observed on parent-report measures of social communication skills (Vineland Adaptive Behavior Scale) for patients whose nonverbal IQ was higher at baseline.

Results of behavioral outcome assessments are shown in Table 6. Measures reported below include assessments of social communications skills (VABS) with increases of 3 points and above indicating improvement, severity of autism symptoms (PDD-BI) with decreases indicating improvement, and expert clinical judgement (CGI) ranging from no improvement, to much improvement. Fifty-eight percent (7/12) of patients showed an improvement on at least ⅔ measures, 42% (5/12) showed an improvement on all three measures, and 16% (2/12) showed an improvement on ⅔ measures. Of the eight children who improved on ⅔ of the outcome measures, two had one dose, two had two doses, and three had three doses.

TABLE 6

Behavioral Evaluations, Phase I Study of hCT-MSC in Children with ASD

| ID | Dose | Sex | IQ | VABS* | PDDBI | CGI | # of assessments indicating Improvement |
|---|---|---|---|---|---|---|---|
| 1 | 1 | M | 62 | −2 | — | Min | 1 |
| 2 | 1 | M | 68 | 4 | 6 | Min | 2 |
| 3 | 1 | M | 45 | 22 | −22 | Min | 3 |
| 4 | 2 | F | 59 | 0 | −6 | Much | 2 |
| 5 | 2 | M | 40 | −10 | −1 | No | 0 |
| 6 | 2 | M | 36 | 8 | −22 | Min | 3 |
| 7 | 3 | M | 42 | −2 | 0 | No | 0 |
| 8 | 3 | M | 54 | −8 | −4 | No | 1 |
| 9 | 3 | M | 71 | −3 | 6 | Min | 1 |
| 10 | 3 | M | 82 | 19 | −20 | Min | 3 |
| 11 | 3 | F | 59 | 4 | −7 | Min | 3 |
| 12 | 3 | F | 95 | 7 | −2 | Min | 3 |

VABS = Vineland Adaptive Behavior Scales-Third Edition (VABS-III) Socialization Standard Score,
PDDBI = Pervasive Developmental Disorder Behavior Inventory Autism Composite,
CGI = Clinical Global Impression-Improvement scale
*Clinically significant improvement = 3 points.

DISCUSSION

In this phase I open-label study, the safety and feasibility of one, two and three intravenous infusions of hCT-MSCs in young children with ASD was evaluated. Changes in various behavioral and functional outcome measures were also described to determine which would be best suited for use as endpoints in future cell therapy trials. Assessments of adverse events over the 12 months post-infusion indicated that the hCT-MSC infusion(s) were safe and well tolerated. All related events were considered expected, unrelated to the hCT-MSCs (study product) and resolved without sequelae.

Figure 3A:
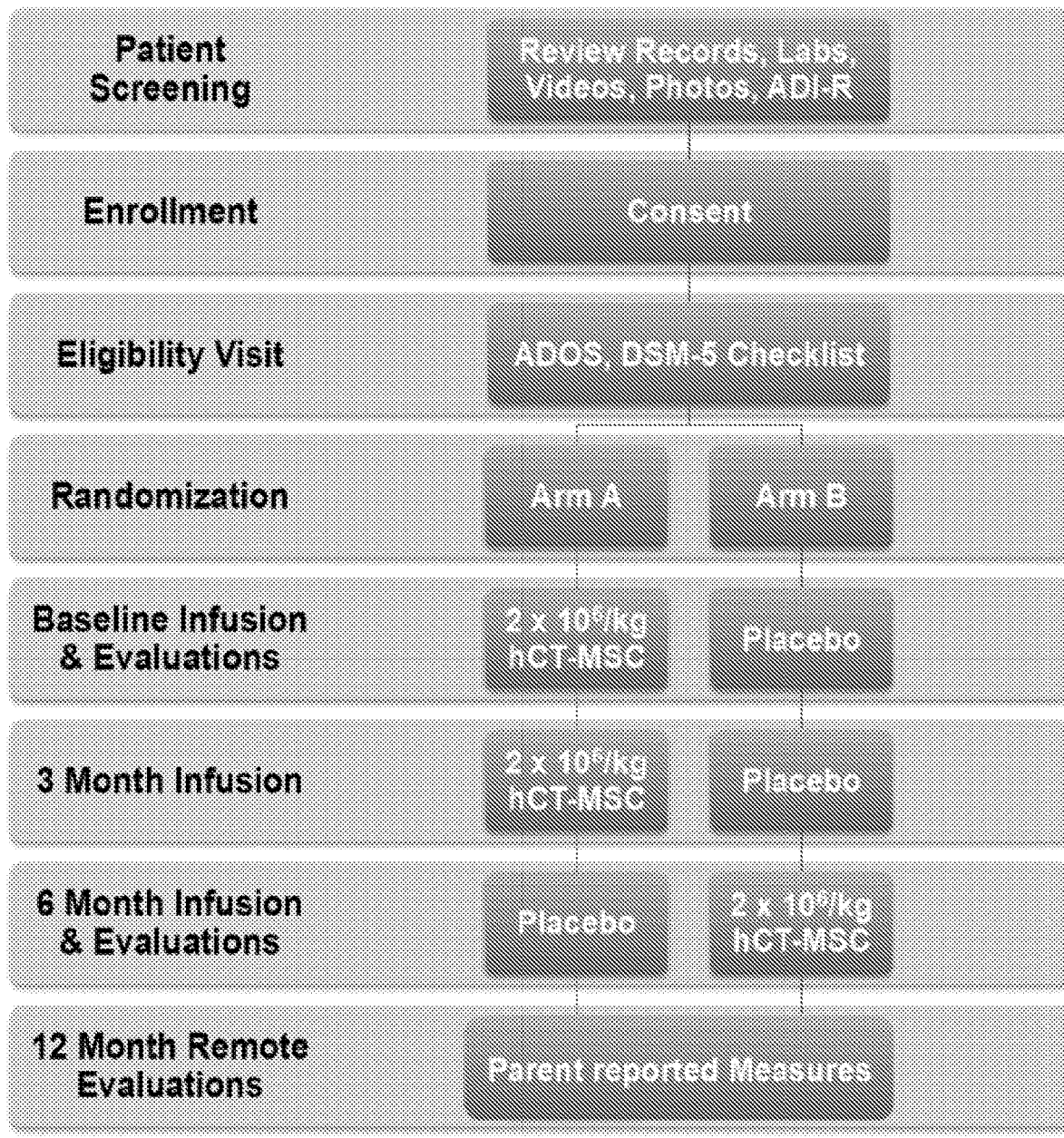

Example 2. Phase II Study: Efficacy and Safety of Single and Repeated Intravenous Doses of hCT-MSC in Children with ASD This study is a phase II, prospective, randomized trial designed to assess the efficacy of intravenous dosing of hCT-MSC in young children with ASD. Children ages four to eight years with ASD are eligible to participate. All subjects are treated with hCT-MSC. Subjects randomized to arm A receive two intravenous doses of 2×10⁶ hCT-MSC per kilogram, one at baseline and one at three months, followed by a blinded placebo infusion at six months. Subjects randomized to arm B receive two placebo infusions, one at baseline and one at three months, followed by an intravenous dose of 2×10⁶ hCT-MSC per kilogram at six months (see FIG. 3A). All participants have an initial clinical evaluation to verify the diagnosis of ASD and confirm protocol eligibility. The primary endpoint is change in social communication skills (a core symptom of autism) from baseline to six months after the initial hCT-MSC infusion, as measured by the Vineland Adaptive Behavior Scale (VABS)-3 Survey Interview Form, Socialization Subscale Standard Score. Key secondary endpoints will include VABS-3 Communication Subscale Standard Score, PDD-BI Composite Score, the Clinical Global Impression Scale-Severity and Improvement, and the Expressive One-Word Vocabulary Test raw score. Exploratory analyses compare the primary outcome measure in this study with the same outcome observed in a cohort of similar-aged children with ASD participating in a longitudinal study of the natural history of ASD conducted at the National Institute of Mental Health (NIMH). Additional ASD-specific outcome measures, described below, are assessed at baseline, six, and 12 months. Safety assessments including acute infusion reactions, incidence of infections, and markers of alloimmunization are collected and described. Duration of study participation is 12 months from the time of the first hCT-MSC infusion.

Study Objectives

Primary objective: To determine the efficacy of hCT-MSC for improving social communication skills in children with ASD.

Secondary objective: To describe severity of autism symptoms, clinician-assessed global improvement and changes in language ability after hCT-MSC treatment.

Exploratory objectives: (1) To describe differences in social communication skills between subjects treated with hCT-MSC in this study with children with ASD of a similar age range observed in a longitudinal study of the natural history of ASD sponsored by NIMH. (2) To describe changes in adaptive behaviors and motor skills after hCT-ASD treatment. (3) To describe changes in MRI, EEG, eye-tracking measures of attention, and computer vision analysis of autism symptoms after hCT-MSC treatment.

Study Design

General Design

This is a single site, phase II, prospective, randomized study of intravenous hCT-MSC infusion in 60 children ages 4-8 years with ASD. All subjects are treated with hCT-MSC with a 1:1 randomization scheme testing different dosing schemas (see FIG. 3A and FIG. 3B). The main endpoint is change in social communication skills (a core symptom of autism) from baseline to six months after the initial hCT-MSC infusion, as measured by the Vineland Adaptive Behavior Scale (VABS)-3 Survey Interview Form, Socializations Subscale Standard Score. Duration of study participation is 12 months from the time of the first hCT-MSC infusion.

Study Endpoints

Primary Endpoint: The primary endpoint of this study is the change in socialization skills (a core symptom of autism) from baseline to six months after the initial hCT-MSC infusion, as measured by the VABS-3 Socialization Standard Score. Arms A&B (total exposure of $6 \times 10^6$/kg in a single dose) are compared to Arms C&D (total exposure of $6 \times 10^6$/kg in 3 equally divided doses). Arms A&C and B&D are compared to the external Placebo control group from the DukeACT trial.

Secondary Endpoints: Change measured on the following endpoints from baseline to six months is compared between Arms A&B, C&D, and the DukeACT Placebo group.
1. VABS-3 Communication Standard Score.
2. CGI-S and CGI-I.
3. Expressive One Word Picture Vocabulary Test.

Exploratory Endpoints: Change measured from baseline to twelve months is evaluated on the following outcome measures. Arms A, B, C, and D are compared to each other and to the Placebo group from the DukeACT trial.
1. VABS-3 Socialization Standard Score.
2. VABS-3 Communication Standard Score.
3. VABS-3 Adaptive Behavior Composite and scores from the Daily Livings Skills, Communication and Motor Skills subscales.
4. MRI measures.
5. EEG measures.
6. Attention assessed via eye tracking.
7. Autism symptoms assessed via computer vision analysis (CVA).

Safety Endpoints: Safety of hCT-MSC infusion in children with ASD is assessed by:
1. Incidence and severity of infusion reactions.
2. Incidence and severity of product-related infections.
3. Evidence of alloimmunization via anti-HLA and anti-RBC antibodies and nonspecific markers of systemic inflammation (ESR, CRP).
4. Incidence and severity of graft vs. host disease.
5. Incidence and severity of unexpected adverse events, by relation to study product.

Research Participant Selection and Withdrawal

Study Population

Sixty children ages 4-8 years with a confirmed diagnosis of ASD.

Inclusion Criteria
1. Age ≥4 years to ≤9 years (8 years, 364 days) at the time of consent.
2. Confirmed clinical DSM-5 diagnosis of Autism Spectrum Disorder using the DSM-5. Checklist as informed by the Autism Diagnostic Observation Scale—2.
3. Fragile X testing performed and negative; CMA and/or whole exome sequencing performed and results not linked to autism diagnosis.
4. Stable on current psychiatric medication regimen (dose and dosing schedule) for at least 2 months prior to infusion of study product.
5. Normal absolute lymphocyte count (≥1500/uL).
6. Participant and parent/guardian are English speaking.
7. Able to travel to Duke University three times (baseline, three months, six months), and parent/guardian is able to participate in interim surveys and interviews.
8. Parental consent.

Exclusion Criteria
1. General:
   a. Review of medical records indicates ASD diagnosis not likely.
   b. Known diagnosis of any of the following coexisting psychiatric conditions: depression, bipolar disorder, schizophrenia, obsessive compulsive disorder associated with bipolar disorder, Tourette syndrome.
   c. Screening data suggests that participant would not be able to comply with the requirements of the study procedures as assessed by the study team.
   d. Family is unwilling or unable to commit to participation in all study-related assessments, including protocol follow up.
   e. Sibling is enrolled in this (Duke hCT-MSC) study.
2. Genetic:
   a. Records indicate that child has a known genetic syndrome such as (but not limited to) Fragile X syndrome, neurofibromatosis, Rett syndrome, tuberous sclerosis, PTEN mutation, cystic fibrosis, muscular dystrophy or a genetic defect definitively known to be associated with ASD.
   b. Known pathogenic mutation or copy number variation (CNV) associated with ASD (e.g., 16p11.2, 15q13.2, 2q13.3).
3. Infectious:
   a. Known active CNS infection.
   b. Evidence of uncontrolled infection based on records or clinical assessment.
   c. Known HIV positivity.
4. Medical:
   a. Known metabolic disorder.
   b. Known mitochondrial dysfunction.
   c. History of unstable epilepsy or uncontrolled seizure disorder, infantile spasms, Lennox Gastaut syndrome, Dravet syndrome, or other similar chronic seizure disorder.
   d. Active malignancy or prior malignancy that was treated with chemotherapy e. History of a primary immunodeficiency disorder.
f. History of autoimmune cytopenias (i.e., ITP, AIHA).
g. Coexisting medical condition that would place the child at increased risk for complications of study procedures.
h. Concurrent genetic or acquired disease or comorbidity(ies) that could require a future stem cell transplant.
i. Significant sensory (e.g., blindness, deafness, uncorrected hearing. impairment) or motor (e.g., cerebral palsy) impairment.
j. Impaired renal or liver function as determined by serum creatinine >1.5 mg/dL or total bilirubin >1.3 mg/dL, except in patients with known Gilbert's disease.
k. Significant hematologic abnormalities defined as: Hemoglobin <10.0 g/dL, WBC<3,000 cells/mL, ALC<1000/uL, Platelets<150×10e9/uL.
l. Evidence of clinically relevant physical dysmorphology indicative of a genetic syndrome as assessed by the PIs or other investigators, including a medical geneticist and psychiatrists trained in identifying dysmorphic features associated with neurodevelopmental conditions.

5. Current/Prior Therapy:
a. Availability of a banked, qualified autologous cord blood unit.
b. History of prior cell therapy.
c. Current or prior use of IVIG or other anti-inflammatory medications with the exception of NSAIDs.
d. Current or prior immunosuppressive therapy:
  i. No systemic steroid therapy that has lasted >2 weeks, and no systemic steroids within 3 months prior to enrollment. Topical and inhaled steroids are permitted.

Early Withdrawal of Research Participants

Criteria for Removal from Protocol Therapy: (a) Diagnosis of a genetic disease while under evaluation or on study. (b) Change in medical condition that precludes study participation.

Patients who are off protocol therapy are to be followed until they meet off-study criteria (see below). Follow-up data will be obtained on off-protocol participants unless consent is withdrawn. Subjects that are taken off study prior to infusion of hCT-MSC will be considered not evaluable and can be replaced with another subject.

Off-Study Criteria:
1. Death.
2. Lost to follow-up.
3. Withdrawal of consent for any further data collection.
4. Completion of the final study visit.

Human Umbilical Cord Tissue-Derived Mesenchymal Stromal Cells (hCT-MSC)

hCT-MSCs are a product of allogeneic cells manufactured from digested umbilical cord tissue that is expanded in culture, cryopreserved and banked. hCT-MSCs are manufactured from umbilical cord tissue donated to the Carolinas Cord Blood Bank, an FDA-licensed, FACT-accredited, public cord blood bank at Duke University Medical Center, after written informed consent from the baby's mother. Cord tissue is harvested from the placentas of male babies delivered by elective C-section after a normal, full-term pregnancy. Donor screening questionnaires are completed by the maternal donor, and maternal blood is tested for communicable diseases by the CLIA-certified donor screening laboratory at the American Red Cross in Charlotte, NC. Donors must be eligible for donation to a public cord blood bank for allogeneic use. After delivery of the placenta and cord, the cord blood is aseptically drained from the placenta. Then the cord is dried and cleaned with chloropreps, separated from the base of the placenta, placed in a sterile bottle containing Plasmalyte A, and transported to the Robertson CT2 GMP cell processing laboratory at room temperature in a validated container.

In the clean room manufacturing suite, in a biosafety cabinet, the cord tissue is removed from the media, placed in sterile dishes, cut into small pieces and then minced and digested in the Miltenyi Biotec GentleMacs Octo Dissociator with GMP-grade enzymes: hyaluronidase, DNase, collagenase, papain. The resultant cell suspension is placed in culture in Prime XV MSC Expansion XSFM (Irvine Scientific) media with 1% platelet lysate and grown to confluence (~7-14 days) to establish the P0 culture. To establish the master cell bank, P0 is harvested and cryopreserved in cryovials with Cryostor 10 media (BioLife), and stored in the vapor phase of liquid nitrogen. P1 and P2 cultures are grown under similar conditions, in hyperflasks or hyperstacks without platelet lysate, as needed to create the working cell bank and product for administration, respectively. Cells from P1 and P2 are removed from plastic cultureware using TrypLE (Gibco). The final product is derived from the P2 cultures which are harvested into plasmalyte with 5% human serum albumin, washed and cryopreserved in 5 compartment cryobags (Syngen) in 5 mL containing 50-100 million cells in a final concentration of 10% DMSO with dextran (Akron Scientific). On the day of administration, one compartment is thawed, diluted in 10-40 mLs of plasmalyte IV solution, placed in a syringe or bag and transported to the bedside for administration over 30-60 minutes.

At each passage, the cell product is characterized by assessing cell surface phenotype by flow cytometry and functional assays via T-cell proliferation and organotypic models of microglial activation. Each lot, prior to cryopreservation of P2, will also be tested for sterility, endotoxin and *mycoplasma* and these tests must meet specifications. For dosing, release testing after thaw and dilution will include TNCC and viability via cellometer. Sterility cultures (14 day) are also initiated but results are not available at the time of infusion. Patients are dosed with $2 \times 10^6$ hCT-MSCs/kg based on the post thaw count.

Donor Screening and Testing

Donor screening and testing is performed per Carolinas Cord Blood Bank standard operating procedures to meet all requirements in 21 CFR Part 1271. The screening and testing is current with recommendations and is approved by the FDA under biological license number 1870. Maternal donors of umbilical cord blood are screened and tested for HIV-1, HIV-2, hepatitis B virus (HBV, surface and core antigen), hepatitis C virus (HCV), *Treponema pallidum* (syphilis), CJD (screening only), Chagas, human T-lymphotropic virus types 1 and 2 (HTLV-1, HTLV-2) and CMV. Nucleic acid testing for HIV-1/2/O, HBV, WNV and HCV are also performed on maternal blood. Screening for Zika virus may also be performed.

Process and Final Formulation hCT-MSC is manufactured from a single umbilical cord tissue in a series of three steps that generate a master cell bank, a working cell bank, and the study product. The product for each step is frozen and stored in vapor phase in liquid nitrogen freezer. At P2, a representative cryobag is thawed and qualified prior to the treatment of any patients with that lot of product. Testing includes cell count, viability, phenotype, functional assays, endotoxin, mycoplasm, gram stain and sterility.

On the day of treatment, cells are thawed per SOP CT2-MSC-006, diluted in 10-40 mLs of plasmalyte-A+5% HSA, and an aliquot removed for cell count, viability, and sterility culture. If the cells meet release criteria, the final product volume is adjusted to deliver the appropriate dose (2 or $6 \times 10^6$ cells/kg) to the study subject. The cells are delivered to the bedside in a bag or syringe containing plasmalyte-A, 5% HSA, and residual DMSO. Any removed cell suspension is inoculated into aerobic and anaerobic culture bottles for sterility testing. The cells have a four-hour expiry post thaw.

The hCT-MSC final product is released conditionally for administration to the patient after testing a post thaw cell count and viability. Final release will occur after the 14-day sterility culture period for the study product. In the event that a sterility culture turns positive after administration of the product, the organism is identified and antibiotic sensitivities performed. The patient's family is contacted to determine if they are symptomatic (i.e., fever). Asymptomatic patients will not be treated with antibiotics. Symptomatic patients are evaluated and treated accordingly, with blood cultures and antibiotics as appropriate. All patients receiving a product with subsequent positive sterility test are followed with daily contact by a study nurse for 14 days after the positive sterility test is noted.

Placebo Product

Cryopreserved hCT-MSC that has been thawed for administration has a distinctive scent due to the DMSO used in cryopreservation. In order for patients and families to be truly blinded to the type of infusion they are receiving, the placebo product must be similar in both appearance and odor. Therefore, the placebo product is acellular and consists of plasmalyte-A with 1% DMSO which are standard ingredients in cellular products. The volume of placebo product is 10-40 mLs, which is the same range used for the hCT-MSC product. The placebo solution is placed in the same final container so the clinical staff, patients, and families remain blinded to study product or placebo at the time of the six-month infusion.

Administration of Product

Patients are admitted to the infusion center on the day of their scheduled infusion. Patients may require some sedation prior to the IV placement if they are unable to remain still or cooperate. A peripheral IV is placed by clinical or study staff. Patients are premedicated with Benadryl 0.5 mg/kg/dose IV and Solumedrol 0.5-1 mg/kg IV. The hCT-MSCs or placebo product is administered intravenously over 30-60 minutes. Vital signs (heart rate, blood pressure, temperature, respiratory rate) are attempted upon arrival to the clinic and monitored as clinically indicated. Pulse oximetry is monitored continuously throughout the infusion and for at least 5 minutes post infusion. Patients should be observed a minimum of 15-30 minutes post infusion.

Safety Follow-up

On Day 1 following each infusion, the participant is seen by study staff to assess for any infusion related adverse reactions or complications. At 7-10 days post each infusion, a member of the study team contacts the parent or guardian via phone or email to assess patient status and any adverse events. A questionnaire is administered at each subsequent visit and at 6 and 12 months to assess for serious adverse events. PRA is obtained pre-treatment and at 6 and 12 months post MSC dosing.

Study Plan

Overview

Once all screening is complete and the patient is likely to meet study criteria, the patient will travel to Duke for their first visit. On day 1, informed consent is obtained and patient eligibility is determined by a physical observation and verification of ASD diagnosis per DSM-5 criteria. If the child is deemed eligible, he/she is enrolled on study and randomized to one of the hCT-MSC dosing cohorts. During his/her first visit, he/she also undergoes additional clinical and neuropsychological evaluations, EEG testing, eye tracking, and CVA assessments, and MRI. Participants are evaluated the day after each infusion either in person or by phone call and parents are contacted 7-10 days after each infusion for follow up safety evaluation. Participants return to Duke for scheduled hCT-MSC infusions and monitoring, and at six and 12 months following their initial dose for repeated clinical, neuropsychological, EEG, eye tracking, CVA, and safety follow-up.

Patient Screening

Screening for the study is conducted under a separate, IRB-approved screening protocol (Pro00063563). Under this protocol, after written informed consent is obtained from a parent/guardian, the patient's medical and psychological records, school records, photographs, behavioral videos, and results of all genetic testing are obtained and reviewed by two teams. The medical review is conducted by a team of pediatric nurses, nurse practitioners, and physicians to identify the presence of any metabolic, immunologic, neurologic, sensory, genetic, or laboratory exclusion criteria. If no such exclusion criteria are identified, the psychiatric review is then conducted by a combination of psychologists, psychiatrists, and social workers with expertise in diagnosing and treating children with ASD. They perform an extensive review of the patient's psychological records as well as any school and therapy records available. The psychiatric screening team will conduct the ADI-R assessment. Both teams review the patient's photographs and records to evaluate for dysmorphic features. Any patients with questionable facial features or findings on genetic testing are then reviewed by a medical geneticist with expertise in genetic conditions associated with ASD. A patient must be approved by both medical and psychiatric screening teams to proceed with further laboratory or phone or in-person screening and study enrollment. Should a concern for a previously undiagnosed condition or genetic finding arise during the screening process, this will be discussed with the patient's parent(s)/guardian(s) and a referral will be made to an appropriate medical or psychiatric provider for evaluation and treatment, if indicated.

Study Infusions

All subjects receive at least one infusion of allogeneic hCT-MSC cells. On the day of infusion, hCT-MSC cells or a placebo product is thawed and prepared by the CT2 GMP laboratory and/or Duke Stem Cell Lab per standard operating procedure and provided for infusion of the patient in the clinic under the supervision of the study team and Pediatric Blood and Marrow Transplant Program staff. Baseline vital signs (heart rate, blood pressure, temperature, respiratory rate) are obtained. A peripheral IV will be placed by clinical staff, anesthesia or a member of the study team. Prior to the infusion, premedications (Benadryl, Solumedrol) are administered. The study product is infused over 30 minutes. The child is observed in the clinic for a minimum of 15-30 minutes after the infusion. IV fluids (D5½ NS) at 1.5 maintenance are attempted. Patients are discharged from clinic after at least 1 hour providing all vital signs are at their baseline and they are asymptomatic with no evidence of toxicity. Patients are evaluated by study staff the day after the infusion to assess for any infusion-related adverse reactions or complications. A phone call to parents/guardians by study staff to assess safety of the infusion is conducted 7-10 days after the infusion.

If a patient has evidence of illness on the day of planned infusion, including but not limited to fever >38.5° C., vomiting, diarrhea, or respiratory distress, the infusion is postponed.

Care During Unexpected Events

In the event that a patient develops signs or symptoms of anaphylaxis including urticaria, difficulty breathing, cough, wheezing, or vomiting during his/her study infusion, the infusion is terminated and appropriate medical therapy initiated.

Evaluations

TABLE 7

Medical and Safety Assessments.

| | Time Points# | | | | |
|---|---|---|---|---|---|
| | Screening | Baseline (Visit 1) | Each hCT-MSC dose or placebo | 7-10 days post-MSCs | 6 months | 12 months |
| CBCD*, CMP*, patient HLA, fragile X, CMA/WES | X | | | | | |
| Review of prior records ± videos | X | | | | | |
| History & Physical | | X | X | | X | X |
| Samples for storage of DNA & viable mononuclear cells, DNA extract and hold | | X | | | | |
| CBCD, CMP, Direct & Indirect Coombs (T&S), HLA Antibody Screen (PRA), ESR, CRP, Immune Reconstitution Panel, Humoral Immune Profile, Donor Referral Panel | | X* | X (CBC & CMP only) | | X | X (PRA only) |
| Neuropsychological evaluation | | X | | | X | X |
| MRI | | X | | | X | |
| Safety Assessment - in person (Day post-infusion) | | X | X | | X | |
| Safety Assessment - phone call/survey | | | | X | | |

*CBCD & CMP may be obtained at initial visit or within 6 months prior to consent; HLA, fragile X, CMA/WES any time prior to enrollment.
Safety and return assessments should be performed within a month of the indicated time point.

TABLE 8

Diagnostic, Behavioral, Neurocognitive, and Neurophysiological Evaluations.

| | | | Time Points* | | | | |
|---|---|---|---|---|---|---|---|
| | Measure | Time (min) | Baseline (visit) | 3 mo. (remote) | 6 mo. (visit) | 9 mo. (remote) | 12 mo. (visit) |
| Pre-Visit Clinician Assessment w/Parent | Autism Diagnostic Interview, Revised, Shortened Version (ADI-R) | 90-150 | X (pre-visit) | | | | |
| Clinician Assessment w/Child | Autism Diagnostic Observation, 2nd Ed. (ADOS-2) | 45-60 | X | | X | | X |
| | Mullen Scales of Early Learning, AGS Edition (MSEL) | 60 | X | | | | |
| | Differential Ability Scales, 2nd Ed. (DAS-II) | 45 | X | | | | |
| | Parent-Child Interaction (proximity seeking) (PCI) | 12 | X | | X | | X |
| | Expressive One-Word Picture Vocabulary Test, 4th Ed. (EOWPVT-4) | 10-30 | X | | X | | X |

TABLE 8-continued

Diagnostic, Behavioral, Neurocognitive, and Neurophysiological Evaluations.

| | | | Time Points* | | | | |
|---|---|---|---|---|---|---|---|
| | Measure | Time (min) | Baseline (visit) | 3 mo. (remote) | 6 mo. (visit) | 9 mo. (remote) | 12 mo. (visit) |
| Physiological & Functional Assessments w/Child | Electrophysiological testing (EEG) | 20 | X | | X | | X |
| | Eye Gaze Tracking of Social Stimuli (EGT) | 10-15 | X | | X | | X |
| | Computer Vision Analysis (CVA) | 10 | X | | X | | X |
| Clinician Assessment w/Parent | Vineland Adaptive Behavior Scales, 3rd Edition, Survey Interview Form (VABS-3) | 60 | X | | X | | X |
| Parent Questionnaire | Pervasive Developmental Disorder-Behavior Inventory (PDDBI) | 30 | X | X | X | X | X |
| | Intervention History* | 15 | X | X | X | X | X |
| | The Early Life Exposures Assessment Tool (ELEAT) | 10 | X | | | | |
| | Aberrant Behavior Checklist-Community | 10 | X | X | X | X | X |
| | Sensory Experiences Questionnaire 2.1 | 10 | X | | | | |
| | Brief Rating Inventory of Executive Functioning (BRIEF) or BRIEF-Preschool (BRIEF-P) | 15 | X | | X | | X |
| | PedsQL-Gastrointestinal Symptoms Inventory (PedQL) | 10 | X | | X | | X |
| Other Clinician Assessments | Diagnostic Statistical Manual 5-Checklist (DSM-5) | 3-5 | X | | X | | X |
| | Clinical Global Impression-Severity and Improvement | 15 | X | | X | | X |

*Intervention history will be collected on a monthly basis.
Assessments should be performed within a month of the indicated time point.

Statistical Considerations

This is a single site, Phase II, prospective study of intravenous hCT-MSC infusion in 60 children ages 2-7 years with ASD. All subjects are treated with hCT-MSC. Subjects are randomized to one of four dosing schemas using an even allocation. Duration of study participation is 12 months from the time of the first hCT-MSC infusion. An external control group is used to assess efficacy.

Study Duration: Research participants are enrolled in the study for 12 months after the administration of their first dose of hCT-MSC.

Demographics and Baseline Characteristics: Demographics and baseline characteristics are summarized for all research participants. Characteristics to be examined include age, sex, race/ethnicity, and baseline behavioral status.

Primary Endpoint: The primary endpoint of this study is the change in social communication skills (a core symptom of autism) from baseline to six months after the initial hCT-MSC infusion, as measured by the Vineland Adaptive Behavior Scale (VABS)-3 Survey Interview Form, Socializations Subscale Standard Score. Arms A&B (total exposure of $6\times10^6$/kg in a single dose) are compared to Arms C&D (total exposure of $6\times10^6$/kg in 3 equally divided doses). Arms A&C and B&D will also be compared to the external Placebo control group from the DukeACT trial. Analyses of arms A through D individually are included in the exploratory analyses.

Sample Size and Power Calculations: The following assumes that the patient-level data from DukeACT are pooled with the data from the present study for analysis. The evaluation of statistical power assumes a general linear model (GLM) is fit to predict the Month 6 VABS-3 Socialization Standard Score using the baseline score, age, nonverbal development quotient (NVDQ), and study indicator (DukeACT or the present study) as continuous covariates. A multiple correlation of r=0.85 (R-squared=0.7291) was assumed between the covariates and the Month 6 score based on blinded data from the interim analysis of the DukeACT study (N=119), and under the assumption of limited between-study variability based on similar eligibility criteria in the present study and DukeACT.

Statistical power was calculated assuming contrasts would be derived from the GLM to compare groups A&B (total exposure of $6\times10^6$/kg in a single dose) and C&D (total exposure of $6\times10^6$/kg in 3 equally divided doses) to the DukeACT placebo group and to each other. The statistical hypotheses related to these contrasts are described in Table 9 below.

TABLE 9

Statistical hypotheses related the study.

| Contrast | Null Hypotheses |
|---|---|
| Main effect of treatment | H0: $\mu_A - \mu_{placebo} = 0$ and $\mu_B - \mu_{placebo} = 0$ and $\mu_C - \mu_{placebo} = 0$ and $\mu_D - \mu_{placebo} = 0$ |

TABLE 9-continued

Statistical hypotheses related the study.

| Contrast | Null Hypotheses |
|---|---|
| Single dose vs. placebo | H0: $\mu_A - \mu_{placebo} = 0$ and $\mu_B - \mu_{placebo} = 0$ |
| Three doses vs. placebo | H0: $\mu_C - \mu_{placebo} = 0$ and $\mu_D - \mu_{placebo} = 0$ |
| Single dose vs. three doses | H0: $\frac{1}{2}(\mu_A + \mu_B) - \frac{1}{2}(\mu_C + \mu_D) = 0$ |

Standardized effect sizes were used to express three likely alternative hypotheses for which power was calculated assuming a sample of 15 patients in each of arms A, B, C, and D and 60 from the DukeACT Placebo group. Power calculations assume a test-wise alpha of 0.0125 (dividing the experiment-wise alpha of 0.05 among 4 hypothesis tests as shown in Table 10 below) and assuming the aforementioned continuous covariates and multiple correlation. All analyses were done using PROC GLMPOWER in SAS v9.4 (SAS Institute, Cary, NC).

TABLE 10

Statistical analyses.

| HA | Cohen's $d$ | Test Type[a] | Comparison | Test DF | Power |
|---|---|---|---|---|---|
| Linear | | Main Effect | Any hCT-MSC vs. Placebo | 4 | 0.991 |
| Dose | 0.33 | Contrast | 1 Dose vs. Placebo | 2 | 0.512 |
| Response | 0.5 | Contrast | 1 Dose vs. 3 Doses | 1 | 0.534 |
| | 0.67 | Contrast | 3 Doses vs. Placebo | 2 | 0.997 |
| Common | | Main Effect | Any hCT-MSC vs. Placebo | 4 | 0.963 |
| Treatment | 0.5 | Contrast | 1 Dose vs. Placebo | 2 | 0.920 |
| Effect | 0 | Contrast | 1 Dose vs. 3 Doses | 1 | 0.013[b] |
| | 0.5 | Contrast | 3 Doses vs. Placebo | 2 | 0.920 |
| Effect of a | | Main Effect | Any hCT-MSC vs. Placebo | 4 | 0.914 |
| Single Arm Only [c] | 0 | Contrast | 1 Dose vs. Placebo | 2 | 0.013[b] |
| | 0.5 | Contrast | 1 Dose vs. 3 Doses | 1 | 0.916 |
| | 0.5 | Contrast | 3 Doses vs. Placebo | 2 | 0.920 |

Sample sizes are: 1 Dose (N = 30 [Arm A = 15, Arm B = 15]), 3 doses (N = 30 [Arm C = 15, Arm D = 15]), Placebo (N = 60) and Any hCT-MSC (N = 60 [Arm A + B + C + D]).
HA = alternative hypothesis.
DF = degrees of freedom.
[a]The test-wise alpha is 0.0125 for all tests under each HA
[b]Power represents the per-comparison Type I error in this case since there is no difference between the groups being compared under the alternative hypothesis
[c] The example shows the treatment effect localized to the 3-dose group but the same operating characteristics apply if the treatment effect is localized to the 1-dose group The table shows that a total of 120 participants (30 in each of Arms A&B and C&D, and 60 from DukeACT) provides at least 90% power for detection of a moderate, common treatment effect of hCT-MSC or a treatment effect of only a single dosing regimen of hCT-MSC with strict control of Type I error and covariate adjustment. The study has less power for detecting a small-to-moderate sized linear dose response. Specifically, power is reduced for distinguishing between the effects of 1 or 3 doses under this alternative.

It should be understood that the above estimates of statistical power are highly sensitive to the strength of association between the covariates and the response. Correlation below ~0.8 would result in the study being underpowered by conventional standards.

The present disclosure demonstrates that intravenous infusions of allogeneic hCT-MSCs in young children with ASD are safe and feasible. The disclosure supports the conclusion of significant improvements in behavior observed in the first six (6) months post-infusion and that these significant improvements were sustained at 12 months post-infusion. Higher baseline nonverbal IQ was associated with a greater degree of improvement. This disclosure identifies outcome measures that are feasible, sensitive to change, and developmentally-appropriate and, thus suitable for use to test the efficacy of hCT-MSC therapy for the treatment of young children with ASD in future clinical trials and therapeutic settings.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A method of treating a patient having or suspected of having an autism spectrum disorder, the method comprising administering a therapeutically effective amount of human allogeneic cord tissue-derived mesenchymal stromal cells (allogeneic hCT-MSCs) to the patient, wherein the therapeutically effective dose of allogeneic hCT-MSCs comprises a total of $6.0 \times 10^6$ cells/kg, and is administered in 2 to 3 doses within 6 months.

2. The method of claim 1, wherein the allogeneic hCT-MSCs are administered systemically.

3. The method of claim 1, wherein the allogeneic hCT-MSCs are administered intravenously.

4. The method of claim 1, wherein the patient is from 1 year old to 45 years old.

5. The method of claim 4, wherein the patient is from 2 years old to 11 years old.

6. The method of claim 4, wherein the patient is from 4 years old to 8 years old.

7. The method of claim 1, wherein each dose is administered from 1 month to 6 months apart.

8. The method of claim 7, wherein each dose is administered two months apart.

9. The method of claim 1, wherein three doses are administered and the dose comprises $2.0 \times 10^6$ cells/kg.

10. The method of claim 1, wherein two doses are administered and the dose comprises $3.0 \times 10^6$ cells/kg.

11. The method of claim 1, wherein the therapeutically effective dose of allogeneic hCT-MSCs is greater than 90% CD73+ and CD90+.

12. The method of claim 1, wherein the therapeutically effective dose of allogeneic hCT-MSCs is less than 10% CD45+, CD3+, or CD31+.

13. A method of assessing the therapeutic effectiveness of treatment with human allogeneic cord tissue-derived mesenchymal stromal cells (allogeneic hCT-MSCs) on a patient suffering from an autism spectrum disorder comprising:
   (a) performing one or more appropriate tests on the patient to establish behavioral and/or biomarker baseline score(s);
   (b) administering an effective amount of allogeneic hCT-MSCs to the patient, wherein the effective amount of allogeneic hCT-MSCs comprises a total of $6.0 \times 10^6$ cells/kg, and is administered in 2 to 3 doses within 6 months;
   (c) reevaluating the patient at one or more time points post-administration of allogeneic hCT-MSCs for the same one or more behavioral and/or biomarker tests set forth in (a); and
   (d) comparing the results in (c) with the baseline score(s) established in (a).

14. The method of claim 13, wherein the behavioral test(s) performed in (a) and (c) comprise one or more of: Vineland Adaptive Behavior Scales-II (VABS-II), Vineland Adaptive Behavior Scales-III (VABS-III), Clinical Global Impression Scale (CGI), Pervasive Developmental Disorder Behavior Inventory (PDDBI), Expressive One-Word Picture Vocabulary Test-4 (EOWPVT-4), Aberrant Behavior Checklist, Sensory Experiences Questionnaire, Repetitive Behavior Scale, Intelligence Scales (Mullen Scales of Early Learning or Stanford-Binet), Language Environment Analysis, ATN GI Symptoms Inventory, and Parenting Stress Index.

15. The method of claim 13, wherein reevaluation of the patient in (c) is performed at one or more time points comprising: 2 months, 4 months, 6 months, 9 months, 12 months, 18 months, 24 months, 2 years, 3 years, 4 years, 5 years, 10 years, 15 years, 20 years or indefinitely post-administration.

* * * * *